United States Patent

Hashimoto et al.

Patent Number: 5,852,446
Date of Patent: Dec. 22, 1998

[54] RENDERING APPARATUS AND RENDERING METHOD, AND MAPPING APPARATUS AND MAPPING METHOD

[75] Inventors: Tsutomu Hashimoto, Moriguchi; Makoto Hirai, Suita, both of Japan

[73] Assignee: Matsushita Electric Industrial Co., Ltd., Kadoma, Japan

[21] Appl. No.: 673,311

[22] Filed: Jun. 28, 1996

[30] Foreign Application Priority Data

Jun. 30, 1995 [JP] Japan ................................ 7-166662

[51] Int. Cl.$^6$ ................................................ G06T 11/20
[52] U.S. Cl. ................................................ 345/441
[58] Field of Search ................................ 345/441, 443, 345/136, 137, 138, 149

[56] References Cited

U.S. PATENT DOCUMENTS

| | | | |
|---|---|---|---|
| 4,586,038 | 4/1986 | Sims et al. | 340/729 |
| 4,851,825 | 7/1989 | Naiman | 345/138 X |
| 4,855,934 | 8/1989 | Robinson | 364/521 |
| 5,347,618 | 9/1994 | Akeley | 345/421 |
| 5,371,843 | 12/1994 | Pomichter, Jr. | 345/441 |
| 5,392,392 | 2/1995 | Fischer et al. | 345/523 |
| 5,402,533 | 3/1995 | Kelley et al. | 345/426 |
| 5,438,656 | 8/1995 | Valdes et al. | 345/443 |
| 5,528,737 | 6/1996 | Sfarti | 395/141 |
| 5,594,854 | 1/1997 | Baldwin et al. | 345/441 |

FOREIGN PATENT DOCUMENTS

| | | |
|---|---|---|
| 5-298455 | 11/1993 | Japan . |
| 2254751 | 10/1992 | United Kingdom . |

OTHER PUBLICATIONS

Partial Translation of Notice of Reasons for Rejection for Patent Application Number 8–170226, mailed Apr. 9, 1998.
G. Sakas et al.; Computers and Graphics; vol. 16, No. 1, Jan. 1, 1992; pp. 121–134; "Sampling and Anti–Aliasing of Discrete 3–D Volume Density Textures".
European Search Report for Application No. EP 96 11 0482; Dated Oct. 24, 1997.

Primary Examiner—Mark K. Zimmerman
Attorney, Agent, or Firm—Renner, Otto, Boisselle & Sklar, P.L.L.

[57] ABSTRACT

The rendering apparatus of this invention includes: means for determining a pixel including a depicting point on a polygon, the polygon being projected to a plane having a plurality of pixels; and means for performing a rendering calculation based on a sample point which has a fixed position with respect to the pixel, and for outputting a calculating result.

25 Claims, 39 Drawing Sheets

| Edge DDA | Span DDA |
|---|---|
| 601-a | 602-a |
| 601-b | 602-b |
| 601-c | 602-c |
| 601-d | 602-d |
| 601-e | 602-e |
|  | 602-f |

201 Pixel
202 Polygon edge
203 Depicting point(x0,y0)
204 Pixel sample point(X,Y)
205 Point(x',y')[y'=Y]

601a, 601b, 601c, 601d  Pixels on screen
606a, 606b, 606c, 606d  Shared regions by screen pixels and texture pixel 605 projected on screen Texture image Degraded image Degradation in image quality Ideal image

RENDERING APPARATUS AND RENDERING METHOD, AND MAPPING APPARATUS AND MAPPING METHOD

BACKGROUND OF THE INVENTION

1. Field of the Invention

The present invention relates to a rendering apparatus and a rendering method for computer graphics (CG) processing. More specifically, the present invention relates to a mapping apparatus and a mapping method for conducting texture mapping to produce high-quality images. The present invention is also applicable to various CG-related calculations such as illuminance calculation, opacity calculation, and bump calculation.

2. Description of the Related Art

In recent years, in the fields of computer graphics and game machines, polygon rendering processing using texture mapping has been often used. In general, in a texture mapping technique called inverse mapping, coordinates (u,v) of a texture pattern are calculated from corresponding screen coordinates (Xs, Ys) and the color at the point of the calculated coordinates (corresponding point) of the texture is reflected on the screen coordinates (Xs, Ys).

In many cases, the above corresponding point calculation is realized by an incremental algorithm (where calculation results in the previous step are incremented in each step) because, by using an incremental algorithm, processing is fast and the circuit configuration can be simplified (G. Wolberg, "Digital Image Warping", pp. 189–204).

FIGS. 37 and 38 show texture mapping processing using an incremental algorithm. Assume that the relationship represented by Expressions 1 and 2 below is established between screen coordinates (x, y) of a point inside a polygon and texture coordinates, (u, v) of a point on a texture. Hereafter, the calculation for determining the texture coordinates (u, v) from Expressions 1 and 2 is referred to as the corresponding point calculation.

$$u = F(x, y) = a \times x + b \times y + c \quad (1)$$

$$v = G(x, y) = d \times x + e \times y + f \quad (2)$$

In FIG. 37, every square represents a pixel of a screen. The triangle represents a polygon projected on the screen. Points 1401, 1402, and 1403 represent vertexes of this polygon, i.e., the zero-th vertex, the first vertex, and the second vertex, respectively, of which screen coordinates and corresponding texture coordinates are (8,0,0,0), (0,6,0,16), (11,9,16,16), respectively. Lines 1404, 1405, and 1406 represent a side 01 connecting the zero-th vertex 1401 and the first vertex 1402, a side 12 connecting the first vertex 1402 and the second vertex 1403, and a side 20 connecting the second vertex 1403 and the zero-th vertex 1401. Points 1002, 1004, and 1006 represent depicting points on the screen calculated using incremental algorithm. The depicting points are set inside the polygon projected on the screen when the polygon is depicted. A pixel value given to each pixel is determined based on the coordinates of a corresponding depicting point. An incremental algorithm is often used for determining the depicting point. In the incremental algorithm, the depicting point is determined using a point on an edge (border) of the polygon. In a mapping apparatus, especially, the mapping is conducted by determining a corresponding point corresponding to each depicting point on a mapping image (e.g., a texture image) and reflecting the pixel value of the corresponding point on the pixel on the screen. The corresponding point is determined by the corresponding point calculation.

Hereinbelow, the corresponding point calculation will be described in detail. In FIG. 38, each square represents a pixel of the screen. FIG. 38 is a partial enlarged view of FIG. 37 showing the portion including the side 1404 in more detail. The points 1002, 1004, and 1006 in FIG. 38 indicate the same depicting points as those shown in FIG. 37. An edge 1001 of the polygon to be depicted by the texture mapping is a portion of the side 1404 of the polygon. The polygon is located on the right side of the edge 1001. The point 1002 is the depicting point on the polygon edge obtained in the previous step of the incremental algorithm, and the pixel value of the edge depicting point 1002 is reflected on a pixel 1003. Likewise, the point 1004 Is the depicting point on the polygon edge obtained in the present step, and the pixel value of the edge depicting point 1004 is reflected on a pixel 1005.

The depicting points on the polygon edge and the corresponding points corresponding to the depicting points are calculated by shifting a scan line successively. Upon completion of the scanning of the entire polygon by the scan line, the processing for the polygon edge is completed. Herein, the scan line is a horizontal line on the screen, and the entire polygon is scanned by shifting the scan line downward from the top. In other words, the scanning of the polygon is equal to adding 1 to the y value of the scan line sequentially.

When the screen coordinates of the edge depicting point 1002 and the texture coordinates of the corresponding point are $(x_0, y_0, u_0, v_0)$ and the screen coordinates of the edge depicting point 1004 and the texture coordinates of the corresponding point are $(x_1, y_1, u_1, v_1)$, they can be represented by Expression 3 below:

$$(x_1, y_1, u_1, v_1) = (x_0 + dx/dy, y_0 + 1, u_0 + du/dy, v_0 + dv/dy) \quad (3)$$

Expression 4 below is a general expression for the corresponding point calculation for the texture mapping with respect to the edge. The subscripts in the expression represent the scan line number.

$$(x_{n+1}, y_{n+1}, u_{n+1}, v_{n+1}) = (x_n + dx/dy, y_n + 1, u_n + du/dy, v_n + dv/dy) \quad (4)$$

(from Expressions 1 and 2, u and v can be differentiated by y)

The coordinates of the depicting points on the polygon edge (screen coordinates) and the coordinates of the corresponding points (texture coordinates) can be calculated by conducting the processing represented by Expression 4 for the points on the polygon edge from the start through the end thereof.

In the above expression, parameters (DDA parameters) required for the incremental algorithm are dx/dy, du/dy, dv/dy, which are represented by:

$$dx/dy = (0-8)/(6-0) = -8/6 \quad (5)$$

$$du/dy = (0-0)/(6-0) = 0/6$$

$$dv/dy = (16-0)/(6-0) = 16/6$$

The screen coordinates and the texture coordinates for points along a polygon edge shown in FIG. 37 can be calculated as follows. In this case, the side 1404 is used.

(8.00, 0.00, 0.00, 0.00) . . . (initial value)
↓+(−8/6, 1, 0, 16/6)
(6.67, 1.00, 0.00, 2.67)
↓+(−8/6, 1, 0, 16/6)
(5.33, 2.00, 0.00, 5.33)
↓+(−8/6, 1, 0, 16/6)

(4.00, 3.00, 0.00, 8.00)
↓+(−8/6, 1, 0, 16/6)
(2.67, 4.00, 0.00, 10.67)
↓+(−8/6, 1, 0, 16/6)
(1.33, 5.00, 0.00, 13.33)
↓+(−8/6, 1, 0, 16/6)
(0.00, 6.00, 0.00, 16.00) . . . (end)

The corresponding point calculation for points on the polygon span (inside the polygon) will now be described. The point 1004 is a point on the polygon span (hereinafter, referred to as the span point) obtained in the previous step and the pixel value of the span point 1004 is reflected on the pixel 1005. The point 1006 is a span point on the polygon span obtained in the present step and the pixel value of the span point 1006 is reflected on a pixel 1007. The polygon span points include the polygon edge points, and thus the polygon span point 1004 is the same as the polygon edge point 1004.

The depicting points on the polygon span and the corresponding points are calculated by sequentially changing pixels to be depicted (hereinafter, referred to as depicting pixels). Upon completion of the depiction of the entire polygon span, the processing for the polygon span is completed. In the following description, the depicting pixels are changed from left to right, which is equal to adding 1 to the screen coordinate x sequentially.

When the screen coordinates of the span point 1004 and the texture coordinates of the corresponding point are $(x_1, y_1, u_1, v_1)$ and the screen coordinates of the span point 1006 and the texture coordinates of the corresponding point are $(x_2, y_2, u_2, v_2)$, they can be represented by Expression 6 below.

$$(x_2, y_2, u_2, v_2) = (x_1+1, y_1, u_1+\partial u/\partial x, v_1+\partial v/\partial x) \quad (6)$$

Expression 7 below is a general expression for the corresponding point calculation for the texture mapping with respect to the span. The subscripts in the expression represent the depicting pixel number.

$$(x_{n+1}, y_{n+1}, u_{n+1}, v_{n+1}) = (x_n+1, y_n, u_n+\partial u/\partial x, v_n+\partial v/\partial x) \quad (7)$$

(from Expressions 1 and 2, u and v can be differentiated by x)

The coordinates of the depicting points (screen coordinates) and the coordinates of the corresponding points (texture coordinates) inside the polygon can be calculated by conducting the processing represented by Expression 7 for the points from the start through the end of the polygon span.

In the above expression, parameters (DDA parameters) required for the incremental algorithm are $\partial u/\partial x$ and $\partial v/\partial x$, which are represented by:

$$\begin{aligned}
\partial u/\partial x &= -\{(6-0)(16-0) - (9-6)(0-0)\}/ \\
&\quad \{(0-8)(9-6) - (11-0)(6-0)\} \\
&= 96/90 \\
\partial v/\partial x &= -\{(6-0)(16-16) - (9-6)(16-0)\}/ \\
&\quad \{(0-8)(9-6) - (11-0)(6-0)\} \\
&= -48/90
\end{aligned} \quad (8)$$

The screen coordinates and the texture coordinates for the polygon span shown in FIG. 37 can be calculated as follows. In this case, the span including the span point 1004 is used.

(5.33, 2.00, 0.00, 5.33) . . . (initial value)
↓+(1, 0, 96/90, −48/90)
(6.33, 2.00, 1.07, 4.80)
↓+(1, 0, 96/90, −48/90)
(7.33, 2.00, 2.13, 4.27)
↓+(1, 0, 96/90, −48/90)
(8.33, 2.00, 3.20, 3.73) . . . (end)

The calculation of the span points is continued until the scanning reaches the right edge as is viewed from FIG. 37.

With the above-described incremental algorithm, the corresponding point calculation at the texture mapping can be conducted correctly at high speed. The texture image is derived using the thus-calculated texture coordinates (u,v) and reflected on the depicting pixel. Thus, the texture mapping is realized. In general, each depicting pixel corresponds to a point obtained by omitting the decimal parts of the values of the calculated depicting point (x,y). For example, as shown in FIG. 38, the pixels 1003, 1005, 1007 reflect pixel values on the texture image derived using the texture coordinates $(u_0, v_0)$, $(u_1, v_1)$, and $(u_2, v_2)$, respectively.

Thus, in the corresponding point calculation using an incremental algorithm, since the operation is conducted based on the calculation results in the previous step, high-speed operation can be realized with a simple configuration. However, this calculation method has a problem of creating errors as described below.

Hereinbelow, the case where the corresponding point calculation for a depicting pixel is not correct will be described with reference to FIG. 39. The same components are denoted by the same reference numerals as those in FIGS. 37 and 38.

Referring to FIG. 39, the texture coordinates $(u_2, v_2)$ of the polygon span point 1006 $(x_2, y_2, u_2, v_2)$ calculated from the polygon edge point 1002 $(x_0, y_0, u_0, v_0)$ is represented by Expression 9 below (obtained from Expressions 1, 2, and 6). The depicting pixel 1007 is depicted with the values obtained based on the texture coordinates represented by Expression 9.

$$\begin{aligned}
(u_2, v_2) &= (u_1 + \partial u/\partial x, v_1 + \partial v/\partial x) \\
&= (u_0 + du/dy + \partial u/\partial x, v_0 + dv/dy + \partial v/\partial x) \\
&= (u_0 + (a \times dx/dy + b) + a, v_0 + (d \times dx/dy + e) + d) \\
&= (u_0 + a \times (1 + dx/dy) + b, v_0 + d \times (1 + dx/dy) + e)
\end{aligned} \quad (9)$$

However, the texture coordinates of the depicting pixel 1007 with respect to the depicting pixel 1003 are represented by Expression 10 below. In this relation, the polygon edge point 1002 $(x_0, y_0, u_0, v_0)$ is used as the coordinates of the depicting pixel 1003. A point 1111 (x',y',u',v') is obtained by shifting the polygon edge point 1002 by one pixel along the y axis and used as the coordinates for the depicting pixel 1007.

$$\begin{aligned}
(u_2', v_2') &= (u_0 + \partial u/\partial y, v_0 + \partial v/\partial y) \\
&= (u_0 + b, v_0 + e)
\end{aligned} \quad (10)$$

When the difference between the true value and the value obtained by the incremental algorithm with respect to the value u is denoted by E, E is represented by Expression 11 below.

$$\begin{aligned}
E &= u_2' - u_2 \\
&= -a \times (1 + dx/dy)
\end{aligned} \quad (11)$$

Therefore, the difference E is within the range shown in Expression 12 below:

−a<E <a (∵ −2<dx/dy<0 from FIG. 38)

Before discussing the error shown in Expression 12, the difference between the depicting point and a sample point will be described. The sample point is defined as the point which is located at a fixed position for every pixel. For example, the center point of each pixel can be defined as the sample point. This means that if the pixels are arranged regularly in a lattice shape, the sample points of the pixels are also arranged regularly. On the contrary, the depicting points are not necessarily arranged regularly because they are determined by the positional relationship between the polygon to be depicted (especially, the polygon edge) and the pixels.

In FIG. 39, the point nearest to the origin in each pixel (the upper left corner of each pixel shown in FIG. 39, marked by 0) is used as the sample point of each pixel. Distances 1108, 1109, and 1110 between the depicting points (the edge depicting points 1002 and 1004 and the span depicting points 1006 calculated using the incremental algorithm) and the sample points of the pixels 1003, 1005, and 1007 reflecting these depicting points are denoted by L1, L2, and L3, respectively. The distances L2 and L3 are the same from Expression 7.

Errors E1, E2, and E3 between the sample points and the depicting points calculated using the incremental algorithm with respect to the value u are represented by Expression 13 below:

$$E1 = L1 \times \partial u / \partial x$$
$$E2 = L2 \times \partial u / \partial x$$
$$E3 = L3 \times \partial u / \partial x \quad (13)$$

Expression 14 below is a general expression for obtaining an error E'.

$$E' = <\partial u / \partial x$$
$$<a \quad (14)$$

(∵ the distance between the sample point and the depicting point is less than 1)

Thus, the error in the corresponding point calculation using the incremental algorithm arises from the difference between the sample point of each pixel and the depicting point calculated using the incremental algorithm. FIGS. 40A to 40C show an example of degradation in image quality due to the calculation error, showing that a texture mapped on a polygon is discontinuous due to the calculation error. FIGS. 40A, 40B, and 40C show a texture image to be mapped to a polygon, an image obtained by a conventional method, and an ideal mapped image, respectively. It is observed from FIGS. 40A to 40C that degradation in image quality arises when the mapping is conducted by the conventional method.

The errors represented by Expressions 12 and 14 are different because in Expression 12 the sample point is not fixed for every pixel. Hereinafter, the case of fixed sample points is adopted for the error in the corresponding point calculation. That is, Expression 14 is used for the error in the corresponding point calculation.

In the above description, the value u was used. The value v is represented by Expression 2, while the luminance (R,G,B) and the opacity A are represented by Expressions 15 and 16 below, respectively. As is observed from these expressions, calculation errors similar to those described above also arise in the calculations of the value v, luminance, and opacity.

$$R = Fr(x, y) = (ar \times x + br \times y + cr)$$
$$G = Fg(x, y) = (ag \times x + bg \times y + cg)$$
$$B = Fb(x, y) = (ab \times x + bb \times y + cb) \quad (15)$$

$$A = Fa(x, y) = (aa \times x + ba \times y + ca) \quad (16)$$

In other words, errors arise when the incremental algorithm is used for the calculations of the corresponding points, luminance, opacity, and the like for displaying a polygon.

Errors arise in any corresponding point calculation using the incremental algorithm, not only in the relationship between the polygon and the texture represented by Expressions 1 and 2. Any relational expressions of the polygon (x,y) with the texture (u,v), the luminance (R,G,B), and the opacity A can be used for texture mapping using the incremental algorithm as far as they can be differentiated by y and partially differentiated by x. For example, the relationship with the corresponding point may be represented by Expressions 17 and 18 below:

$$\begin{aligned} u &= F(x, y) & (17) \\ &= (a \times x + b \times y + c)/(g \times x + h \times y + + i) \\ v &= G(x, y) & (18) \\ &= (d \times x + e \times y + f)/(g \times x + h \times y + i) \end{aligned}$$

(Coefficients a, b, c, d, e, and f in Expressions 17 and 18 are different from the coefficients in Expressions 1 and 2.)

However, calculation errors similar to those described above still arise by using Expressions 17 and 18 as the relational expression between the polygon and the texture.

It is therefore impossible to avoid the occurrence of errors in the calculation of the corresponding points, luminance, opacity, and the like whatever relational expressions are used.

Thus, the calculation of the corresponding points, luminance, opacity, bump, displacement, and the like with respect to the depicting pixels cannot be conducted correctly using the conventional incremental algorithm.

The error in the corresponding point calculation using the incremental algorithm arises due to the displacement of one pixel at maximum on the screen. Accordingly, the error represented by Expressions 12 and 14 can be reduced if the size of the texture is the same as or less than that of the polygon. When the texture is greatly magnified, however, the error becomes larger in proportion to the magnification ratio, increasing the degradation in image quality when a texture mapping image is produced. In an apparatus for the real-time mapping of images stored real-time, the magnification ratio of the texture previously could not be determined. Accordingly, it is not possible to avoid the degradation in image quality when an arbitrary polygon is mapped to an arbitrary polygon.

Therefore, the object of the present invention is to realize actually and theoretically a correct corresponding point calculation by effectively eliminating the error arising in the incremental algorithm. An apparatus for realizing this calculation should be simple in the configuration, operate at high speed, and be manufactured easily. The correct and high-speed corresponding point calculation at the mapping is important, not only for the field of computer graphics, but also for multimedia apparatuses such as home game machines and Karaoke systems. The application is therefore extensive. Also, requests for real-time mapping is expected to increase In the future.

Hereinbelow, the error included in the coordinates (u,v) calculated by the conventional DDA will be described with reference to FIG. 6.

In FIG. 6, the coordinate system for the screen space is shown by the solid lines, while the coordinate system for the texture space is shown by the broken lines. The encircled figures represent the scales of the u and v axes of the coordinate system for the texture space. A screen pixel 603 is located at the screen coordinates (0,2), while a texture pixel 604 is located at the texture coordinates (2,3).

The reference numeral 605 denotes a polygon, which is defined by the coordinates (x,y,u,v)=(7,0,0,0), (0,5,0,4), (3,9,4,4), and (10,4,4,0).

The reference numerals 601-*a*, 601-*b*, 601-*c*, 601-*d*, and 601-*e* denote DDAs in the edge direction, while the reference numerals 602-*a*, 602-*b*, 602-*c*, 602-*d*, 602-*e*, and 602-*f* denote DDAs in the span direction on the scan line of y=3. The point where the arrow representing each DDA ends (point indicated by the arrow) is where each DDA in the span direction generates (such an arrow is called a DDA arrow).

In the texture mapping, the pixels in the texture space indicated by the arrows of the DDAs 601 and 602 are reflected on the pixels in the screen space indicated by the arrows of the DDAs 601 and 602.

Specifically, the following relationships are established for the scan line of y=3.

| DDA arrow | Screen pixel | Texture pixel |
|---|---|---|
| 601-c | (2, 3) | (0, 2) |
| 602-a | (3, 3) | (0, 2) |
| 502-b | (4, 3) | (0, 1) |
| 602-c | (5, 3) | (1, 1) |
| 602-d | (6, 3) | (1, 0) |
| 602-e | (7, 3) | (2, 0) |
| 602-f | (8, 3) | (2, 0) |

However, in the screen pixel (6,3), the texture pixel used for the reflection is (1,0), (1,1), (2,1), or (2,0) depending on which point in the screen pixel is used for deriving the texture. Thus, which one of these four texture pixels is generated in the DDA depends on which point in the screen pixel is used for deriving the texture. This means that the image generated by the texture mapping differs depending on which point in the screen pixel is used for deriving the texture. If the point in the screen pixel used for deriving the texture differs among pixels in the polygon, which especially tends to occur in the span, the resultant image quality degrades.

The above phenomenon will be described using the following expressions.

In the texture mapping, the texture coordinates (u,y) and the polygon coordinates (x,y) are represented by Expressions 19 and 20 below.

$$u = f(x,y) \quad (19)$$

$$v = g(x,y) \quad (20)$$

Expression 19 is used in the following description. The description is substantially the same when Expression 20 is used.

When the polygon coordinates for deriving the texture are $(x_0, y_0)$ and the screen coordinates obtained by quantizing the polygon coordinates $(x_0, y_0)$ are (X,Y), the polygon coordinates are expressed by Expressions 21 and 22 below:

$$x_0 = X + ex \quad (21)$$

$$y_0 = Y + ey \quad (22)$$

That is, the value u of the texture coordinate is expressed by Expression 23 below, which indicates that the texture coordinates vary due to the quantization error.

$$u = f(X + ex, Y + ey) \quad (23)$$

Thus, in the conventional method, the degradation in image quality is significant because the position in the screen pixel at which the texture is derived is not fixed.

The object of the present invention is to provide a rendering apparatus and a mapping apparatus capable of producing high-quality images at high speed in the rendering processing in computer graphics, where, especially in the mapping processing, the corresponding point calculation can be conducted correctly with a simple structure and at high speed. The mapping procedure includes, not only texture mapping, but also mapping of luminance, opacity, bump, displacement, and the like.

SUMMARY OF THE INVENTION

The rendering apparatus of this invention includes: means for determining a pixel including a depicting point on a polygon, the polygon being projected to a plane having a plurality of pixels; and means for performing a rendering calculation based on a sample point which has a fixed position with respect to the pixel, and for outputting a calculating result.

Alternatively, the rendering apparatus of this invention includes: means for performing a rendering calculation based on a depicting point on a polygon, and for outputting a calculating result, the polygon being projected to a plane having a plurality of pixels; means for determining a plurality of pixels corresponding to the depicting point; means for determining a weight coefficient for each of the plurality of pixels, based on a position of the depicting point; and means for distributing the calculating result to each of the plurality of pixels, based on respective weight coefficients for the plurality of pixels.

According to another aspect of the invention, a mapping apparatus is provided. The mapping apparatus includes: an operation section for generating a parameter for a polygon based on respective positions of vertices of the polygon and a corresponding point given to each of the vertices of the polygon, the polygon being projected to a plane having a plurality of pixels; an edge generation section for determining a position of a first depicting point on an edge of the polygon and a position of a first corresponding point corresponding to the first depicting point, based on the parameter; a correction section for determining a depicting pixel corresponding to the first depicting point, for further determining a sample point corresponding to the depicting pixel, and for correcting the position of the first corresponding point based on sample point; and a span generation section for determining a position of a second depicting point within the polygon and a position of a second corresponding point corresponding to the second depicting point, based on the parameter and the sample point.

In one embodiment of the invention, the correction section corrects in a one dimensional manner with respect to the first depicting point.

In another embodiment of the invention, the edge generation section determines a point intersecting the edge of the polygon and an upper edge of the depicting pixel as the first depicting point, and the correction section determines a point which is most close to the origin within the depicting pixel as the sample point.

In still another embodiment of the invention, a bit precision representing the parameter is set to a predetermined value, and the correction section includes a shifter and an adder.

Alternatively, the mapping apparatus of this invention includes: an operation section for generating a parameter for a polygon based on respective positions of vertices of the polygon and a corresponding point given to each of the vertices of the polygon, the polygon being projected to a plane having a plurality of pixels; an edge generation section for determining a position of a first depicting point on an edge of the polygon and a position of a first corresponding point corresponding to the first depicting point, based on the parameter; a span generation section for determining a position of a second depicting point within the polygon and a position of a second corresponding point corresponding to the second depicting point, based on the parameter and the first depicting point; a generated image storing section for storing a value corresponding to each of the plurality of pixels on the plane; an image storing processing section for storing a pixel value generated based on either the position of the first depicting point or the position of the second depicting point as a value corresponding to either one of the plurality of pixels or adjacent pixels of the plurality of pixels.

In one embodiment of the invention, the image storing processing section includes: an area ratio calculation section for distributing the generated pixel value to either one of the plurality of pixels or adjacent pixels of the plurality of pixels, based on a ratio of an area on the plane which is defined by either the first depicting point or the second depicting point to an area on the plane which is occupied by either one of the plurality of pixels or adjacent pixels of the plurality of pixels; and a pixel value distribution section for storing the distributed value as a value corresponding to either one of the plurality of pixels or adjacent pixels of the plurality of pixels.

In another embodiment of the invention, (x, y) denotes either the position of the first depicting point or the position of the second depicting point and wherein the area ratio calculation section includes: a first multiplier for multiplying (1−x) by (1−y); a second multiplier for multiplying x by (1−y); a third multiplier for multiplying (1−x) by y; and a fourth multiplier for multiplying x by y; and wherein the pixel value distribution section includes: a fifth multiplier for multiplying the output of the first multiplier by the generated pixel value; a sixth multiplier for multiplying the output of the second multiplier by the generated pixel value; a seventh multiplier for multiplying the output of the third multiplier by the generated pixel value; an eighth multiplier for multiplying the output of the fourth multiplier by the generated pixel value, In still another embodiment of the invention, a bit precision representing the generated pixel value is set to a predetermined value, and each of the first through eighth multipliers includes a shifter and an adder.

In still another embodiment of the invention, the edge generation section determines a point intersecting the edge of the polygon and an upper edge of the depicting pixel as the first depicting point, thereby omitting the second, fourth, sixth and eighth multipliers.

Alternatively, the mapping apparatus of this invention includes: an operation section for generating a parameter for a polygon based on respective positions of vertices of the polygon and a corresponding point given to each of the vertices of the polygon, the polygon being projected to a plane having a plurality of pixels; a first edge generation section for determining a position of a first candidate point corresponding to a first depicting point on an edge of the polygon and a position of a first corresponding point corresponding to the first candidate point, based on the parameter; a second edge generation section for determining a position of a second candidate point corresponding to the first depicting point on the edge of the polygon and a position of a second corresponding point corresponding to the second candidate point, based on the parameter; a selection section for selecting one of an output of the first edge generation section and an output of the second edge generation section; and a span generation section for determining a position of a second depicting point within the polygon and a position of a third corresponding point corresponding to the second depicting point, based on the parameter and the output selected by the selection section.

In one embodiment of the invention, during a period in which one of the first and second edge generation sections operates, the other of the first and second edge generation sections does not operate.

In another embodiment of the invention, the operation section calculates a slope of the edge of the polygon on the plane, and the selection section accumulates a decimal portion of the slope and selects one of an output of the first edge generation section and an output of the second edge generation section, in accordance with whether or not the accumulated result exceeds a predetermined value.

Alternatively, the mapping apparatus of this invention includes: an operation section for generating at least two sets of parameters for a polygon based on respective positions of vertices of the polygon and a corresponding point given to each of the vertices of the polygon, the polygon being projected to a plane having a plurality of pixels; an increment switching section for selecting one set of parameters among the at least two sets of parameters; an edge generation section for determining a position of a sample point corresponding to a first depicting point on an edge of the polygon and a position of a first corresponding point corresponding to the first depicting point, based on the selected set of parameters; a span generation section for determining a position of a second depicting point within the polygon and a position of a second corresponding point corresponding to the second depicting point, based on the selected set of parameters and the position of the sample point.

In one embodiment of the invention, the operation section calculates a slope of the edge of the polygon on the plane, and the increment switching section accumulates a decimal portion of the slope and selects one set of parameters among the at least two sets of parameters, in accordance with whether or not the accumulated result exceeds a predetermined value.

Alternatively, the mapping apparatus of this invention includes: an operation section for generating a parameter for a polygon based on respective positions of vertices of the polygon and a corresponding point given to each of the vertices of the polygon, the polygon being projected to a plane having a plurality of pixels; an edge generation section for determining a position of a sample point corresponding to a first depicting point on an edge of the polygon and a position of a first corresponding point corresponding to the first depicting point, based on the parameter; a correction section for correcting the position of the sample point when a distance between the first depicting point and the sample point exceeds a predetermined value; a span generation section for determining a position of a second depicting point within the polygon and a position of a second corresponding point corresponding to the second depicting point, based on the parameter and the position of the sample point.

In one embodiment of the invention, the correction section is included in the span generation section, and the span generation section performs both a process for correcting the position of the sample point and a process for determining the position of the second depicting point and the position of the second corresponding point.

In another embodiment of the invention, the operation section calculates a slope of the edge of the polygon on the plane, and the span generation section accumulates a decimal portion of the slope and determines whether or not the position of the sample point should be corrected, in accordance with whether or not the accumulated decimal portion exceeds a predetermined value.

In still another embodiment of the invention, the vertices of the polygon have an attribute value representing a material of the polygon, and the mapping apparatus further comprises means for generating a value corresponding to the first corresponding point and the second corresponding point based on the attribute value.

In still another embodiment of the invention, the vertices of the polygon have coordinates for a bump or displacement, and the mapping apparatus further comprises means for performing a bump or displacement calculation within the polygon.

In still another embodiment of the invention, the mapping apparatus further comprises means for performing an anti-aliasing processing.

In still another embodiment of the invention, each of the plurality of pixels on the plane has a plurality of sub-pixels, and the first depicting point is determined in accordance with sub-pixel positioning.

According to another aspect of the invention, a rendering method is provided. The method includes the steps of: determining a pixel including a depicting point on a polygon, the polygon being projected to a plane having a plurality of pixels; and performing a rendering calculation based on a sample point which has a fixed position with respect to the pixel, and outputting a calculating result.

Alternatively, the rendering method of this invention includes the steps of: performing a rendering calculation based on a depicting point on a polygon, and outputting a calculating result, the polygon being projected to a plane having a plurality of pixels; determining a plurality of pixels corresponding to the depicting point; determining a weight coefficient for each of the plurality of pixels based on a position of the depicting point; and distributing the calculating result to each of the plurality of pixels based on respective weight coefficients for the plurality of pixels.

According to another aspect of the invention, a mapping method is provided. The method includes the steps of: generating a parameter for a polygon based on respective positions of vertices of the polygon and a corresponding point given to each of the vertices of the polygon, the polygon being projected to a plane having a plurality of pixels; determining a position of a first depicting point on an edge of the polygon and a position of a first corresponding point corresponding to the first depicting point, based on the parameter; determining a depicting pixel corresponding to the first depicting point, further determining a sample point corresponding to the depicting pixel, and correcting the position of the first corresponding point based on the sample point; and determining a position of a second depicting point within the polygon and a position of a second corresponding point corresponding to the second depicting point based on the parameter and the sample point.

Alternatively, the mapping method of this invention includes the steps of: generating a parameter for a polygon based on respective positions of vertices of the polygon and a corresponding point given to each of the vertices of the polygon, the polygon being projected to a plane having a plurality of pixels; determining a position of a first depicting point on an edge of the polygon and a position of a first corresponding point corresponding to the first depicting point based on the parameter; determining a position of a second depicting point within the polygon and a position of a second corresponding point corresponding to the second depicting point based on the parameter and the first depicting point; storing a pixel value generated based on either the position of the first depicting point or the position of the second depicting point as a value corresponding to either one of the plurality of pixels or adjacent pixels of the plurality of pixels.

Thus, according to the rendering apparatus and the mapping apparatus of the present invention, in order to correct an error included in a pixel value obtained based on the coordinates of a depicting point on a polygon edge of a polygon projected on a screen, rendering or the corresponding point calculation to a mapping image is conducted based on the coordinates of a sample point corresponding to a pixel including the depicting point, to obtain a pixel value of each pixel. By this method, a high-quality image can be produced.

More specifically, according to the first embodiment of the present invention, the edge depicting point having the same y coordinate as the sample point of a previously-defined pixel is calculated by the edge generation section. In this calculation, the calculation error represented by Expression 14 arises between the defined sample point and the calculated edge depicting point. The correction represented by Expression 24 below is conducted for the calculation error of Expression 14 as for the corresponding point (calculation of the texture coordinates (u,v)) by the correction section.

$$u = u - L \times \partial u / \partial x$$

$$v = v - L \times \partial v / \partial x \qquad (24)$$

L is the distance along the x axis between the sample point and the edge depicting point. By this correction, a correct texture corresponding point can be calculated.

The same processing can be conducted for parameters other than the texture coordinates, such as luminance and opacity (Expression 24).

If the edge depicting point which is the initial value for span depicting points is identical to the sample point of the pixel, all the span depicting points included in the span are identical to the respective sample points of the pixels. This means that the corresponding point calculation for the span depicting points can be conducted correctly without the need for parameter correction.

Thus, by correcting parameters for the calculation of the corresponding point to the edge depicting point, the correction point calculation for all the pixels included in the polygon can be correctly conducted.

The value L in Expression 24 for correction denotes the decimal part of the x coordinate of the edge depicting point calculated by the edge generation section, which can be represented by Expression 25 below:

$$L = x - [x] \qquad (25)$$

Since the parameters $\partial u/\partial x$ and $\partial v/\partial x$ are used in the span generation section, they are not required to be newly calculated. The precision of the multiplication in Expression 24 does not need to be higher than the precision of the decimal part of the x coordinate of the edge point calculated by the edge generation section. It is sufficient if an allowance of several bits for the resolution of the pixel to be generated is provided. Therefore, the configuration of the correction section is comparatively simple, and the resultant apparatus as a whole can be simplified by using the incremental algorithm.

Since the correction by the correction section can be realized by one-time multiplication and one-time addition (Expression 24), the delay in the entire processing due to the correction is extremely small. Further, the components of the apparatus, such as the edge generation section, the correction section, and the span generation can be operated in a pipeline manner as a whole. As a result, the high-speed processing using the incremental algorithm can be retained as a whole.

In an anti-aliasing processing for edges, a point on the screen coordinate system located outside the polygon region needs to be sampled. Such a point can be calculated from Expression 24 by using L as the distance between the point to be sampled and the sample point located inside the polygon region nearest to the point to be sampled in the x-axis direction and using the parameters for the sample point.

Thus, in the first embodiment of the texture mapping apparatus according to the present invention, the corresponding point calculation can be conducted correctly, the configuration can be simplified, and the processing can be conducted at high speed.

According to the second embodiment of the present invention, the sample point is set at the point in each pixel nearest to the origin, for example. With this configuration, the operation amount required for the correction can be reduced and the circuitry can be simplified.

In the above first and second embodiments of the mapping apparatus, the error in the corresponding point calculation is eliminated by correcting the parameters used for the calculation of the resultant corresponding point. In the third embodiment of the present invention, a pixel value obtained from a texture image is allocated to a plurality of pixels depending on the area shared with the texture pixel, end the allocated pixel values are stored in the respective pixels. In the incremental algorithm, the displacement of the calculated depicting point from the sample point of each pixel causes degradation in image quality. When a texture pixel derived using the calculated depicting point is written in a frame memory, the texture pixel ideally influences four pixels at maximum in the frame memory. According to the present invention, the pixel value is allocated to these four pixels in the frame memory depending on the ratio of areas shared with the texture pixel by the respective four frame pixels. With this configuration, as in the above configurations, high-quality images can be obtained by various types of mapping.

In the third embodiment, correction of parameters is not required, but the access amount to the frame memory increases. However, since the above allocated storing is conducted only locally, a small intermediate buffer may be provided on route to the frame memory to thereby cover the increase in the access amount.

According to the fourth embodiment of the mapping apparatus of the present invention, data for a polygon edge are calculated by two edge generation sections, and the calculation results are appropriately selected by the selection section. In this way, screen coordinates and texture coordinates for the polygon edge can be ideally calculated.

In the fourth embodiment, though two edge generation sections are required, the correction can be achieved only by the selection between two calculation results. Since the selection section can be implemented by selectors, high-speed operation is possible compared with the correction processing. Also, the circuitry of the selection section can be simplified.

The operation of one of the two edge generation sections can be stopped under the control of the selection section. This reduces the power consumption of the entire apparatus.

According to the fifth embodiment of the mapping apparatus of the present invention, the two edge generation sections are combined into one. This is possible by appropriately selecting one of the increment values for the increment processing by the edge generation section. This simplifies the circuitry.

According to the sixth embodiment of the mapping apparatus of the present invention, the increment value calculated by the operation section and used by the edge generation section is such a value that can simplify the correction by the correction section. In other words, normal increment processing is conducted by the edge generation section, and the resultant data generated by the edge generation section only requires simple correction by the correction section.

In the sixth embodiment, the correction section can be simplified. The operation amount required for the calculation of the increment value by the operation section is not so large compared with the conventional configurations. Accordingly, the screen coordinates and the corresponding texture coordinates can be ideally calculated at high speed using the apparatus with this simple configuration.

According to the seventh embodiment of the mapping apparatus of the present invention, the processing by the correction section and the span generation section in the sixth embodiment can be realized by a common circuit. The processing speed is not lowered by using a common circuit. Thus, the same function can be realized by the configuration simpler than the configuration of the sixth embodiment.

The relative positional relationship between the depicting point calculated using the incremental algorithm and the corresponding pixel is not always fixed. In consideration of this point, according to a mapping apparatus of the present invention, each pixel value is determined using the positional information of the sample point representing each pixel, so as to improve the image quality.

According to another mapping apparatus of the present invention, each pixel value determined based on the positional information of the depicting point calculated by the incremental algorithm is allocated to a plurality of pixels adjacent one another based on their relative positional relationship with the pixel value, so as to obtain substantially the same effect.

The problem of an error arising in the calculation using the increment algorithm not only influence the mapping but also is shared with the general rendering algorithm. Accordingly, the present invention is extensively applicable to rendering in general.

The degradation of image quality occurs because the position in each screen pixel at which the texture is derived is not fixed. Accordingly, the degradation in image quality can be prevented by fixing the position in each screen pixel at which the texture is derived over the screen coordinate space.

The relational expression for the texture mapping is represented by Expressions 19 and 20 as described above. Hereinbelow, for simplifying the description, the relationship is described using Expression 26 below.

$$u=f(x)=A \times x+B \qquad (26)$$

In principle, though this is also applicable to Expressions 19 and 20.

The value x can be represented by Expression 27 below when X is the value after quantification and ex is the quantification error is ex.

$$x = X + ex \qquad (27)$$

Expression 28 below is established when E is the error between the value u calculated with the value x before quantification and the value u calculated with the value X after quantification.

$$\begin{aligned} E &= f(x) - f(X) \\ &= f(X + ex) - f(X) \\ &= f(ex) \end{aligned} \qquad (28)$$

This indicates that no error arises between the values u before and after quantization if the quantization error is eliminated in the x space.

The value E is fixed by fixing the quantization error. This is because, since all the calculated values u have an error uniformly, no relative error in the u space arises.

Thus, by fixing the coordinates (x,y) used for the calculation of the texture in all the screen space pixels, the texture coordinates without any error in the texture space can be calculated. Accordingly, the calculation of the polygon and texture coordinates can be conducted without error, and thus degradation in the quality of images generated by texture mapping can be prevented.

Thus, the invention described herein makes possible the advantages of (1) providing a rendering apparatus and a mapping apparatus where high-quality images can be produced at high speed in the rendering processing of computer graphics and (2) providing a rendering method and a mapping method for such apparatuses.

These and other advantages of the present invention will become apparent to those skilled in the art upon reading and understanding the following detailed description with reference to the accompanying figures.

DESCRIPTION OF THE PREFERRED EMBODIMENTS

The principle of the mapping apparatus according to the present invention is extensively applicable to rendering in general. For simplification of description, however, mapping apparatuses are used for the description of the present invention in the following examples. When the present invention is applied to the rendering other than the mapping, the coordinates of a sample point corresponding to each depicting point and an attribute value to each polygon may be used to conduct a desired rendering operation, instead of conducting the rendering operation using the coordinates of each depicting point. The attribute value as used herein refers to a value representing the material of the polygon, such as the reflectance, transmittance, and refractive index of the polygon.

EXAMPLE 1

The first example of the mapping apparatus according to the present invention will be described with reference to FIGS. 1 to 11.

Figure 1:
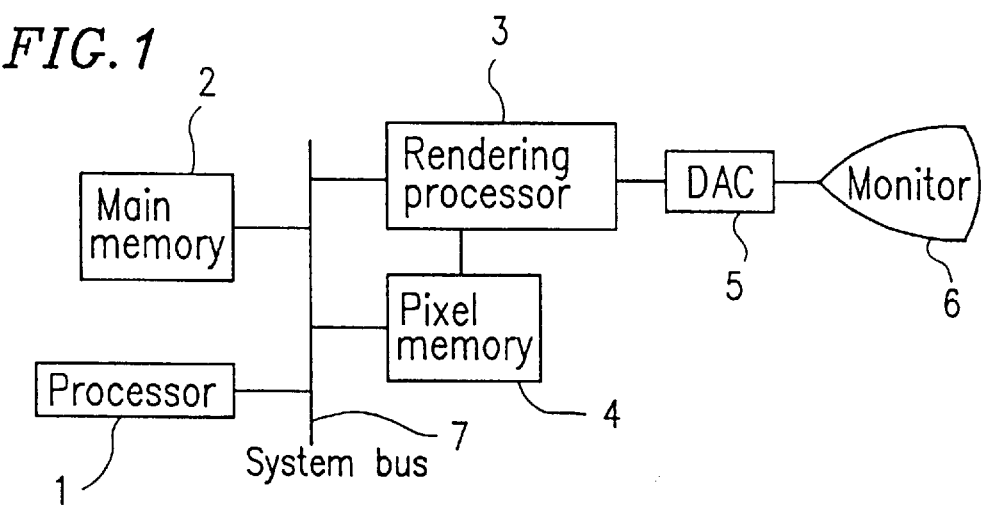
FIG. 1 shows a configuration of a mapping apparatus according to the present invention.

FIG. 1 shows a configuration of the mapping apparatus according to the present invention. Referring to FIG. 1, the mapping apparatus includes a main processor 1, a main memory 2, a rendering processor 3, a pixel memory 4, a digital analog converter (DAC) 5, a monitor 6, and a system bus 7.

The main processor 1 conducts the geometric operation for three-dimensional graphic data processing for conducting texture mapping, the control of the rendering processor 3, the DAC 5, and the like, and the control of the entire system. The main memory 2 stores programs executed by the main processor 1 and data required for processings such as polygon data. The rendering processor 3 depicts polygons for the pixel memory 4 based on the control from the main processor 1. The pixel memory 4 stores images depicted by the rendering processor 3 and textures to be mapped. The system bus 7 connects the main processor 1, the main memory 2, the rendering processor 3, and the pixel memory 4 to input/output apparatuses (not shown). Generated images are output to the monitor 6 via the DAC 5.

Figure 2:
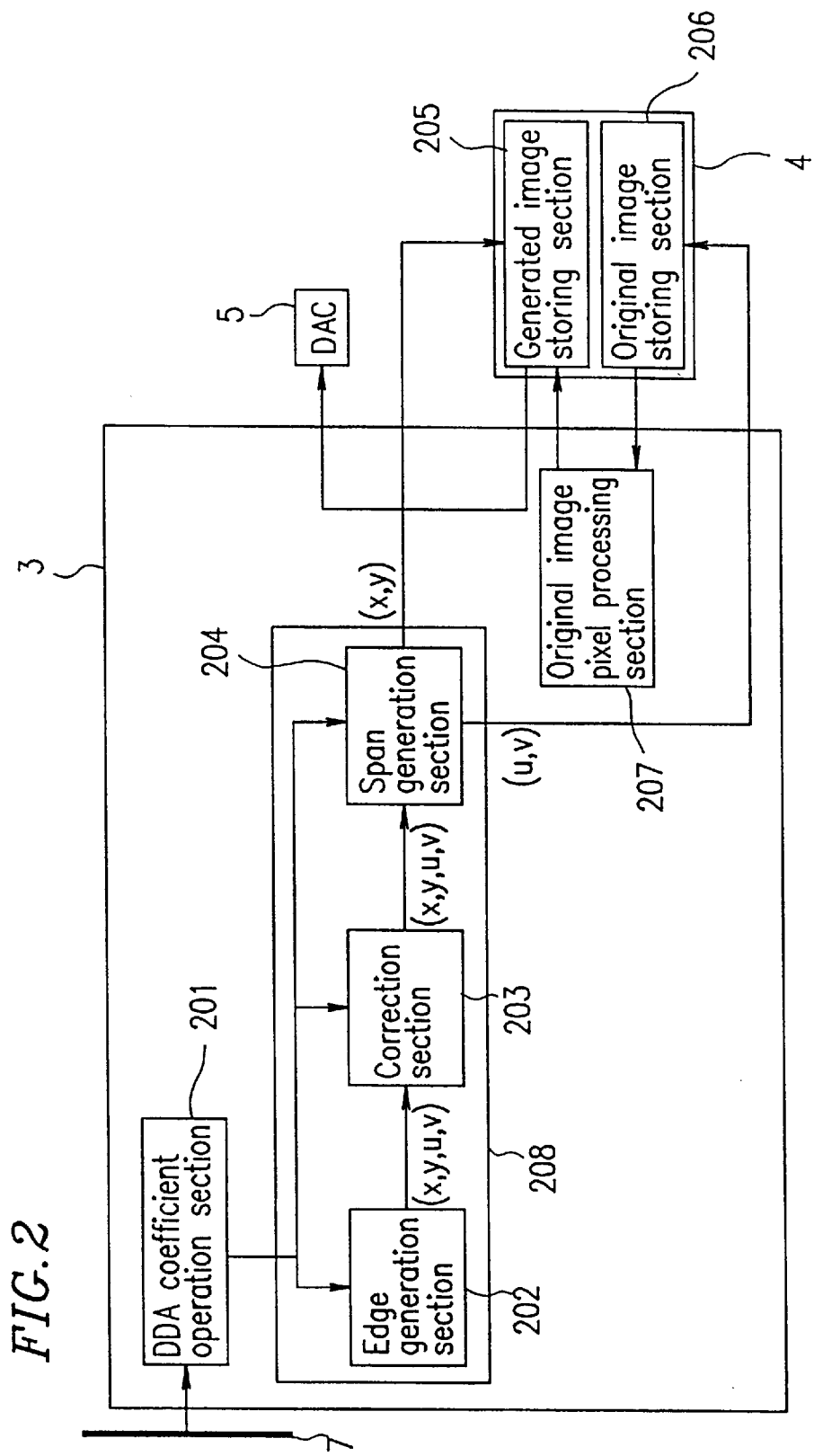
FIG. 2 shows a configuration of a rendering processor of the mapping apparatus according to the present invention.

FIG. 2 shows a configuration of the rendering processor 3. The rendering processor 3 includes a DDA coefficient operation section 201, a mapping address generation section 208, and an original image pixel processing section 207.

The DDA coefficient operation section 201 generates a DDA coefficient from the relationship between vertexes of a polygon and a texture input via the system bus 7. The DDA coefficient includes a differential value of y (longitudinal DDA) and a differential value of x (lateral DDA) and is used by the mapping address generation section 208. The mapping address generation section 208 performs a rendering processing using DDA and includes an edge generation section 202, a correction section 203, and a span generation section 204, and conducts rendering using the DDA.

Figure 3:
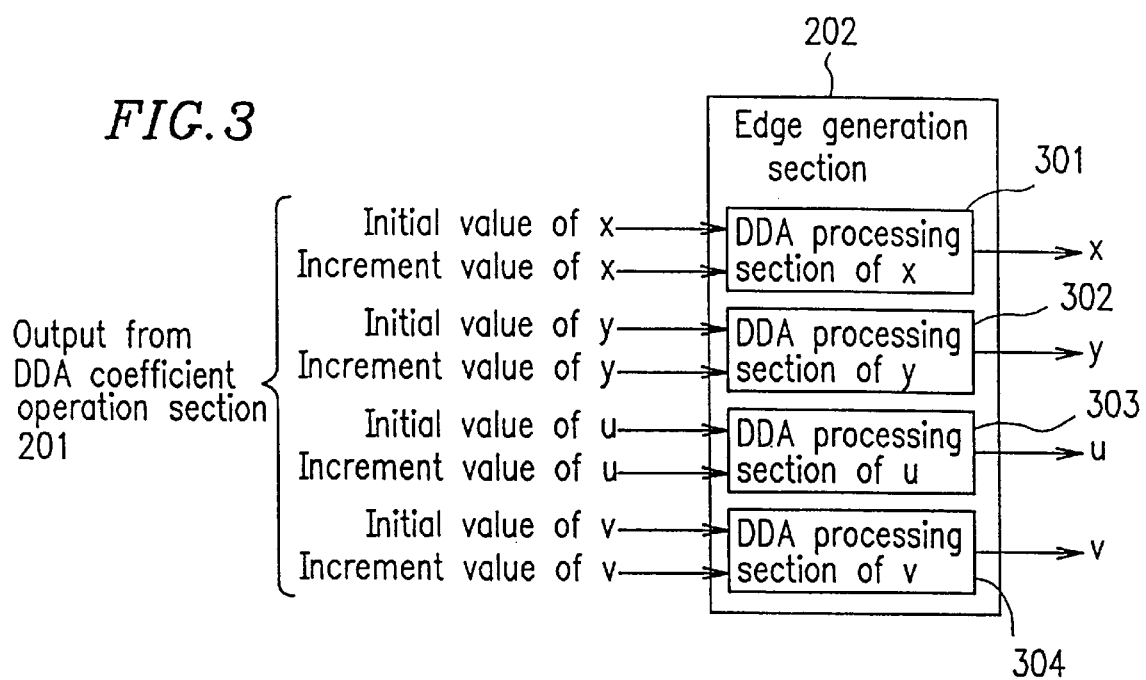
FIG. 3 shows a configuration of an edge generation section of the mapping apparatus according to the present invention.

As shown in FIG. 3, the edge generation section 202 includes DDA processing sections 301, 302, 303, and 304 for values x, y, u, and v, respectively. The DDA processing sections 301, 302, 303, and 304 calculate coordinates (x,y, u,v) of a point on a polygon edge using the differential value of y calculated by the DDA coefficient operation section 201. Specifically, the processing represented by Expression 29 below is conducted.

$$(x_{(n+1)}, y_{(n+1)}, u_{(n+1)}, v_{(n+1)}) = (x_{(n)}, y_{(n)}, u_{(n)}, v_{(n)} + (dx/dy, 1, du/dy, dv/dy) \quad (29)$$

In Expression 29, $(x_{(n+1)}, y_{(n+1)}, u_{(n+1)}, v_{(n+1)})$ represents coordinates of a point on the polygon edge on a scan line immediately below the scan line on which the coordinates $(x_{(n)}, y_{(n)}, u_{(n)}, v_{(n)})$ is located. The values dx/dy, du/dy, and dv/dy are calculated by the DDA coefficient operation section 201 and supplied to the edge generation section 202.

Figure 4:
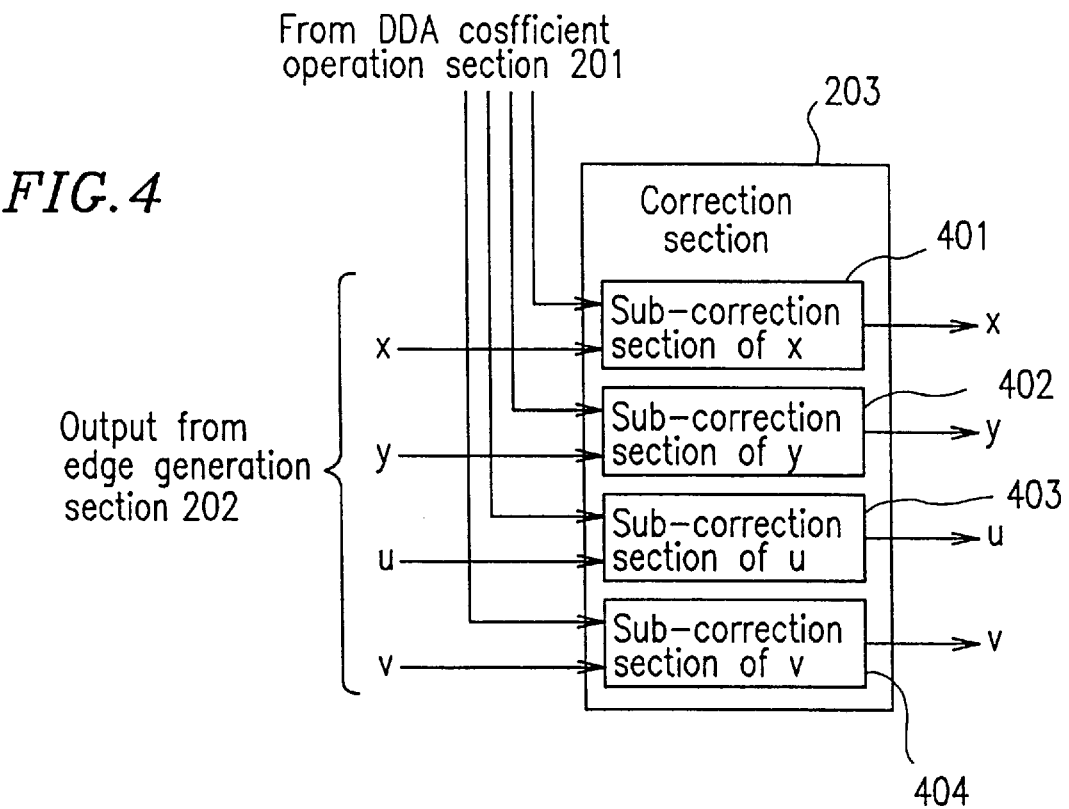
FIG. 4 shows a configuration of a correction section of the mapping apparatus according to the present invention.

As shown in FIG. 4, the correction section 203 includes sub-correction sections 401, 402, 403, and 404 for the values x, y, u, and v, respectively. The sub-correction sections 401, 402, 403, and 404 conduct the correction represented by Expression 32. Values du/dy, ∂u/∂x, and the like required for the correction are calculated by the DDA coefficient operation section 201.

Figure 5:
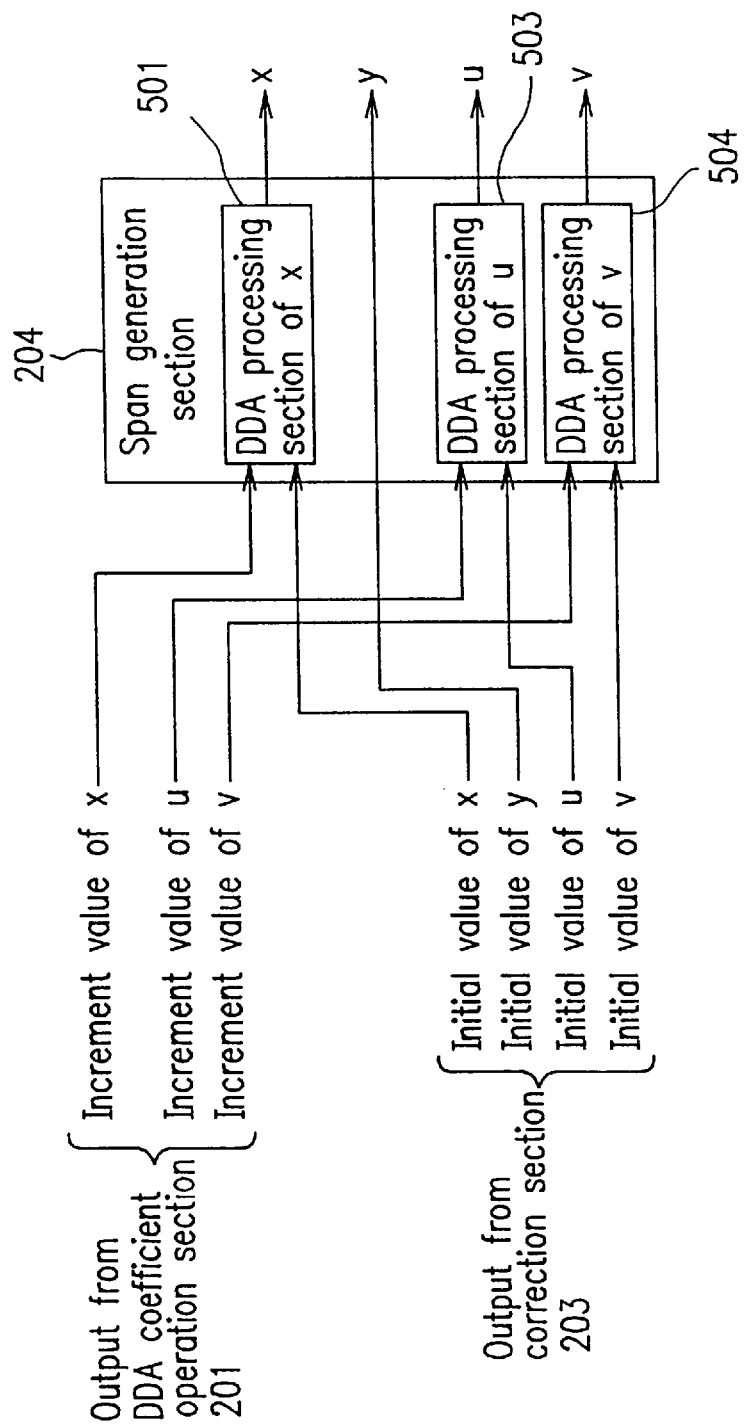
FIG. 5 shows a configuration of a span generation section of the mapping apparatus according to the present invention.
Figure 6:
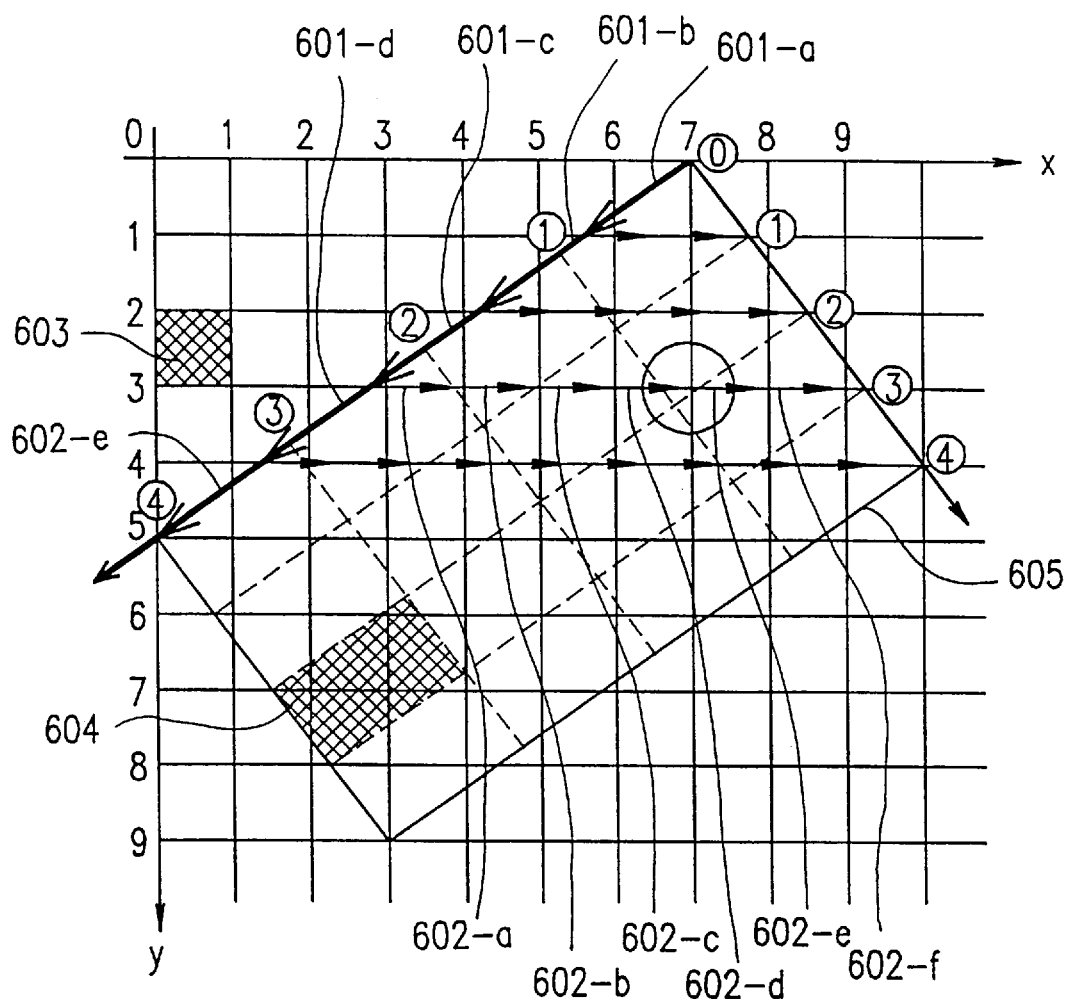
FIG. 6 is a view showing a displacement of a texture due to a quantization error in value x.

As shown in FIG. 5, the span generation section 204 includes DDA processing sections 501, 503, and 504 for the values x, a, and v, respectively. No DDA processing section is required for the value y since the value y does not change in the span processing.

The DDA processing sections 501, 503, and 504 calculate coordinates (x,y,u,v) of a point on a polygon edge using the differential value of y calculated by the DDA coefficient operation section 201. Specifically, the processing represented by Expression 30 below is conducted.

$$(x_{(n+1)}, y_{(n+1)}, u_{(n+1)}, v_{(n+1)}) = (x_{(n)}, y_{(n)}, u_{(n)}, v_{(n)} + (1, 0, \partial u/\partial x, \partial v/\partial x) \quad (30)$$

In Expression 30, $(x_{(n-1)}, y_{(n+1)}, u_{(n+1)}, v_{(n+1)})$ represent texture coordinates of a point in a pixel next to the pixel where the point of the coordinates $(x_{(n)}, y_{(n)}, u_{(n)}, v_{(n)})$ is located in the span direction.

The pixel memory 4 includes a generated image storing section 205 and an original image storing section 206. The generated image storing section 205 stores an image depicted by the rendering processor 3, while the original image storing section 206 stores an original image (texture) to be depicted by the rendering processor 3.

Figure 7:
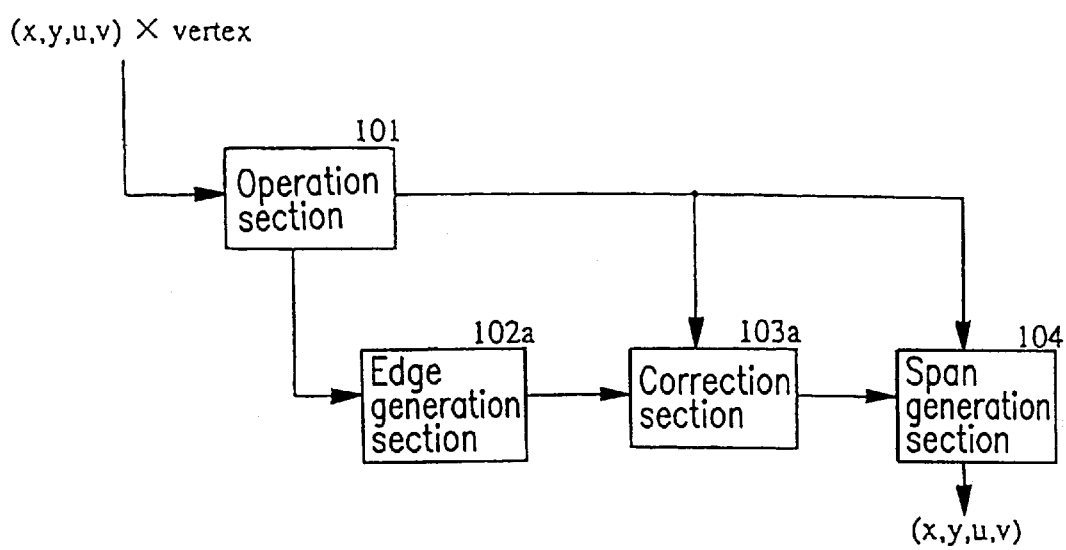
FIG. 7 shows a configuration of an address generation section of the mapping apparatus of Example 1 according to the prevent invention.

FIG. 7 shows a configuration of the address generation section of the mapping apparatus of Example 1. The address generation section includes an operation section 101, an edge generation section 102a, a correction section 103a, and a span generation section 104. The operation section 101 calculates a parameter used for calculating a depicting point inside a polygon and a corresponding point according to the incremental algorithm using the position of a vertex of the polygon and the corresponding point to the polygon vertex. The edge generation section 102a calculates the positions of the depicting point and the corresponding point on a polygon edge using the parameter calculated by the operation section 101. The correction section 103a corrects the corresponding point (texture image) generated by the edge generation section 102a using the parameter calculated by the operation section 101 and the depicting point determined by the edge generation section 102a. The span generation section 104 calculates the polygon span depicting point and the corresponding point using the parameter calculated by the operation section 101 and the data generated by the correction section 103a.

The operation of the address generation section of the mapping apparatus with the above configuration will now be described.

Figure 8:
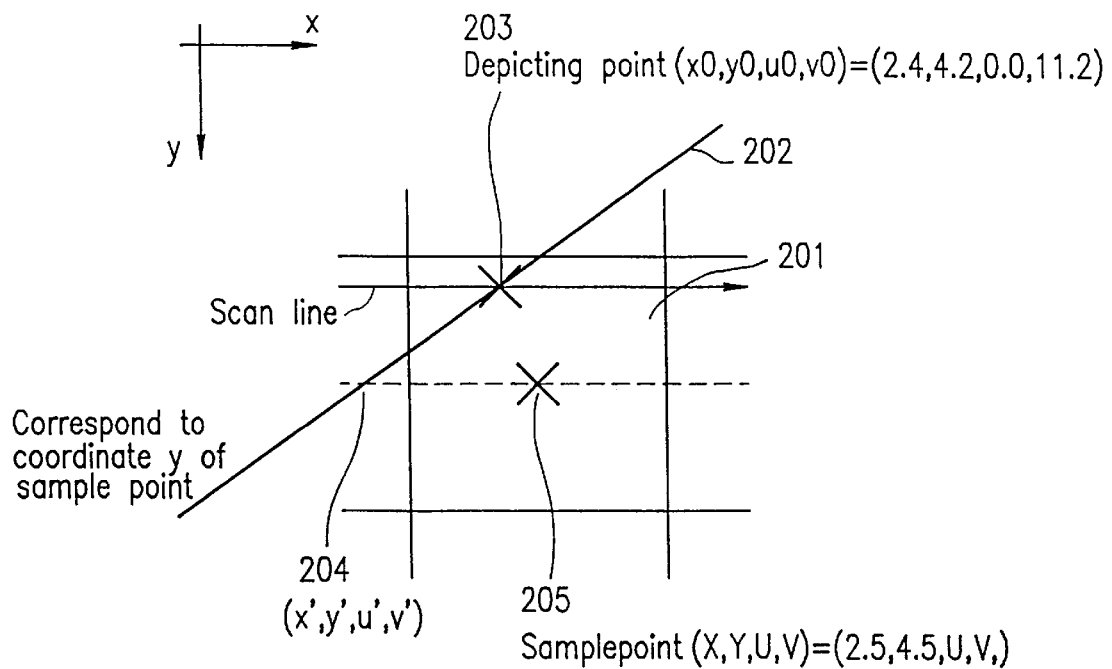
FIG. 8 is a view showing the parameter correction in Example 1.
Figure 37:
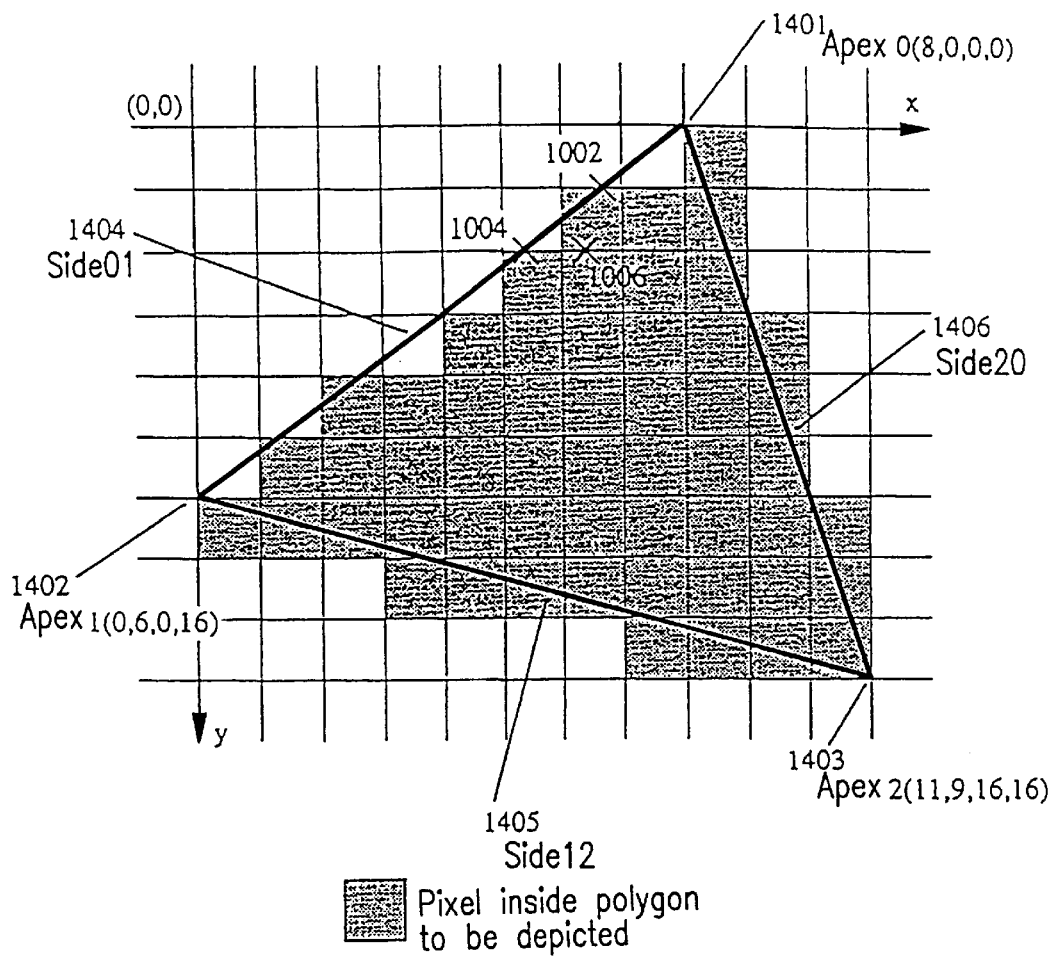
FIG. 37 is a view showing a polygon used in the mapping using the incremental algorithm.
Figure 38:
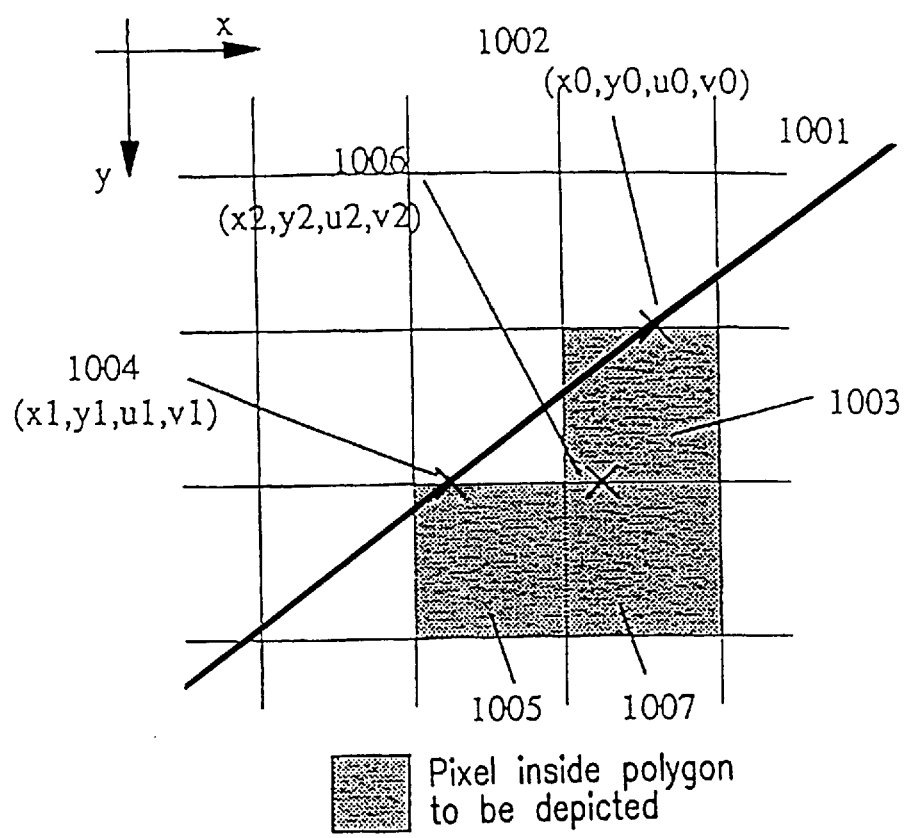
FIG. 38 is a view showing the corresponding point calculation for the texture mapping using the incremental algorithm.
Figure 39:
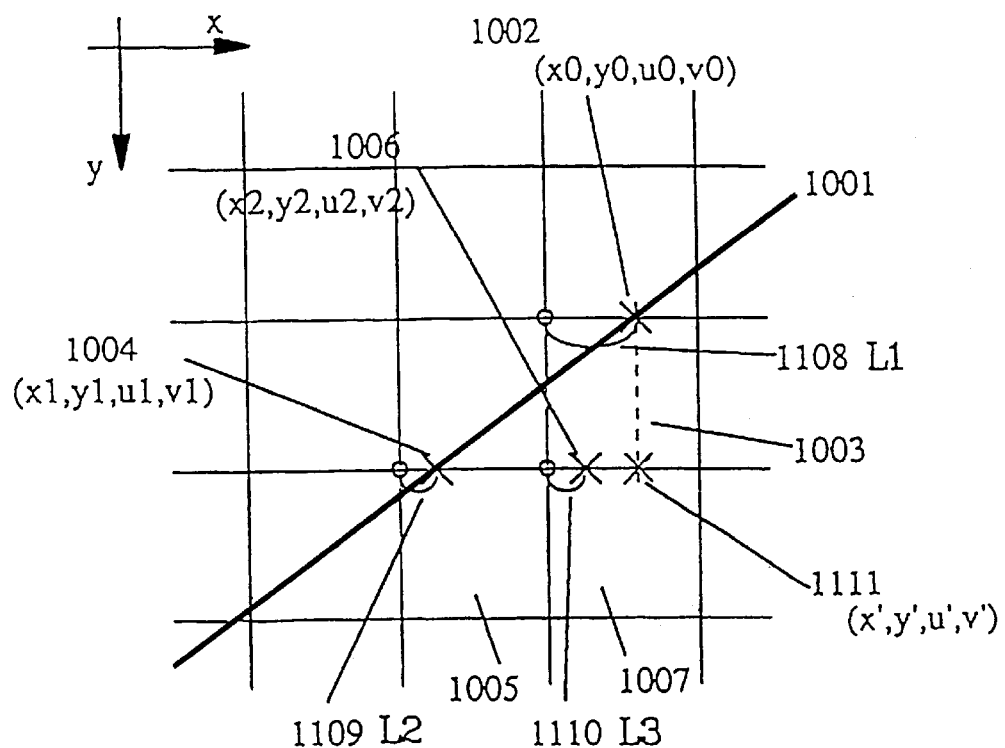
FIG. 39 is a view showing depicting points of pixels generated using the incremental algorithm and ideal sample points of the pixels.
Figure 40A:
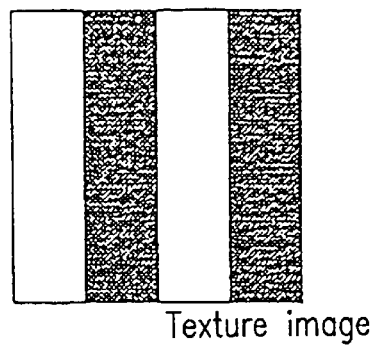
FIGS. 40A to 40C are views showing a texture image, a degraded image, and an ideal image in the mapping, respectively.
Figure 40B:
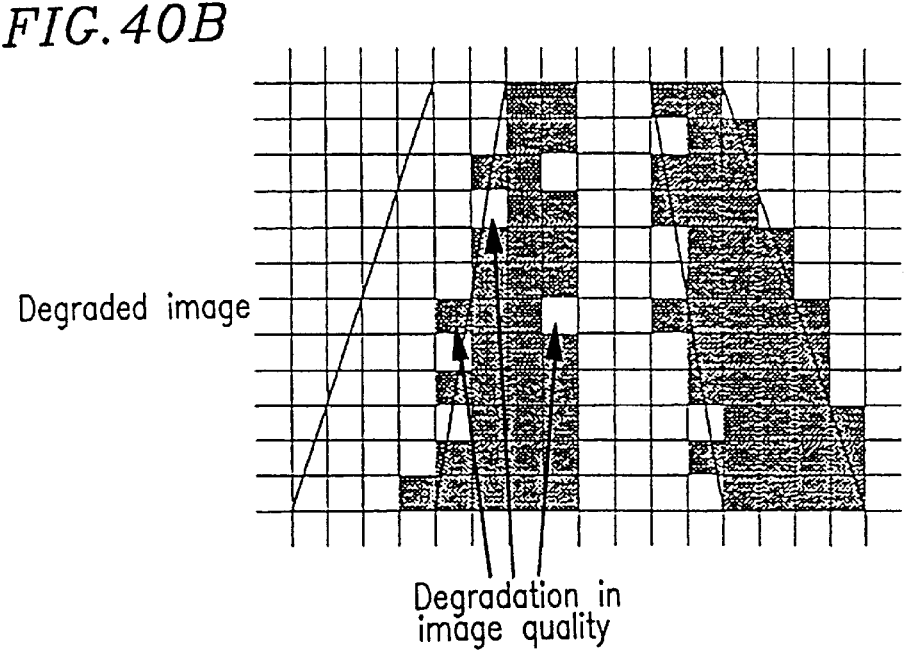
Figure 40C:
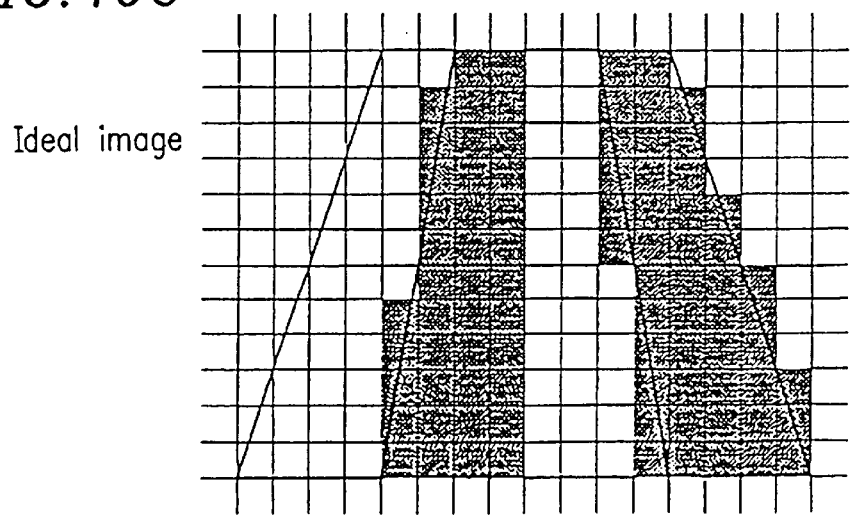

FIG. 8 is an enlarged view of a pixel across which the side 1404 shown in FIG. 37 runs. The pixel shown in FIG. 8 corresponds to the portion defined by the coordinates (x,y) =(2,4), (2,5), (3,5), and (3,4). The reference numeral 201 denotes a pixel on the screen, and the reference numeral 202 denotes an edge of a polygon which is formed on the right side thereof. The reference numeral 203 denotes an edge depicting point $(x_{0}, y_{0})$ before correction generated by the edge generation section 102a. The reference numeral 204 denotes a sample point (X,Y) of the pixel 201. The reference numeral 205 denotes a point (x',y') used for describing the correction by the correction section 103a. The point 205 is located on the polygon edge 202 and y'=Y. The relationship represented by Expressions 1 and 2 is established between a point (x,y) on the polygon and a point (u,v) on a texture image. The corresponding points on the texture image corresponding to the edge depicting point 203, the sample point 204, and the point 205 are represented by ($u_0,v_0$), (U,V), and (u',v'), respectively.

The relationship represented by Expressions 31 and 32 below is established among these corresponding points (see Expressions 4 and 7).

$$(u',v') = (u_0 + du/dy \times (Y-y_0), v_0 + dv/dy \times (Y-y_0)) \quad (31)$$

$$(U, V) = (u' + \partial u/\partial x \times (X-x'), v' + \partial v/\partial x \times (X-x')) \quad (32)$$

Also, since Expression 33 below is satisfied, the relationship represented by Expression 34 below is established between the corresponding points ($u_0,v_0$) and (U,V).

$$x' = x_0 + dx/dy \quad (33)$$

$$(U, V) = (u_0 + du/dy \times (Y-y_0) + \partial u/\partial x \times (X - x_0 - dx/dy), \quad (34)$$
$$v_0 + dv/dy \times (Y-y_0) + \partial v/\partial x \times (X - x_0 - dx/dy))$$

More specifically, when the sample point is the center of the pixel, (X,Y)=(2.5,4.5), the y coordinate of the depicting point is calculated to be 4.20, ($x_0,y_0,u_0,v_0$)=(2.40, 4.20, 0.00, 11.20).

Accordingly, from Expressions 34, 5, and 8, (U,V)=(1.53, 11.24).

The polygon is the same as that described in the prior art, and the values of dx/dy, du/dy, dv/dy, $\partial u/\partial x$, and $\partial v/\partial x$ may be the same as those in the prior art. By calculating the pixel value of the texture using the values of (U,V), the correct pixel value can be reflected on the screen pixel. More specifically, an ideal corresponding point of the pixel 201 can be calculated by correcting the corresponding point ($u_0,v_0$) for the edge depicting point 203 ($x_0,y_0$) generated by the edge generation section 102a to the corresponding point (U,V) for the sample point 204 (X,Y) by the correction section 103a (see Expression 34). Further, by ideally calculating the corresponding point of a pixel at the head of the polygon span, the corresponding points of pixels included in the polygon span can be ideally calculated (see Expression 7).

Figure 9:
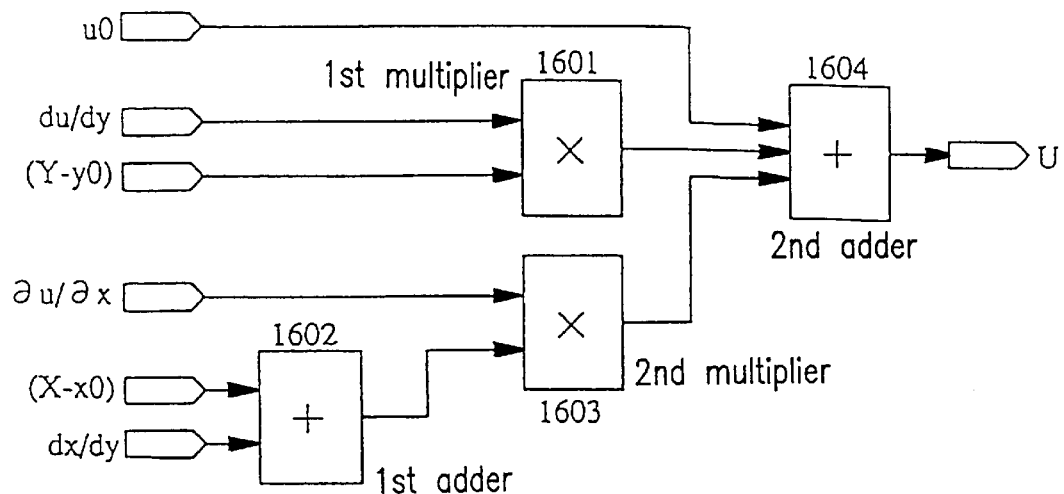
FIG. 9 shows a configuration of a correction section in Example 1.

Referring to FIG. 9, the configuration of the correction section 103a will be described. FIG. 9 only shows the configuration of the correction section 103a with regard to the texture coordinate u, since the correction for the texture coordinate v is substantially the same as that for the texture coordinate u. In Expression 34 above, (Y-$y_0$) and (X-$x_0$) respectively will not exceed 1 and are defined by the sample point of the pixel. Namely, $$Y - y_0 = \text{decimal part of } Y - \text{decimal part of } y_0 =$$
$$0.5 - \text{decimal part of } y_0$$
$$X - x_0 = \text{decimal part of } X - \text{decimal part of } x_0 =$$
$$0.5 - \text{decimal part of } x_0.$$

Referring to FIG. 9, a first multiplier 1601 calculates the second term of Expression 34 representing U. A first adder 1602 calculates (X-$x_0$+dx/dy) of the third term of Expression 34 representing U. A second multiplier 1603 calculates the third term of Expression 34 representing U. A second adder 1604 adds the first, second, and third terms to obtain the value of U. Substantially the same configuration as the above can be used for the coordinate v. With the above configuration, the correction represented by Expression 34 can be conducted, and thus the correction section 103a of this example can be realized.

Thus, according to this example, the corresponding point for the edge depicting point generated by the edge generation section 102a can be corrected by the correction section 103a. By this correction, an ideal corresponding point for a pixel including the depicting point can be calculated. If the head of span depicting points, i.e., the edge depicting point is an ideal corresponding point, ideal corresponding points for pixels included in the polygon span can be calculated. In other words, ideal corresponding points for all the pixels included in the polygon can be calculated, resulting in improving the quality of mapping images.

The some variables used in the conventional incremental algorithm are used in the correction conducted by the correction section 103a, eliminating the need of producing new variables. Though the entire processing is delayed by the correction, the high-speed processing as a whole can be retained since all the components shown in FIG. 7 can be operated in a pipeline manner.

In this example, the relationship between the polygon and the texture image was represented by Expressions 1 and 2. The relationship represented by Expressions 17 and 18, for example, can also be used to conduct correct corresponding point calculation. In short, the present invention is applicable to any expressions for the calculation of the corresponding points.

In this example, the calculation of corresponding points on an image for polygon mapping was described. The same processing can also be applied to luminance calculation and opacity calculation. As in the case of the corresponding point calculation, these calculations are applicable to any relational expressions.

In this example, the method without anti-aliasing was used. However, the same processing can also be conducted if anti-aliasing is conducted. Also, substantially the same correction can be conducted when subpixel positioning is conducted.

Hereinbefore, the address generation section for determining the position (address) of the corresponding point on the texture image was described with reference to FIG. 7. When the address generation section is used for texture mapping, the apparatus should have the configuration shown in FIG. 10. An address generation section 1701 receives the relationship between the polygon and the texture and generates a polygon address (x,y) on a screen and the corresponding texture address (u,v). A texture image is stored in a texture memory 1702, and an image to be generated is stored in a frame memory 1703. The address generation section 1701 outputs the polygon depicting coordinates (x,y) and the corresponding texture coordinates (u,v). A pixel value (R,G,B) read from the texture memory 1702 in response to the texture coordinates (u,v) is stored in the frame memory 1703. This stored address is determined based on the coordinates (x,y) output from the address generation section 1701.

Figure 11:
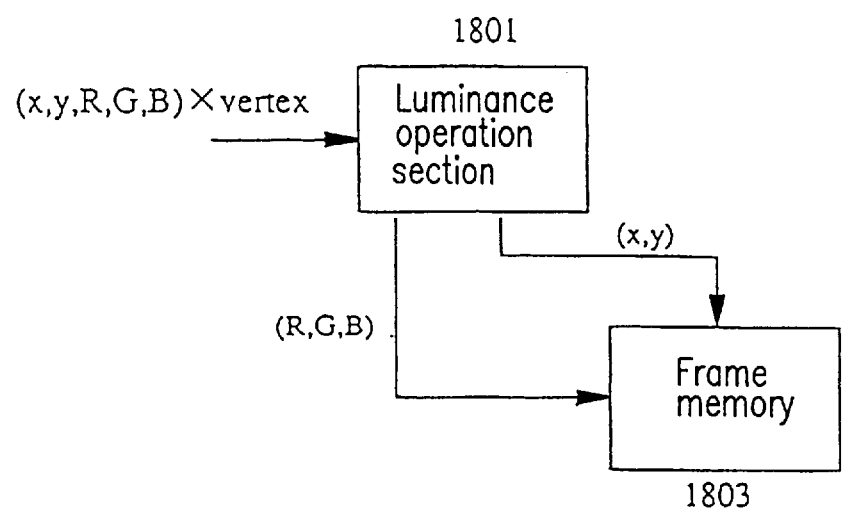
FIG. 11 shows a configuration of a luminance mapping apparatus according to the present invention.

When the present invention is used for luminance mapping (shading), the configuration shown in FIG. 11 is employed. A luminance operation section 1801 receives the relationship between the polygon and the luminance in the polygon, and generates a polygon address (x,y) on a screen and the corresponding pixel value (R,G,B) representing the color of the corresponding polygon. A generated image is stored in a frame memory 1603. The polygon depicting coordinates and the corresponding pixel values (R,G,B) are output from the luminance operation section 1801. The output pixel values (R,G,B) are stored in the frame memory 1803. The store address is determined based on the coordinates (x,y) output from the luminance operation section 1801.

Other types of mapping for opacity, bump, displacement, and the like can also be realized by mapping apparatuses having configurations similar to the above.

In the following examples, as in Example 1, the present invention can be applicable to, not only texture mapping, but also mapping for texture, luminance, opacity, bump, displacement, and the like, though not specifically mentioned.

EXAMPLE 2

The second example of the mapping apparatus of the present invention will be described with reference to FIGS. 12 and 13. The configuration of the apparatus is the same as that of Example 1. In this example, the point in each pixel nearest to the origin is determined as the sample point, and the edge depicting point and the corresponding point are calculated so that they have the same y coordinate as the sample point. In this way, the correction by the correction section can be conducted one-dimensionally, which simplifies the processing when compared with Example 1.

Figure 12:
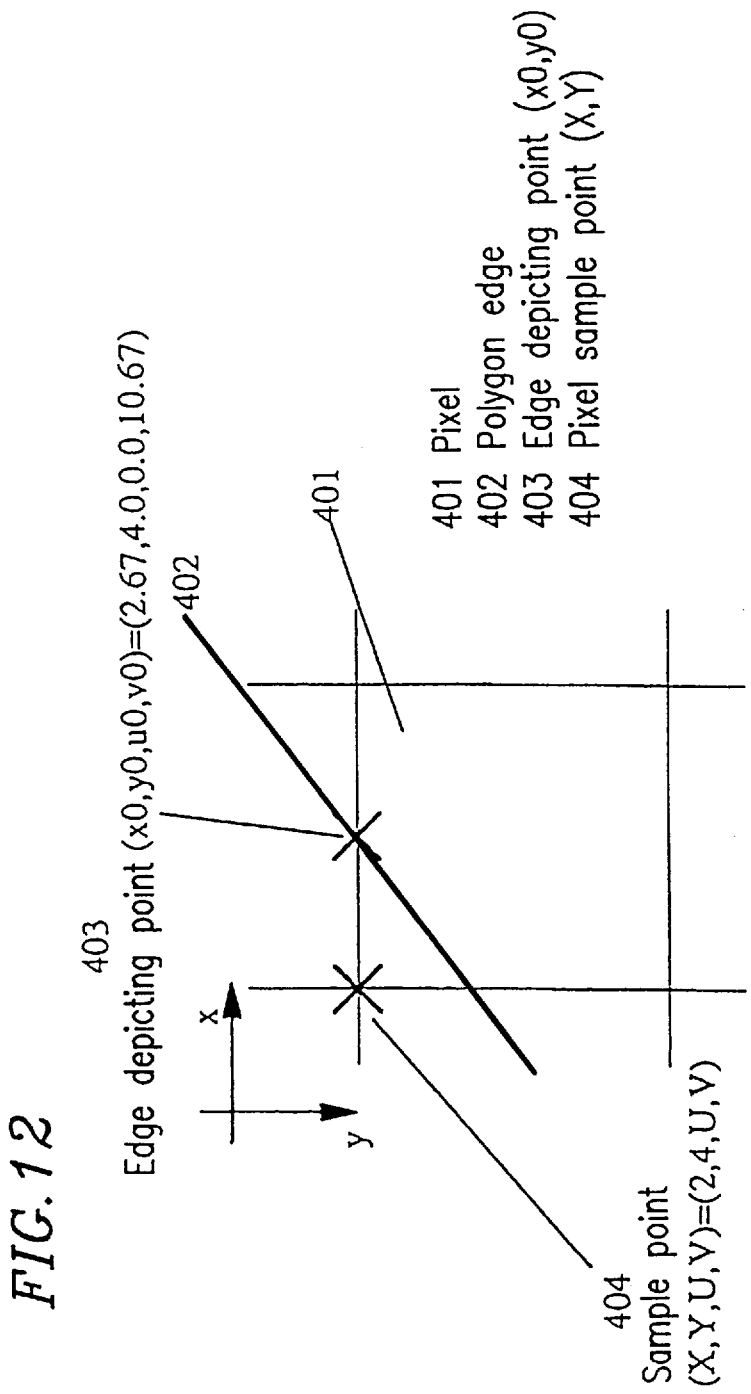
FIG. 12 is a view showing the parameter correction in Example 2 according to the present invention.

FIG. 12 is an enlarged view of a pixel across which the side 1404 shown in FIG. 37 runs. The pixel shown in FIG. 12 corresponds to the portion defined by the coordinates (x,y)=(2,4), (2,5), (3,5), and (3,4). The reference numeral 401 denotes a pixel on the screen, and the reference numeral 402 denotes an edge of a polygon which is formed on the right side thereof. The reference numeral 403 denotes an edge depicting point $(x_0,y_0)$ before correction generated by the edge generation section 102a. The reference numeral 404 denotes a sample point (X,Y) of the pixel 401. The relationship represented by Expressions 1 and 2 is established between a point (x,y) on the polygon and a point (u,v) on a texture image. The corresponding points of the texture image for the edge depicting point 403 and the sample point 404 are represented by $(u_0,v_0)$ and (U,V), respectively.

The relationship represented by Expressions 31 and 32 is established among these corresponding points (see Expressions 4 and 7).

In this example, the point in each pixel nearest to the origin (the upper left corner of the pixel shown in FIG. 12) is determined as the sample point, and the edge depicting point and the corresponding point are calculated so that they have the same y coordinate as the sample point. In this way, the edge point as shown in FIG. 12 can be generated.

At this time, the relationship represented by Expression 35 below is established among these corresponding points (see Expressions 4 and 7).

$$(U, V)=(u_0-\partial u/\partial x \times (x_0-X), v_0-\partial v/\partial x \times (x_0-X)) \quad (35)$$

Since the sample point 404 is the nearest point to the origin in the pixel 401, Expression 36 below is established, and Expression 35 above can be changed to Expression 37 below.

$$(X, Y)=([x_0], y_0) \quad (36)$$

$$(U, V)=(u_0-\partial u/\partial x \times (x_0-[x_0]), v_0-\partial v/\partial x \times (x_0-[x_0])) \quad (37)$$

Specifically, when the sample point is located at the upper left corner of the pixel, (X,Y)=(2.0,4.0) and the y coordinate of the depicting point to be calculated is the same as that of the sample point, $(x_0,y_0,u_0,v_0)=(2.67, 4.00, 0.00, 10.67)$,
and from Expressions 34, 5, and 8,
(U, V)=(−0.71, 11.03).

The resultant value of U is negative. Since the sample point is outside the polygon, having a negative value is rather ideal in the corresponding point calculation.

The polygon is the same as that described in the prior art, and the values of dx/dy, du/dy, dv/dy, $\partial u/\partial x$, and $\partial v/\partial x$ can be the same as those in the prior art. It is possible to reflect the correct pixel value on the screen pixel by calculating the pixel value on the texture image using the value of (U,V). More specifically, the ideal corresponding point of the pixel 401 can be calculated by correcting the corresponding point $(u_0,v_0)$ for the edge depicting point 403 $(x_0,y_0)$ generated by the edge generation section 102a to the corresponding point (U,V) for the sample point 404 (X,Y) by the correction section 103a (see Expression 37). Further, by ideally calculating the corresponding point of a pixel at the head of the polygon span, the corresponding points of pixels included in the polygon span can be ideally calculated (see Expression 7).

Figure 13:
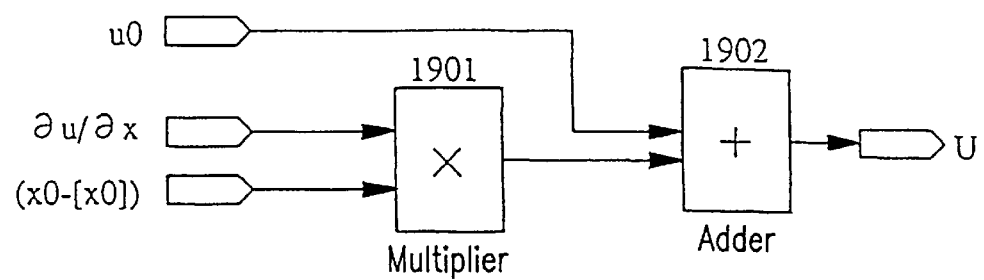
FIG. 13 shows a configuration of a correction section in Example 2.

Referring to FIG. 13, the configuration of the correction address generation section 103a of this example will be described. FIG. 13 only shows the configuration of the correction section 103a with regard to the texture coordinate u, since the correction for the texture coordinate v is the same as that for the texture coordinate u. In Expression 37, $(x_0-[x_0])$ represents the decimal part of $x_0$. Referring to FIG. 13, a multiplier 1901 calculates the second term of Expression 37 representing U. An adder 1902 adds the first and second terms to obtain the value of U. Substantially the same configuration as the above can be used for the coordinate V. With the above configuration, the correction based on Expression 37 can be conducted, and thus the correction section 103a of this example can be realized.

Thus, according to this example, the corresponding point $(u_0,v_0)$ for the edge depicting point 403 $(x_0,y_0)$ generated by the edge generation section 102a can be corrected to the corresponding point (U,V) for the sample point 404 (X,Y) by the correction section 103a (Expression 37). By this correction, the ideal corresponding point for the pixel 401 can be calculated. Further, by ideally calculating the corresponding point of a pixel at the head of the polygon span, the corresponding points of pixels included in the polygon span can be ideally calculated.

Thus, according to this example, the edge generation section 102a generates the edge depicting point having the same y coordinate as the sample point of the pixel and the corresponding point, and the correction section 103a corrects the parameter for the polygon edge generated by the edge generation section 102a. As a result, as in Example 1, the ideal corresponding points can be calculated for all the pixels included in the polygon, and thus the quality of texture mapping images can be improved.

As is observed from the configuration of the correction section 103a shown In FIG. 13, the correction can be realized by one-time multiplication and one-time addition, and the calculation of $(x_0-[x_0])$ can be realized by masking most significant bits. Accordingly, the circuitry can be simplified when compared with the case of Example 1. This means that the delay of the entire processing due to the correction can be extremely reduced. Also, the high-speed processing as a whole can be retained since all the components can be operated in a pipeline manner.

In this example, the sample point of each pixel was the nearest point to the origin. Other locations can also be used for the sample point. For example, the point farthest from the origin can be used as the sample point.

In this example, the relationship between the point on the polygon and the point on the texture was represented by Expression 1 and 2. The relationship represented by Expression 17 and 18, for example, can also be used to conduct correct corresponding point calculation. In short, the present invention is applicable to any expressions for the calculation of the corresponding points.

In this example, the calculation of corresponding points on an image for polygon mapping was described. The same processing can also be applied to luminance calculation and opacity calculation. As in the case of the corresponding point calculation, these calculations are applicable to any relational expressions.

In this example, the method without anti-aliasing was used. However, the same processing can also be conducted if anti-aliasing is conducted. Also, substantially the same correction can be conducted when subpixel positioning is conducted.

EXAMPLE 3

The third example of the present invention will be described with reference to FIGS. 14 to 17.

Figure 14:
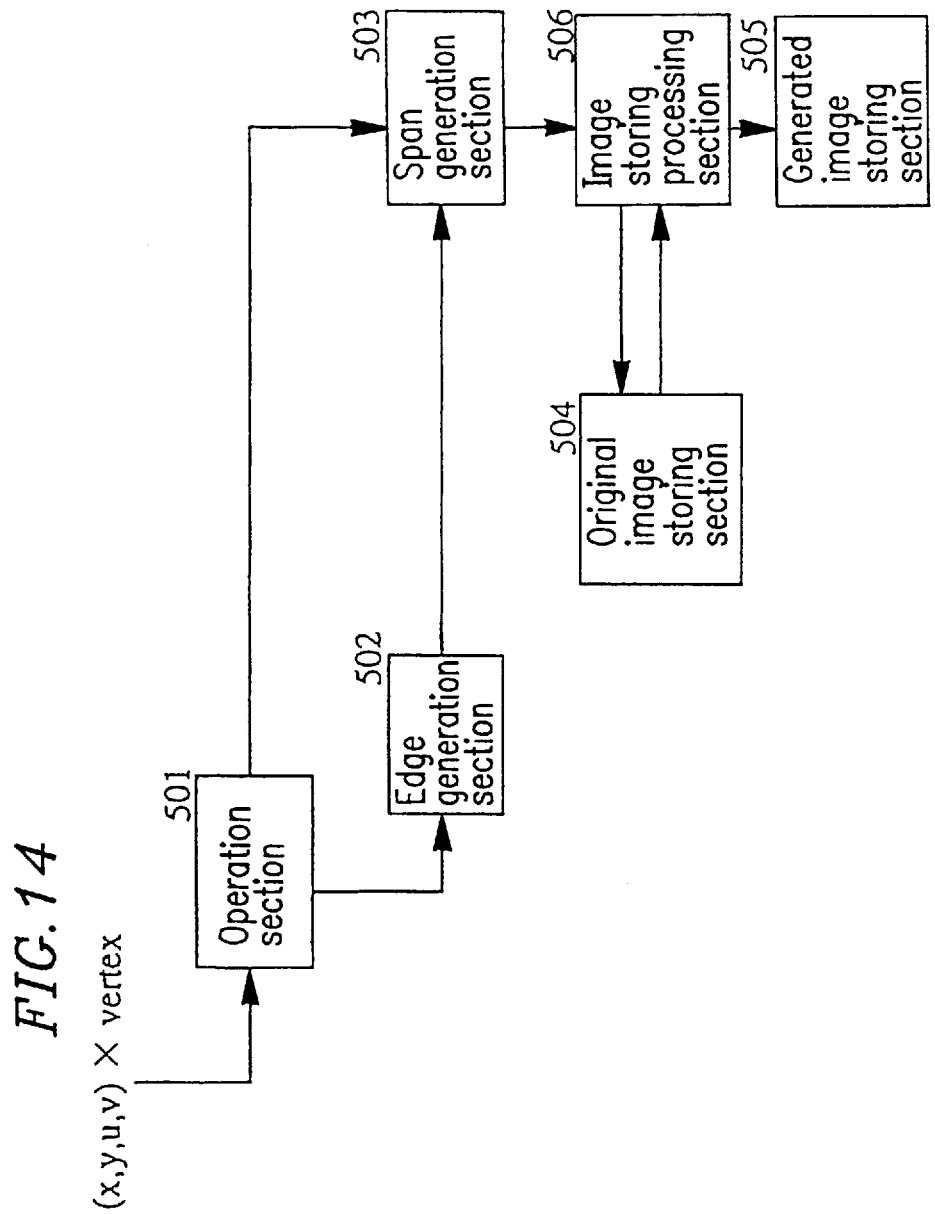
FIG. 14 shows a configuration of the mapping apparatus of Example 3 according to the present invention.

FIG. 14 shows a configuration of the mapping apparatus of Example 3. The mapping apparatus includes an operation section 501, an edge generation section 502, a span generation section 503, an original image storing section 504, a generated image storing section 505, and an image storing processing section 506. The operation section 501 calculates a parameter used for calculating a depicting point inside a polygon and a corresponding point according to incremental algorithm using the position of a vertex of the polygon and the corresponding point to the polygon vertex. The edge generation section 502 calculates the depicting point and the corresponding point on a polygon edge using the data generated by the operation section 501. The span generation section 503 calculates the polygon span depicting point and the corresponding point using the data generated by the operation section 501 and the corresponding point generated by the edge generation section 502. The original image storing section 504 stores an original image (mapping image). The generated image storing section 505 stores a generated image. The image storing processing section 506 stores one piece of pixel data stored in the original image storing section 504 into one or more pieces of adjacent pixel data in the generated image storing section 505 using the data obtained from the open generation section 503.

Figure 15:
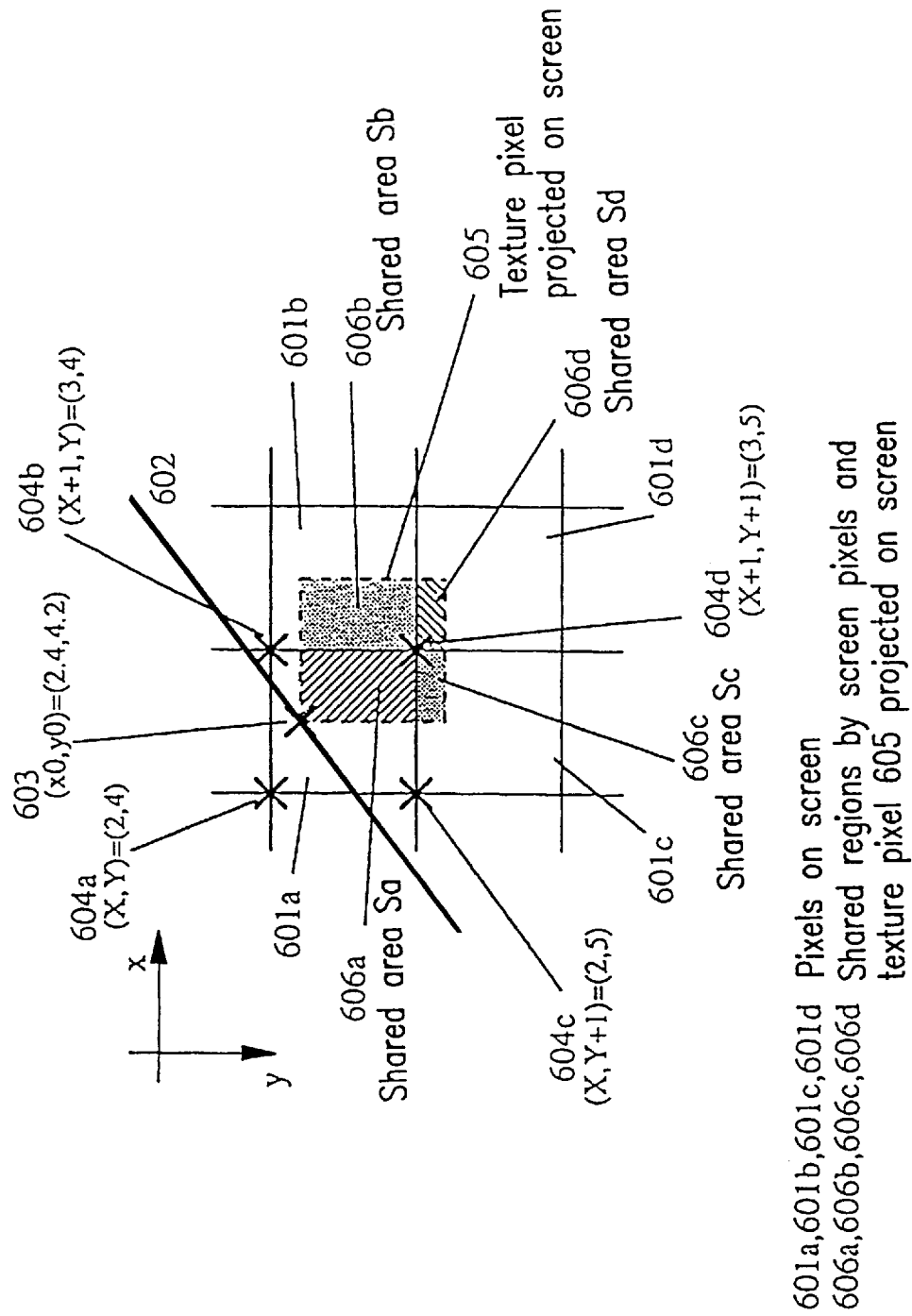
FIG. 15 is a view showing the pixel correction in Example 3.

The operation of the mapping apparatus with the above configuration will now be described, FIG. 15 is an enlarged view of a pixel across which the side 1404 shown in FIG. 37 runs. The pixel shown in FIG. 15 corresponds to the portion defined by the coordinates (x,y)=(2,4), (2,6), (4,6), and (4,4). The reference numerals 601a, 601b, 601c, and 601d denote pixels on the screen, and the coordinates of the points nearest to the origin (the upper left corner) in the respective pixels are (x,y)=(2,4), (3,4), (2,5), and (3,5). The reference numeral 602 denotes an edge (the side 1404) of a polygon which is formed on the right side thereof. The reference numeral 603 denotes a depicting point $(x_0,y_0)=(2.40,4.20)$ generated by the span generation section 503.

In this example, the sample point of each screen pixel is the point nearest to the origin (the upper left corner in FIG. 15). Specifically, the sample point of the pixel 601a is a point $604a$ (X,Y)=(2,4), the sample point of the pixel 601b is a point 604b (X+1,Y)=(3,4), the sample point of the pixel 601c is a point 604c (X,Y+1)=(2,5), and the sample point of the pixel 601d is a point 604d (x+1,Y+1)=(3,5). The reference numeral 605 denotes a texture pixel corresponding to the depicting point 603, showing how the texture pixel is projected on the screen. The texture pixel is read from the original image storing section 504 and assumed to have the same size as the screen pixel.

As described earlier, at the texture mapping, the corresponding point $(u_0,v_0)$ for the depicting point 603 generated by the span generation section 503 is not always the same as the corresponding point for the sample point of the pixel 601a.

In this example, such inconsistency between the corresponding points for the depicting point and the sample point of the pixel is solved by storing data of the pixel to be depicted on the screen in a plurality of pixels on the screen.

More specifically, data of the texture pixel 605 represented by the corresponding point $(u_0,v_0)$ for the depicting point 603 $(x_0,y_0)$ is read from the original image storing section 504. The data of the texture pixel 605 is allocated to the pixels 601a, 601b, 601c, and 601d on the screen and stored therein. This allocation is conducted depending on the area shared by the texture pixel 605 and each screen pixel. Concretely, a weighting coefficient for each screen pixel is calculated depending on its shared area, and the value obtained by multiplying the pixel value of the texture pixel 605 by each weighting coefficient is supplied to each screen pixel. The shared area ratio, for example, may be used as the weighting coefficient.

Referring to FIG. 15, a region 606a of the screen pixel 601a shared with the texture pixel 605 has a shared area Sa, a region 606b of the screen pixel 601b shared with the texture pixel 605 has a shared area Sb, a region 606c of the screen pixel 601c shared with the texture pixel 605 has a shared area Sc, and a region 606d of the screen pixel 601d shared with the texture pixel 605 has a shared area Sd. The shared areas Sa to Sd are represented by Expression 38 to 41 below, respectively.

$$Sa=(1-(x_0-X))\times(1-(y_0-Y)) \quad (38)$$

$$Sb=(x_0-X)\times(1-(y_0-Y)) \quad (39)$$

$$Sc=(1-(x_0-X))\times(y_0-Y) \quad (40)$$

$$Sd=(x_0-X)\times(y_0-Y) \quad (41)$$

Figure 16:
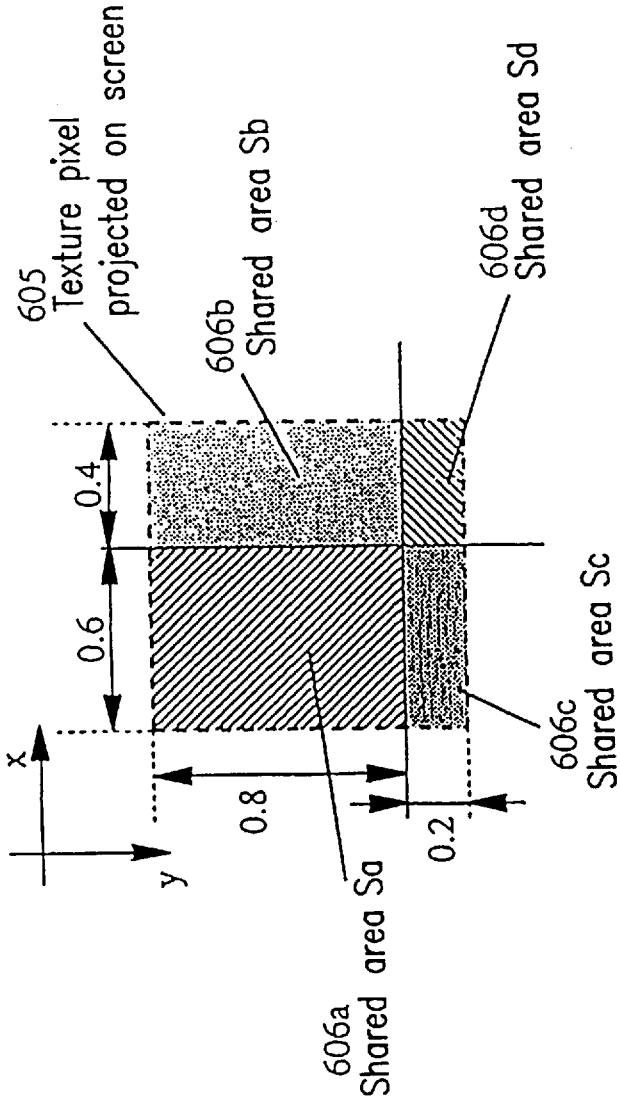
FIG. 16 is an enlarged view of a shared region in Example 3.

The specific shared areas are as follows (see FIG. 16 which is an enlarged view of the four shared regions shown in FIG. 15).

Sa=(1−2.4−2)*(1−4.2−4)=0.6*0.8=0.48
Sb=(2.4−2)*(1−4.2−4)=0.4*0.8=0.32
Sc=(1−2.4−2)*(4.2−4)=0.6*0.2=0.12
Sd=(2.4−2)*(4.2−4)=0.4*0.2=0.08

At this time, when the pixel value of the texture pixel 605 is (R,G,B)=(192,64,32), data stored in the pixels 601a, 601b, 601c, and 601d are (R,G,B)=(92.16, 30.72, 15.36), (61.44, 20.48, 10.24), (23.04, 7.68, 3.84), and (15.36, 5.12, 2.56), respectively.

The above processing is conducted by the image storing processing section 506. The texture data (pixel value) stored in the original image storing section 504 is read and subjected to the above processing for the generated image storing section 505. The original image storing section 504 and the generated image storing section 505 are implemented by memories, for example, while the image storing processing section 506 is implemented by a configuration as shown in FIG. 17.

Figure 17:
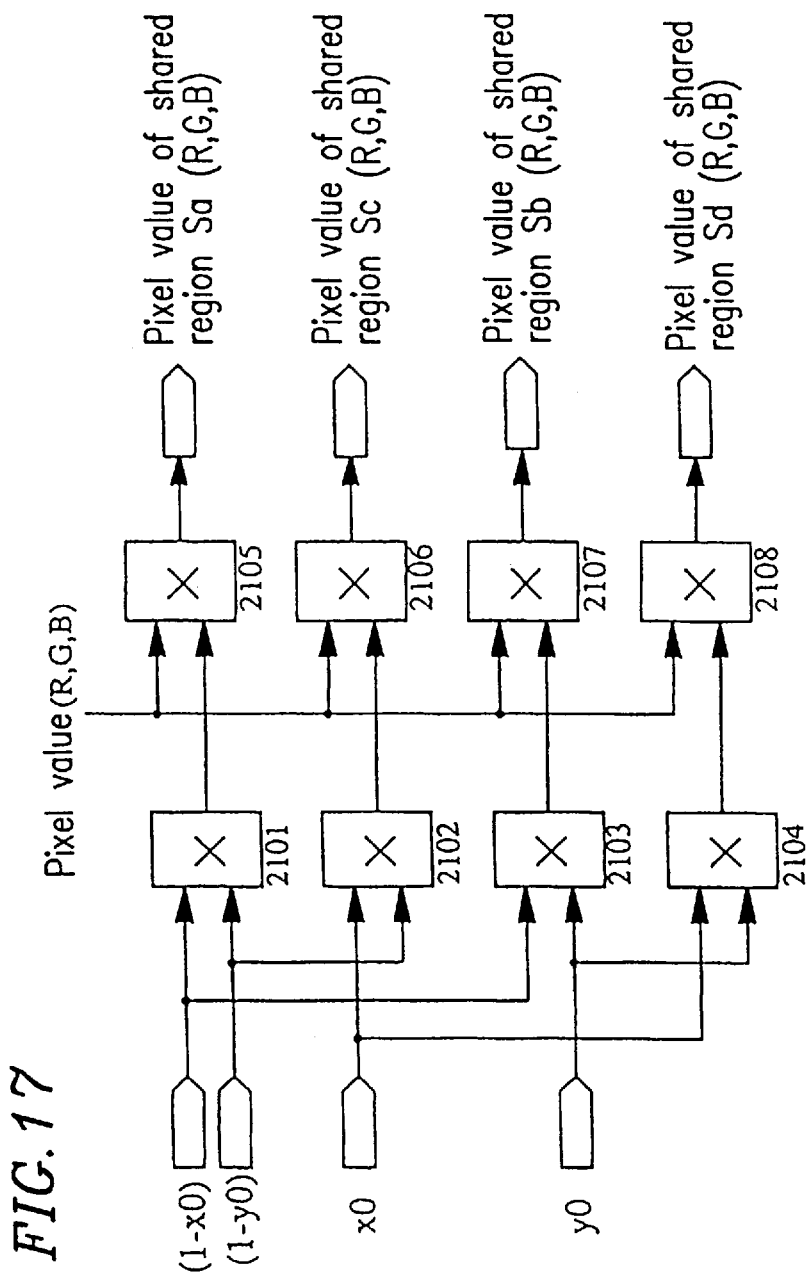
FIG. 17 shows a configuration of a generated image storing section in Example 3.

Referring to FIG. 17, a multiplier 2101 calculates the shared area Sa, a multiplier 2102 calculates the shared area Sc, a multiplier 2103 calculates the shared area Sb, and a multiplier 2104 calculates the shared area Sd. A multiplier 2105 calculates a pixel value to be stored in the pixel 601a, a multiplier 2106 calculates a pixel value to be stored in the pixel 601c, a multiplier 2107 calculates a pixel value to be stored in the pixel 601b, and a multiplier 2108 calculates a pixel value to be stored in the pixel 601d. With this configuration, the image storing processing section 506 is realized.

Thus, according to this example, the value of the texture pixel to be reflected on the screen pixel is allocated to a plurality of screen pixels depending on the displacement of the depicting point from the sample point arising in the incremental algorithm and stored in the screen pixels by the image storing processing section 506. This makes it possible to reflect correct pixel values of the texture on all the pixels on the screen at the texture mapping, realizing correct texture mapping on the screen. Thus, while the position of the depicting point is corrected in Examples 1 and 2, the depicting pixel is corrected in this example.

The operation conducted by the image storing processing section 506 of this example include three processings of: calculating the shared areas of the texture pixel with the screen pixels (Expression 38 to 41); allocating the texture pixel value to the screen pixels depending on the shared areas; and storing the shared texture pixel values in the corresponding screen pixels.

The calculation of the shared areas and the allocation of the pixel value conducted by the multipliers shown in FIG. 17 can be implemented by shifters and adders. In other words, each multiplier in FIG. 17 is not a mere multiplier, but is composed of a shifter and an adder. By lowering the precision required for the above processing, the number of adders can be reduced and thus the delay due to the addition can be reduced. High load is not required for these processings and thus the processing speed is not lowered. In the processing of storing the allocated pixel values to a plurality of screen pixels, since the screen pixels are adjacent One another, the image storing processing section 506 can conduct parallel access to the generated image storing section 505 and/or can be operated in parallel with the other components. Thus, the configuration of the image storing processing section 506 is not complicated, and the processing speed thereof is not lowered.

In this example, the point nearest to the origin was used as the sample point in each pixel. Other locations can also be used for the sample point.

In this example, the y coordinate of the depicting point generated by the edge generation section 502 and the y coordinate of the sample point of the pixel are not the same. The access amount to the generated image storing section 505 can be reduced if the edge generation section 502 is configured to generate a depicting point which has the same y coordinate as the sample point.

In this example, the corresponding point calculation for texture mapping was described. The above processing can also be applied to luminance calculation and opacity calculation. As in the case of the corresponding point calculation, these calculations are applicable to any relational expressions.

In this example, the method without anti-aliasing was used. However, the same processing can also be conducted if anti-aliasing is conducted. Also, substantially the same correction can be conducted when subpixel positioning is conducted.

In this example, one texture pixel has four shared regions with four screen pixels. The number of shared regions will be two at maximum if the depicting point having the same y coordinate as the sample point is generated. This configuration makes it possible to greatly reduce the access amount to the generated image storing section.

EXAMPLE 4

The fourth example of the mapping apparatus according to the present invention will be described with reference to FIGS. 18 to 25.

Figure 18:
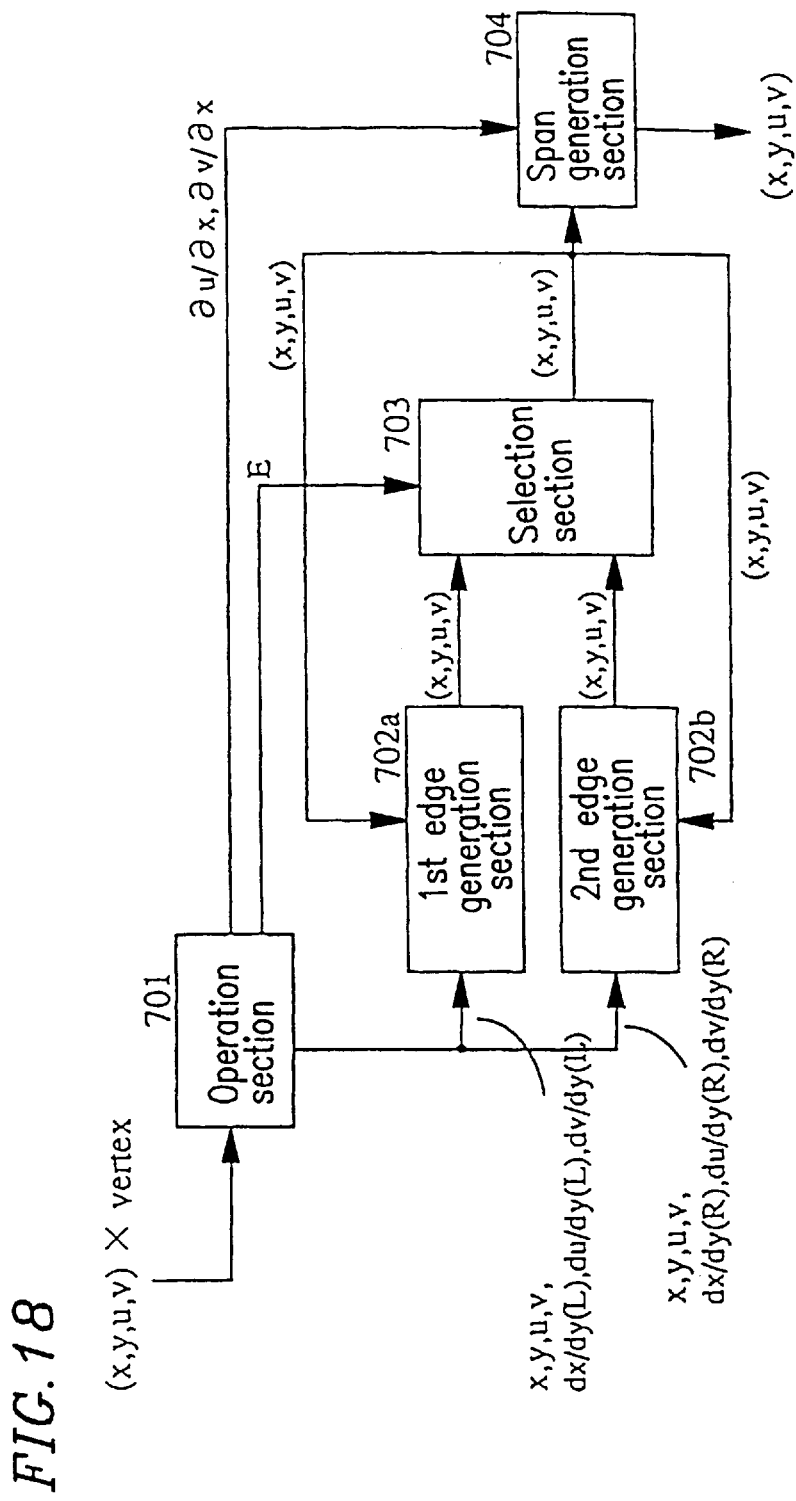
FIG. 18 shows a configuration of an address generation section of the mapping apparatus of Example 4 according to the present invention.

FIG. 18 shows a configuration of an address generation section of the mapping apparatus of Example 4. The address generation section includes an operation section 701, a first edge generation section 702a, a second edge generation section 702b, a selection section 703, and a span generation section 704. The operation section 701 calculates parameters used for the calculation of a depicting point inside a polygon and the corresponding point using the position of a polygon vertex and the corresponding point for the polygon vertex. The first edge generation section 702a calculates a candidate point corresponding to the depicting point on a polygon edge and the corresponding point using the parameter generated by the operation section 701. The second edge generation section 702b calculates a candidate point corresponding to the depicting point on a polygon edge and the corresponding point using the parameter generated by the operation section 701. The selection section 703 selects the result generated by the first edge generation section 702a or the result generated by the second edge generation section 702b, and outputs the selection result to the first and second edge generation sections 702a and 702b. The span generation section 704 calculates the polygon span depicting point and the corresponding point using the parameter calculated by the operation section 701 and the selection result output from the selection section 703, and outputs the calculation result.

The operation of the address generation section of the mapping apparatus with the above configuration will now be described.

Figure 19:
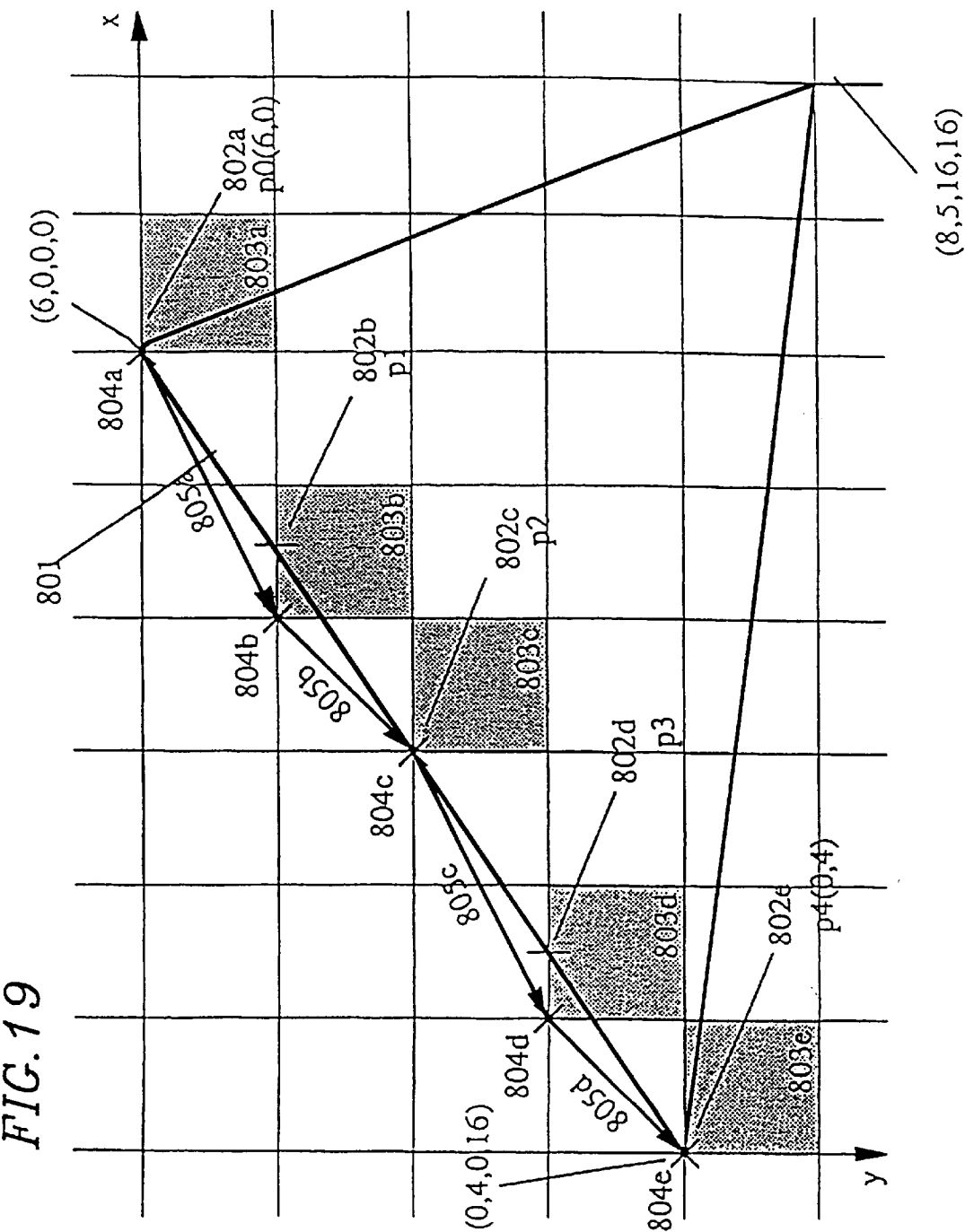
FIG. 19 is a view showing the parameter correction in Example 4.

FIG. 19 shows pixels across which edges of the polygon to be depicted run. The reference numeral 801 denotes an edge of the polygon which is formed on the right side thereof. The relationship represented by Expression 1 and 2 is established between the polygon and a texture. The polygon edge 801 passes a point p0 (6,0) and a point p4 (0,4) on the screen. The first and second edge generation sections 702a and 702b calculate a candidate point corresponding to the edge depicting point and the corresponding point having the same y coordinate as a previously-defined sample point of the same screen pixel. In this example, the point nearest to the origin in each pixel is used as the sample point of the pixel. Points 802a, 802b, 802c, 802d, and 802e are depicting points p0, p1, p2, p3, and p4, respectively, calculated using the incremental algorithm in the scan line direction. Pixels 803a, 803b, 803c, 803d, and 803e are obtained by reflecting the depicting points 802a, 802b, 802c, 802d, and 802e, respectively, and have sample points 804a, 804b, 804c, 804d, and 804e, respectively. Arrows 805a, 805b, 805c, and 805d show shifts of the sample points of the pixels depicted along the polygon edge. The polygon used for the texture mapping is a triangle having vertexes of which screen coordinates and texture coordinates are (x,y,u,v)=(6,0,0,0), (0,4,0,16), and (8,5,16,16).

Figure 20:
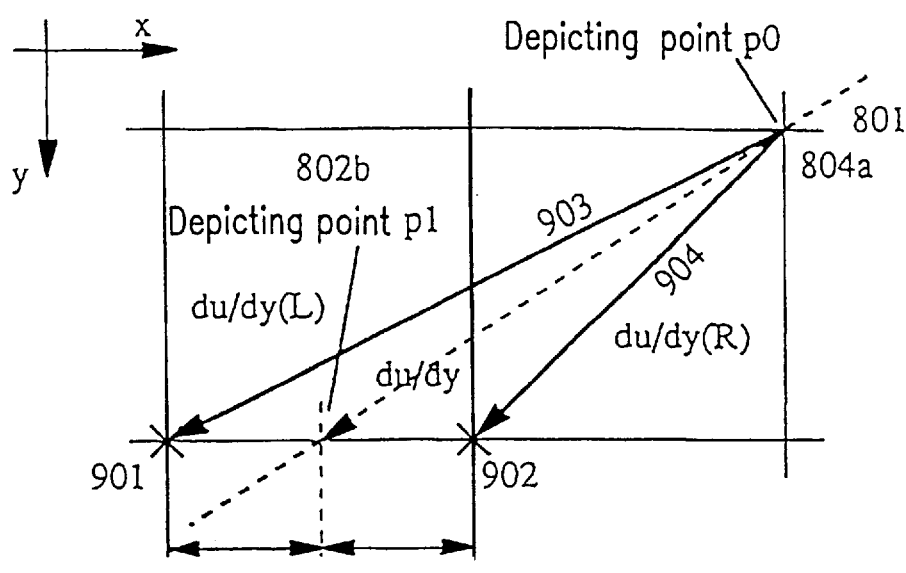
FIG. 20 is an enlarged view showing the parameter correction in Example 4.

FIG. 20 is an enlarged view of the portion in the vicinity of the depicting point p0 (802a) shown in FIG. 19. A point 901 denotes the sample point located nearest to the depicting point 802b on the left side of the depicting point 802b (identical to the depicting point 804b in FIG. 19). Likewise, a point 902 denotes the sample point located nearest to the depicting point 802b on the right side of the depicting point 802b. The sample points 901 and 902 are candidate points of the depicting point 802b. Arrows 903 and 904 represent the shift from the sample point 804a to the sample point 901 and the shift from the sample point 804a to the sample point 902, respectively.

From the distances of the sample points 901 and 902 from the depicting point 802b, the shift in the coordinate u in the arrow 903 (du/dy(L)) is represented by Expression 42 below, while the shift in the coordinate u in the arrow 904 (du/dy (R)) is represented by Expression 43 below. (the shift in the coordinate u of the corresponding point from the sample point 804a to the depicting point 802b is du/dy.)

$$du/dy(L) = du/dy - \partial u/\partial x \times (dx/dy - [dx/dy]) \tag{42}$$

$$du/dy(R) = du/dy + \partial u/\partial x \times (1 - dx/dy - [dx/dy]) \tag{43}$$

The ideal corresponding points for the pixels 803a, 803b, 803c, 803d, and 803e can be calculated by appropriately selecting between the two shifts in the coordinate u of the corresponding point as the sample points 804a, 804a, 804c, 804d, and 804e are shifted in this order. In FIG. 19, du/dy(L) is used for 805a and 805c, while du/dy(R) is used for 805b and 805d for the corresponding point calculation.

The selection between the two shifts in the coordinate u of the corresponding point (du/dy(L) and du/dy(R)) is conducted in the following manner. The error (distance) E in the coordinate x between the depicting point and the sample point is accumulated by E (Expression 46) as the incremental algorithm is repeated, though the accumulated error amount will not exceed 1. Like the coordinate u, the coordinate x of the depicting point and the coordinate v of the corresponding point also have two increments. These are also selected as described above. The two increments in the coordinate x of the depicting point and the coordinate v of the corresponding point are represented by dx/dy(L) and dx/dy(R) and dv/dy(L) and dv/dy(R), respectively, which are calculated by the operation section 701 based on Expressions 44 and 45 below, respectively.

$$dx/dy(L) = [dx/dy]$$

$$dx/dy(R) = [dx/dy] + 1 \tag{44}$$

$$dv/dy(L) = dv/dy - \partial v/\partial x \times (dx/dy - [dx/dy])$$

$$dv/dy(R) = dv/dy + \partial v/\partial x \times (1 - dx/dy + [dx/dy]) \tag{45}$$

The selection between the two increments is conducted by accumulating the difference (error) between the depicting point and the sample point represented by Expression 46 below and using dx/dy(R), du/dy(R), and dv/dy(R) (increment of (R)) when the accumulated error is 1 or more, or using dx/dy(L), du/dy(L), and dv/dy(L) (increment of (L)) when the accumulated error is less than 1.

$$E = dx/dy - [dx/dy] \tag{46}$$

In FIG. 19, when the sample point 804a is shifted to the sample point 804b, an accumulated error $E_0$ in the coordinate x is represented by Expression 47 below, which indicates that the increments of (R) are used for the coordinate x of the depicting point and the coordinates u and v of the depicting point.

$$\begin{aligned} E_0 &= dx/dy - [dx/dy] \\ &= 1.5 - [1.5] \\ &= 0.5 < 1.0 \end{aligned} \tag{47}$$

When the sample point 804b is shifted to the sample point 804c, an accumulated error E1 in the coordinate x is represented by Expression 48 below, which indicates that the increments of (L) are used for coordinate x of the depicting point and the coordinates u and v of the depicting point.

$$\begin{aligned} E_1 &= E_0 + dx/dy - [dx/dy] \\ &= 0.5 + 1.5 - [1.5] \\ &= 1.0 >= 1.0 \end{aligned} \tag{48}$$

When the sample point 804c is shifted to the sample point 804d, an accumulated error E2 in the coordinate x is represented by Expression 49 below, which indicates that the coordinate x of the depicting point and the coordinates u and v of the depicting point.

$$\begin{aligned} E_2 &= E_1 + dx/dy - [dx/dy] \\ &= 0 + 1.5 - [1.5] \; (\because E_1 = E_1 - 1 \text{ since } E_1 \text{ exceeds } 1) \\ &= 0.5 < 1.0 \end{aligned} \tag{49}$$

When the sample point 804d is shifted to the sample point 804e, an accumulated error E3 in the coordinate x is represented by Expression 50 below, which indicates that the increments of (R) are used for coordinate x of the depicting point and the coordinates u and v of the depicting point.

$$\begin{aligned} E_3 &= E_2 + dx/dy - [dx/dy] \\ &= 0.5 + 1.5 - [1.5] \\ &= 1.0 >= 1.0 \end{aligned} \tag{50}$$

More specifically, the corresponding point is calculated in the following manner. First, dx/dy, du/dy, dv/dy, dx/dy, dx/dy(L), du/dy(L), dv/dy(L), dx/dy(L), dx/dy(R), du/dy(R), dv/dy(R), dx/dy(R), $\partial u/\partial x$, and $\partial v/\partial x$ of the three sides constituting the polygon are calculated by the operation section 701 from the relationship between the screen coordinates and the texture coordinates of the polygon used for the texture mapping (the triangle of (x,y,u,v)=(6,0,0,0), (0,4,0,16), (8,5,16,16)). Hereinbelow, as an example, the edge 801 is calculated (Expression 51).

$$dx/dy = -6/4 = -1.5 \tag{51}$$

$$du/dy = -0/4 = 0$$

$$dv/dy = 16/4 = 4$$

$$\begin{aligned} \partial u/\partial x &= -((y_1 - y_0)(u_2 - u_1) - (y_2 - y_1)(u_1 - u_0))/ \\ & \quad ((x_1 - x_0)(y_2 - y_1) - (x_2 - x_1)(y_1 - y_0)) \\ &= -((4 - 0)(16 - 0) - (5 - 4)(0 - 0))/ \\ & \quad ((0 - 6)(5 - 4) - (8 - 0)(4 - 0)) \\ &= 64/38 \end{aligned}$$

$$\begin{aligned} \partial v/\partial x &= -((y_1 - y_0)(v_2 - v_1) - (y_2 - y_1)(v_1 - v_0))/ \\ & \quad ((x_1 - x_0)(y_2 - y_1) - (x_2 - x_1)(y_1 - y_0)) \\ &= -((4 - 0)(16 - 16) - (5 - 4)(16 - 0))/ \\ & \quad ((0 - 6)(5 - 4) - (8 - 0)(4 - 0)) \\ &= -16/38 \end{aligned}$$

-continued $$dx/dy(L) = [dx/dy] = -2.0$$
$$du/dy(L) = 0 - \partial u/\partial x * ((-1.5) - (-2.0))$$
$$= 0 - 16/38 * (0.5)$$
$$= -0.84$$
$$dv/dy(L) = 0 - \partial u/\partial x * ((-1.5) - (-2.0))$$
$$= 4 - (64/38) * (0.5)$$
$$= 4.21$$
$$dx/dy(R) = [dx/dy] + 1 = -1.0$$
$$du/dy(R) = 0 + \partial u/\partial x \times (1 - (-1.5) + (-2.0))$$
$$= 0 + (64/38) \times (0.5)$$
$$= 0.84$$
$$dv/dy(R) = 0 + \partial v/\partial x \times (1 - (-1.5) + (-2.0))$$
$$= 4 + (-16/38) \times (0.5)$$
$$= 3.79$$
$$E = dx/dy - [dx/dy]$$
$$= -1.5 - (-2.0) = 0.5$$

Based on the parameters shown in Expression 51 obtained by the above calculation by the operation section 701, the processings by the first edge generation section 702a, the second edge generation section 702b, and the selection section 703 will be described.

The first edge generation section 702a receives the increment of (L) calculated by the operation section 701 and the screen and texture coordinates (6,0,0,0) at the point p0 as the initial values. The second edge generation section 702b receives the increment of (R) calculated by the operation section 701 and the screen and texture coordinates (6,0,0,0) at the point p0 as the initial values. The selection section 703 receives the difference (error) E between the depicting point calculated by the operation section 701 and the sample point (refer to Expression 51).

The edge generation sections 702a and 702b add an increment to the coordinates (x,y,u,v) of the polygon vertex as the initial values at the initial step or to the coordinates (x,y,u,v) output from the selection section 703 at the subsequent steps. The first edge generation section 702a uses the increments of (L), while the second edge generation section 702b uses the increments of (R), to calculate the coordinates (x,y,u,v) for the next step.

The selection section 703 successively adds the value of E (=dx/dy-[dx/dy]) when the edge points are calculated, thus calculating the accumulated error. The selection section 703 selects the coordinates (x,y,u,v) output from the first edge generation section 702a when the accumulated error is less than 1, or selects the coordinates (x,y,u,v) output from the second edge generation section 702b when the accumulated error is 1 or more.

Figure 21:
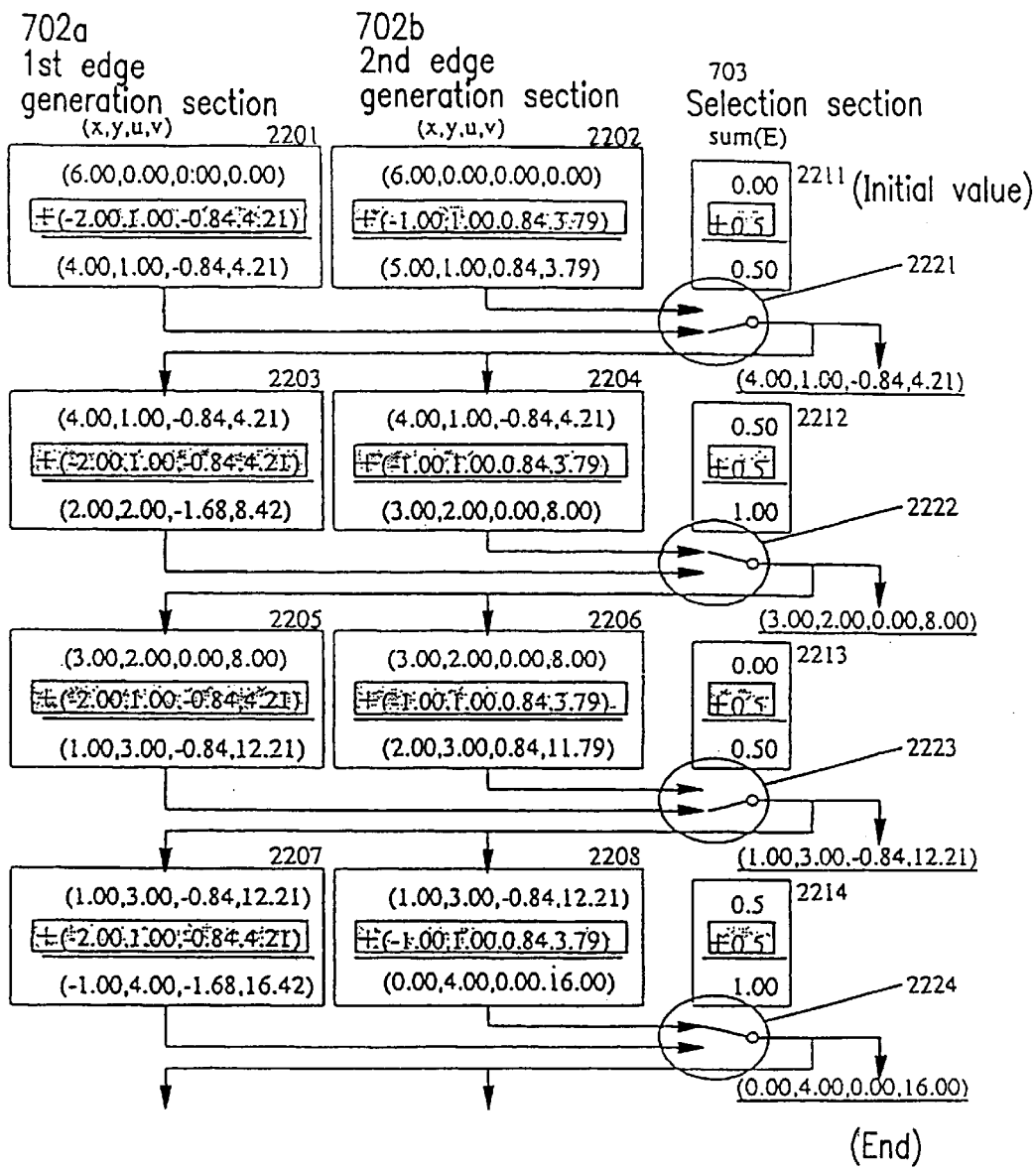
FIG. 21 shows a flow of processings conducted by first and second edge generation sections and a selection section in Example 4.

FIG. 21 shows the flow of the processings conducted by the first edge generation section 702a, the second edge generation section 702b, and the selection section 703.

Referring to FIG. 21, processings 2201, 2203, 2205, and 2207 are conducted by the first edge generation section 702a. Processings 2202, 2204, 2206, and 2208 are conducted by the second edge generation section 702b. Processings 2211, 2212, 2213, and 2214 are conducted by the selection section 703. The selection of data is conducted based on the value obtained in these processings. The reference numerals 2221, 2222, 2223, and 2224 show how the data are selected in the selection section 703. In FIG. 21, the values (data) shown in the half-tone dot meshed regions are values calculated by the operation section 701. Data output from the selection section 703 are underlined.

The calculation of the screen coordinates and the texture coordinates of the points on the polygon will be described as follows. In the following description, the y coordinates of the points p0 to p4 are 0, 1, 2, 3, and 4, respectively.

Step 0

The coordinates (6,0,0,0) of the point p0 as a vertex of the polygon is used as the initial values for the subsequent processings. The values (6,0,0,0) are output from the selection section 703 and the span generation section 704.

Step 1

The initial values for the incremental algorithm are the coordinates (6,0,0,0) of the point p0 as a vertex of the polygon. The first and second edge generation sections 702a and 702b conduct the processings 2201 and 2202, respectively, for adding the increments supplied from the operation section 701.

Simultaneously, the selection section 703 conducts the processing 2211 for accumulating the error E supplied from the operation section 701. After the completion of the processings 2201, 2202, and 2211, the selection section 703 selects data based on the value of the accumulated error E (sum(E) in FIG. 21). Since the value is less than 1 in this case, the coordinates (x,y,u,v) output from the first edge generation section 702a are selected. Specifically, the coordinates (4.00,1.00,-0.84,4.21) are selected (selection at 2221). This corresponds to the calculation of the increment of 805a shown in FIG. 19.

Step 2

The first and second edge generation sections 702a and 702b conduct the processings 2203 and 2204, respectively. The selection section 703 adds the increment to the previously selected data (4.00,1.00,-0.84,4.21).

Simultaneously, the selection section 703 conducts the processing 2212 for accumulating the error E supplied from the operation section 701. After the completion of the processings 2203, 2204, and 2212, the selection section 703 selects data based on the value of the accumulated error E (sum(E) in FIG. 21). Since the value is 1 or more in this case, the coordinates (x,y,u,v) output from the second edge generation section 702b are selected. Specifically, the coordinates (3.00,2.00,0.00,8.00) are selected (selection at 2222). This corresponds to the calculation of the increment of 805b shown in FIG. 19. Since the accumulated error E has exceeded 1, the processing for subtracting 1 from E is simultaneously conducted (error correction).

Step 3

The first and second edge generation sections 702a and 702b conduct the processings 2205 and 2206, respectively. The selection section 703 adds the increment to the previously selected data (3.00,2.00,0.00,8.00).

Simultaneously, the selection section 703 conducts the processing 2213 for accumulating the error E supplied from the operation section 701. After the completion of the processings 2205, 2206, and 2213, the selection section 703 selects data based on the value of the accumulated error E (sum(E) in FIG. 21). Since the value is less than 1 in this case, the coordinates (x,y,u,v) output from the first edge generation section 702a are selected. Specifically, the coordinates (1.00,3.00,-0.84,12.21) are selected (selection at 2223). This corresponds to the calculation of the increment of 805c shown in FIG. 19.

Step 4

The first and second edge generation sections 702a and 702b conduct the processings 2207 and 2208, respectively. The selection section 703 adds the increment to the previously selected data (1.00,3.00,-0.84,12.21).

Simultaneously, the selection section 703 conducts the processing 2214 for accumulating the error E supplied from the operation section 701. After the completion of the processings 2207, 2208, and 2214, the selection section 703 selects data based on the value of the accumulated error E (sum(E) in FIG. 21). Since the value is 1 or more in this case, the coordinates (x,y,u,v) output from the second edge generation section 702*b* are selected. Specifically, the coordinates (0.00,4.00,0.00,16.00) are selected (selection at 2224). This corresponds to the calculation of the increment of 805*d* shown in FIG. 19.

Thus, by conducting the processings in steps 0 to 4, the corrected screen and texture coordinates of the depicting points on the polygon edge can be obtained. In other words, the depicting points and the corresponding points on the polygon edge can be ideally calculated.

Next, the configurations of the first edge generation section 702*a*, the second generation section 702*b*, and the selection section 703 will be described.

Figure 22:
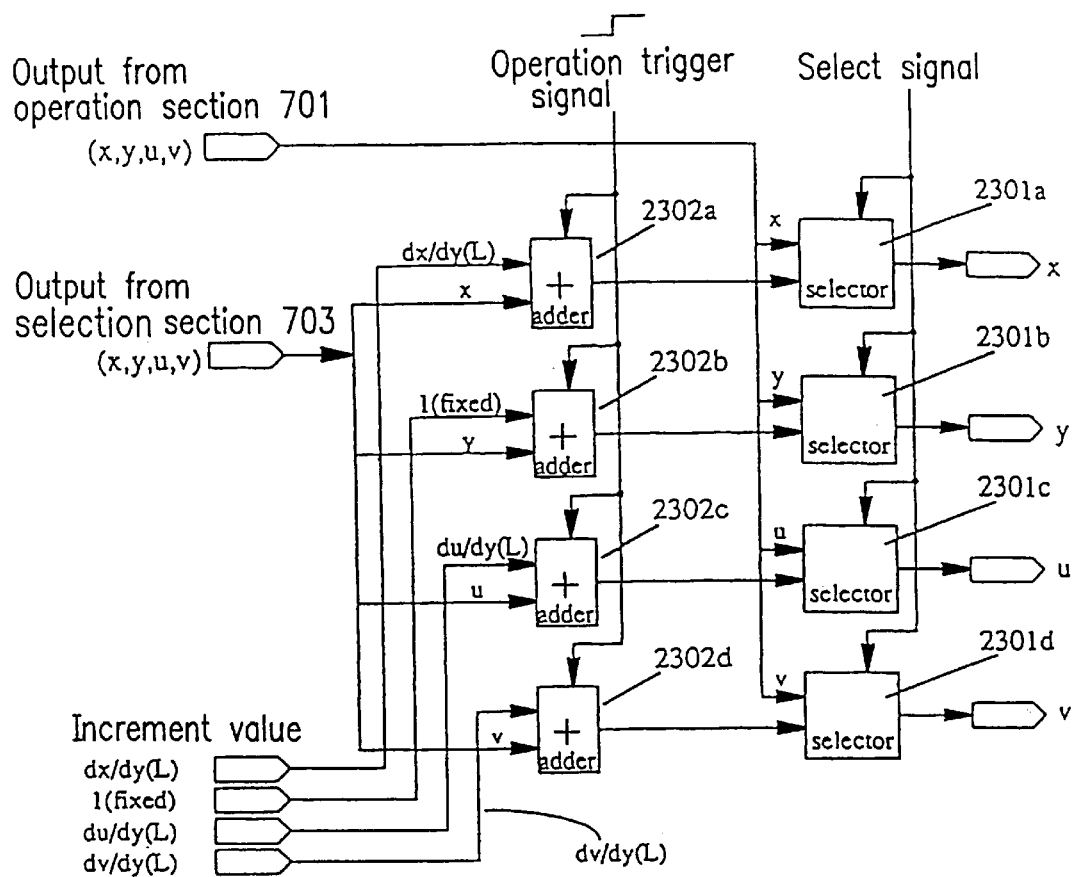
FIG. 22 shows a configuration of the first edge generation section in Example 4.

FIG. 22 shows a configuration of the first edge generation section 702*a*. In the following description, the coordinates (x,y,u,v) output from the operation section 701 are assumed to be integers. In other words, the coordinates of the vertexes of the polygon and the texture used for the mapping are integers. Selectors 2301*a* to 2301*d* select the data (x,y,u,v) output from the operation section 701 or the data (x,y,u,v) output from the adders 2302*a* to 2302*d*, respectively. The selectors 2301*a* to 2301*d* select the values x, y, u, and v, respectively. The selectors 2301*a* to 2301*d* select the coordinates (x,y,u,v) output from the operation section 701 when the first edge point is calculated, or select the data (x,y,u,v) output from the adders 2302*a* to 2302*d*, respectively, for the subsequent processings.

The adder 2302*a* conducts the increment for the coordinate x, adding the increment value dx/dy(L) (see Expression 51) to the value x output from the selection section 703. Likewise, the adder 2302*b* conducts the increment for the coordinate y, adding the increment value 1 to the value y output from the selection section 703. The adder 2302*c* conducts the increment for the coordinate u, adding the increment value du/dy(L) (see Expression 51) to the value u output from the selection section 703. The adder 2302*d* conducts the increment for the coordinate v, adding the increment value dv/dy(L) (see Expression 51) to the value v output from the selection section 703. These increment values do not change until the processing for one edge is completed.

Thus, the first edge generation section 702*a* for conducting the processings 2201, 2203, 2205, and 2207 is implemented. The same configuration can be used for the second edge generation section 702*b* since the processing by the second edge generation section 702*b* is substantially the same as that of the first edge generation section 702*b*. The description on the second edge generation section 702*b* is therefore omitted.

Figure 23:
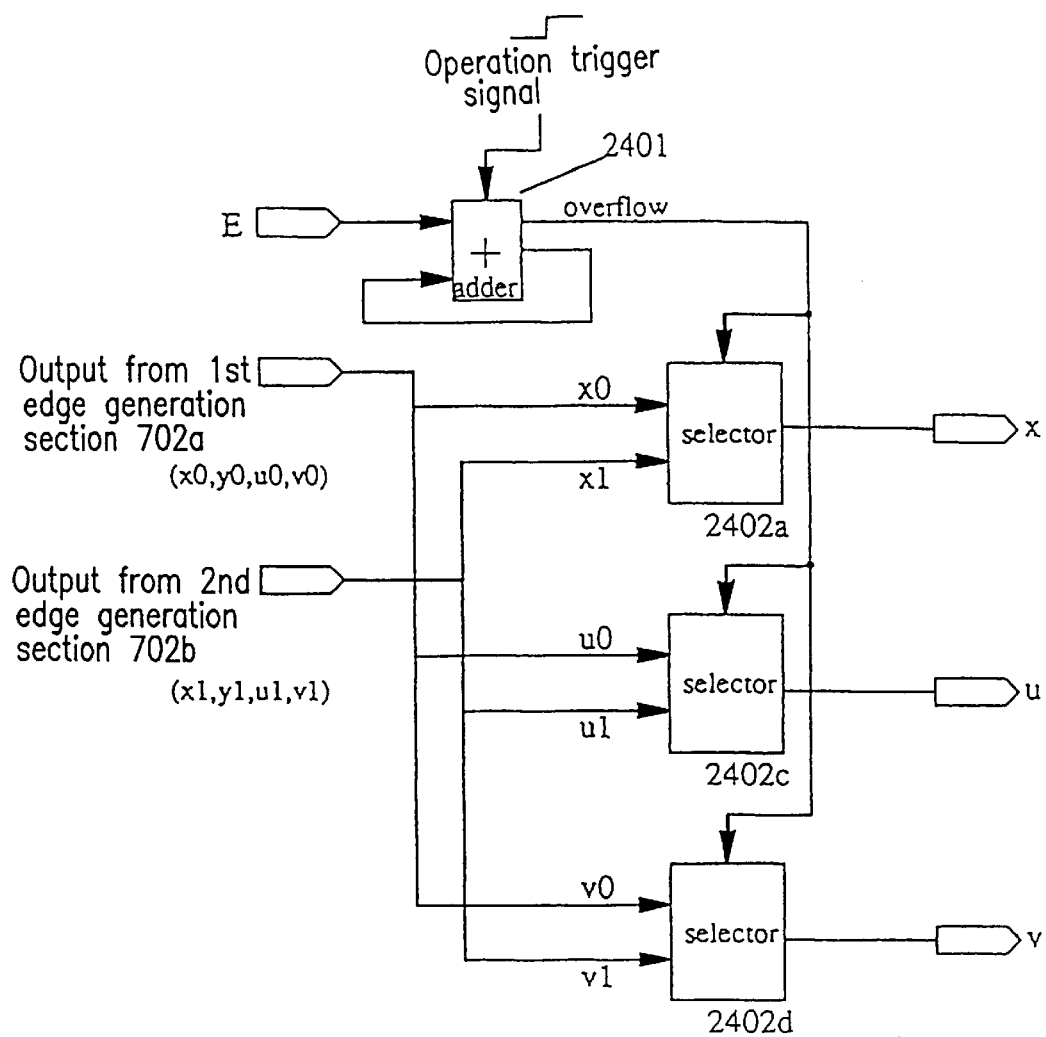
FIG. 23 shows a configuration of the selection section in Example 4.

FIG. 23 shows part of the configuration of the selection section 703. Referring to FIG. 23, an adder 2401 has as an initial value that is the difference (error E) between the depicting point calculated using the incremental algorithm and the sample point of the screen pixel, and accumulates the error E in the coordinate x for every scan line (Expression 51) to obtain the accumulated error sum(E). The error E does not change until the processing for one edge is completed. Selectors 2402*a*, 2402*c*, and 2402*d* select the output from the first edge generation section 702*a* or the output from the second edge generation section 702*b* based on the accumulated error calculated by the adder 2401. The selectors 2402*a*, 2402*c*, and 2402*d* relate the coordinates x, u, and v, respectively. No selector for the coordinate y is provided since the outputs from the first edge generation section 702*a* and the second edge generation section 702*b* are the same.

If the adder 2401 accumulates only the value less than 1, the processings represented by Expression 47 to 50, the processings in steps 0 to 4 above, and the processings 2211 to 2214 shown in FIG. 21 can be realized by detecting whether or not the accumulated result overflows. When the accumulated result overflows, the values (x,y,u,v) output from the second edge generation section 702*b* are selected. When the accumulated result does not overflow, the values (x,y,u,v) output from the first edge generation section 702*a* are selected.

Figure 24:
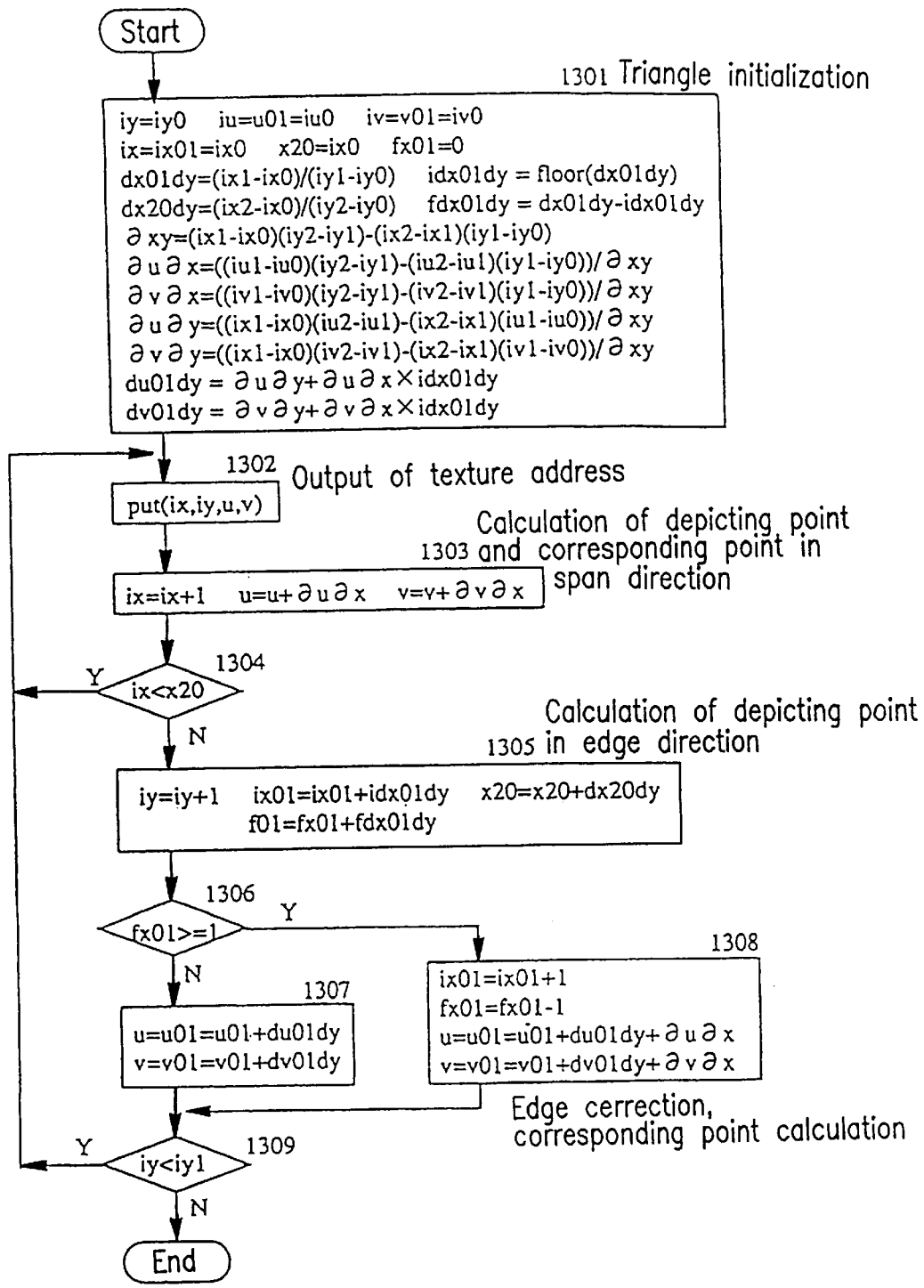
FIG. 24 is a flowchart showing the processings in Example 4.
Figure 25:
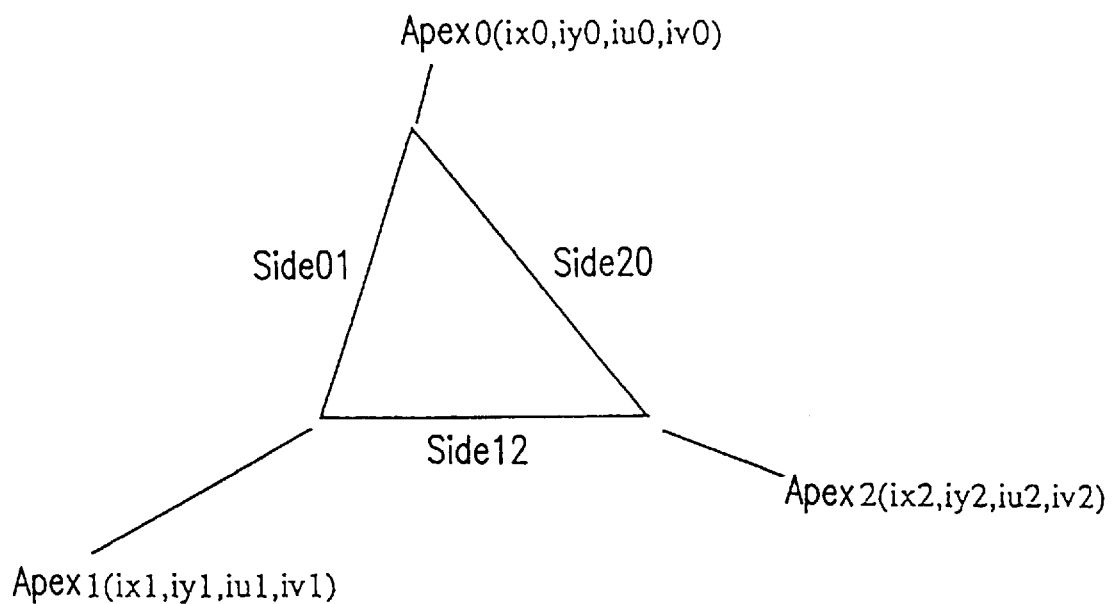
FIG. 25 shows a polygon used in Example 4.

FIG. 24 shows the flow chart of the processings conducted by the mapping apparatus of this example. FIG. 25 shows the triangle used for the mapping conducted along the processings shown in FIG. 24. In FIG. 25, it is assumed that the coordinates (ix,iy,iu,iv) of the vertexes of the polygon are integers, and that the coordinates of the vertexes and corresponding points satisfy Expression 52 below.

$iy0 < iy1 = iy2$ $ix1 < ix0 < ix2$ (52)

Referring to FIG. 24, in step 1301, the processing is conducted by the operation section 701. In step 1302, the span generation section 704 outputs the values of the depicting point (x,y) and the corresponding point (u,v). In step 1303, the span generation section 704 calculates the depicting point and the corresponding point in the span direction (see Expression 7). In step 1304, the condition for terminating the processing by the span generation section 704 in step 1303 is presented. In step 1305, the first and second edge generation sections 702*a* and 702*b* calculate the edge depicting point (see Expression 4) and the error E represented by Expression 46. The error E is used for the selection in subsequent step 1306. In step 1306, the selection section 703 selects du/dy(L) or du/dy(R) based on the error E. In step 1307, the first edge generation section 702*a* calculates the corresponding point. In step 1308, the second edge generation section 702*b* calculates the corresponding point. In step 1309, the condition for the termination of the entire processing is presented. Thus, the processing of the mapping apparatus is completed.

Thus, the correct corresponding point calculation can be realized by calculating the depicting point and the corresponding point for the polygon shown in FIG. 25 along the processings shown in FIG. 24.

More specifically, as the parameters used for the calculation of the corresponding point, du/dy(L) can be selected for 805*a* and 805*c*, while du/dy(R) can be selected for 805*b* and 805*d*. The above selection of the increment in the coordinate u of the corresponding point is conducted by the selection section 703. Though the above description was for the coordinate u for the corresponding point, it can, also be applied to the coordinate v for the corresponding point, luminance, opacity, and the like.

Specifically, the ideal corresponding point in the pixel having a polygon edge can be calculated by selecting between the corresponding points generated by the first and second generation sections 702*a* and 702*b* by the selection section 703 (see Expression 47 to 50). Further, by ideally calculating the corresponding point of a pixel at the head of the polygon span, the corresponding points of pixels included in the polygon span can be ideally calculated (see Expression 7).

Thus, according to the mapping apparatus of this example having the selection section 703 which selects between the parameters generated by the first and second edge generation sections 702a and 702b, the ideal corresponding point for the depicting pixel can be obtained. This makes it possible to calculate the ideal corresponding points for all the pixels where the polygon is projected, as in Examples 1 to 3, thereby improving the mapping image quality.

The load applied to the first and second edge generation sections of this example is substantially the same as that required for the conventional incremental algorithm. The calculation of the parameters (increment values) used for the respective edge correction can be conducted previously for the edge of the polygon, which therefore does not significantly increase the load required for the calculation.

In this example, two edge generation sections are required. With this configuration, only delay by selecting parameters generated by the two sections is newly caused compared with the conventional configuration. Thus, the high-speed processing as a whole can be retained.

In this example, the first and second edge generation sections 702a and 702b are operated simultaneously. It is possible, however, to stop the operation of either one of the edge generation sections by previously conducting the calculation of the accumulated error by the selection section 703. This operation will be described with reference to the flow chart of FIG. 21. After the completion of the processing 2211 for error accumulation, it is possible to recognize which date from the first edge generation section or the second edge generation section should be selected. Since the result of the processing 2201 is selected in this case, the second edge generation section 702b which conducts the processing 2202 (processing circuit) can be stopped without causing any trouble. In other words, it is possible to stop the operation of one of the edge generation sections by previously conducting the calculation of the accumulated error by the selection section 703. This serves to reduce the power consumption of the entire apparatus.

In this example, the point nearest to the origin was selected as the sample point of each pixel. Instead, any point can be selected as the sample point.

In this example, the relationship between the polygon and the texture was represented by Expression 1 and 2. The relationship represented by Expression 17 and 18, for example, can also be used to conduct correct corresponding point calculation. In short, the present invention is applicable to any expressions for the calculation of the corresponding points.

In this example, the calculation of corresponding points for polygon mapping was described. The same processing can also be applied to luminance calculation, opacity calculation, bump mapping calculation, and the like. As in the case of the corresponding point calculation, these calculations are applicable to any relational expressions.

Figure 10:
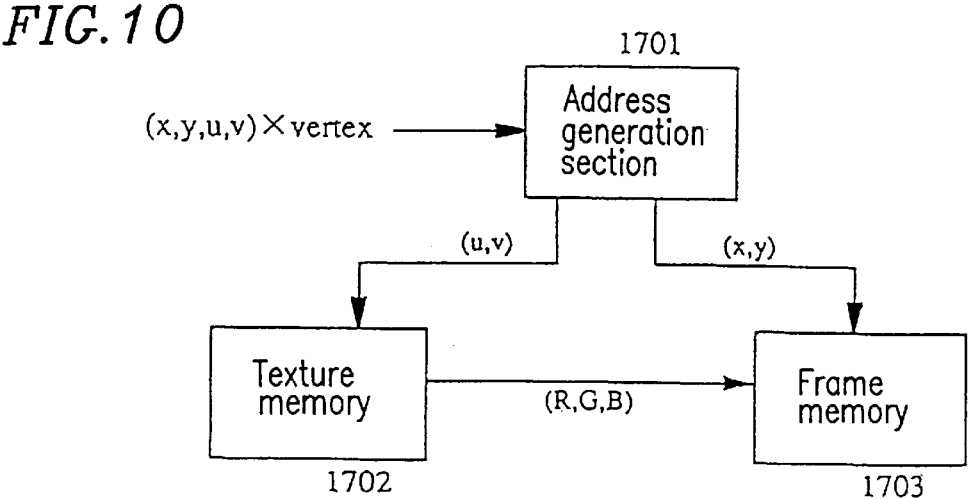
FIG. 10 shows a configuration of a texture mapping apparatus according to the present invention.

FIGS. 10 and 11 show examples of the entire configuration for realizing texture mapping and luminance mapping, respectively. By using the configurations described in this example for the address generation section 1701 and the luminance operation section 1801 shown in FIGS. 10 and it, the texture mapping and the luminance mapping according to this example can be realized. Opacity mapping, burp mapping, and the like can also be realized by respective apparatuses having configurations similar to the above. The configurations shown in FIGS. 10 and 11 were described in Example 1. The description thereof is therefore omitted here.

In this example, the method without anti-aliasing was used. However, the same processing can also be conducted if anti-aliasing is conducted. Also, the same correction can be conducted when sub-pixel positioning is conducted.

EXAMPLE 5

The fifth example of the present invention will be described with reference to FIGS. 26 to 29.

Figure 26:
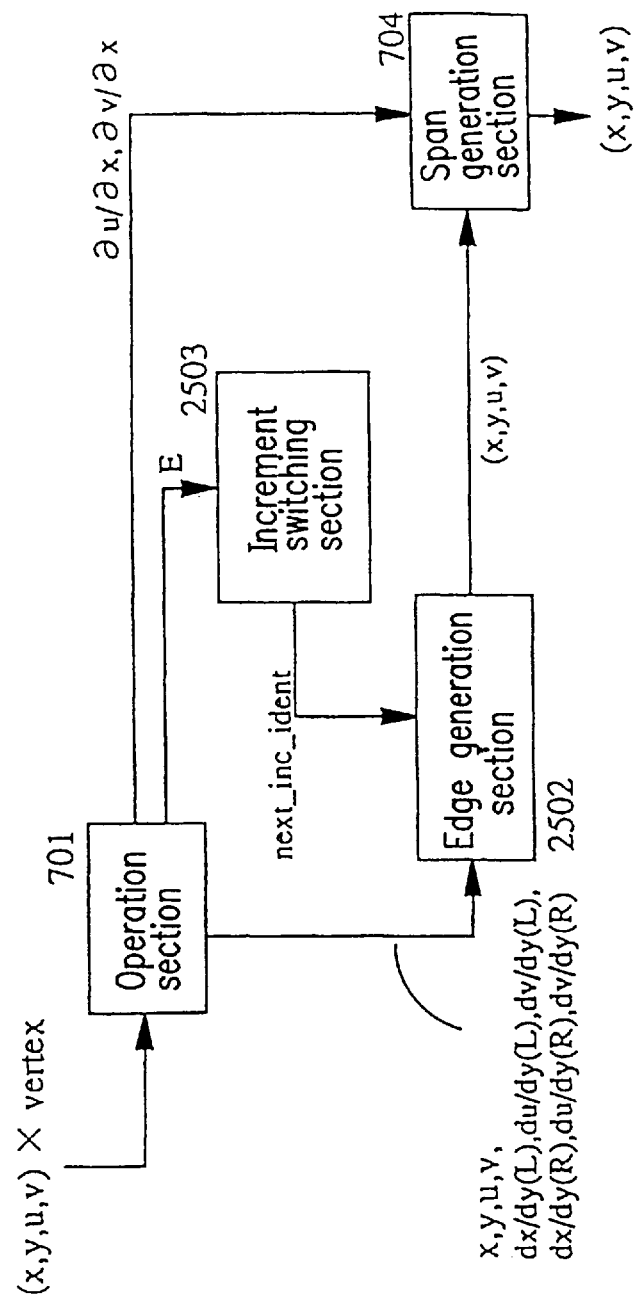
FIG. 26 shows a configuration of an address generation section of the mapping apparatus of Example 5 according to the present invention.

FIG. 26 shows a configuration of an address generation section of the mapping apparatus of Example 5 according to the present invention. In FIG. 26, the same components are denoted by the same reference numerals as those in FIG. 18. An edge generation section 2502 calculates screen coordinates and corresponding texture coordinates by conducting increment calculation based on a selected increment value using data generated by the operation section 701. An increment switching section 2503 determines the increment value for the edge generation section 2502 using data generated by the operation section 701. The polygon shown in FIG. 19 is used for the mapping in this example, as in Example 4, and the relationship represented by Expressions 1 and 2 is established for the corresponding points.

The texture mapping in this example will be described. The operation section 701 calculates parameters used in the subsequent steps (see Expressions 42, 43, 44, and 45). Practically, the values shown in Expression 51 are used.

The edge generation section 2502 switches among increment values of dx/dy(L), du/dy(L), dv/dy(L), dx/dy(R), du/dy(R), and dv/dy(R) depending on a signal next_inc_ ident supplied from the increment switching section 2503, and conducts increment processing (DDA processing) using the selected increment value.

The increment switching section 2503 accumulates the error E described in Example 4 (Expressions 46 and 51) to control the switching based on the accumulated result, i.e., select the increment value to be used at the edge generation section 2502. The switching conducted by the increment switching section 2503 is the same as the selection conducted by the selection section 703 described in Example 4. Specifically, the increment values dx/dy(L), du/dy(L), and dv/dy(L) are selected when the accumulated error (sum(E)) is less than 1, while the increment values dx/dy(R), du/dy (R), and dv/dy(R) are selected when the accumulated error is 1 or more. When the accumulated error exceeds 1, 1 is subtracted from the accumulated error sum(E) as in Example 4.

Figure 27:
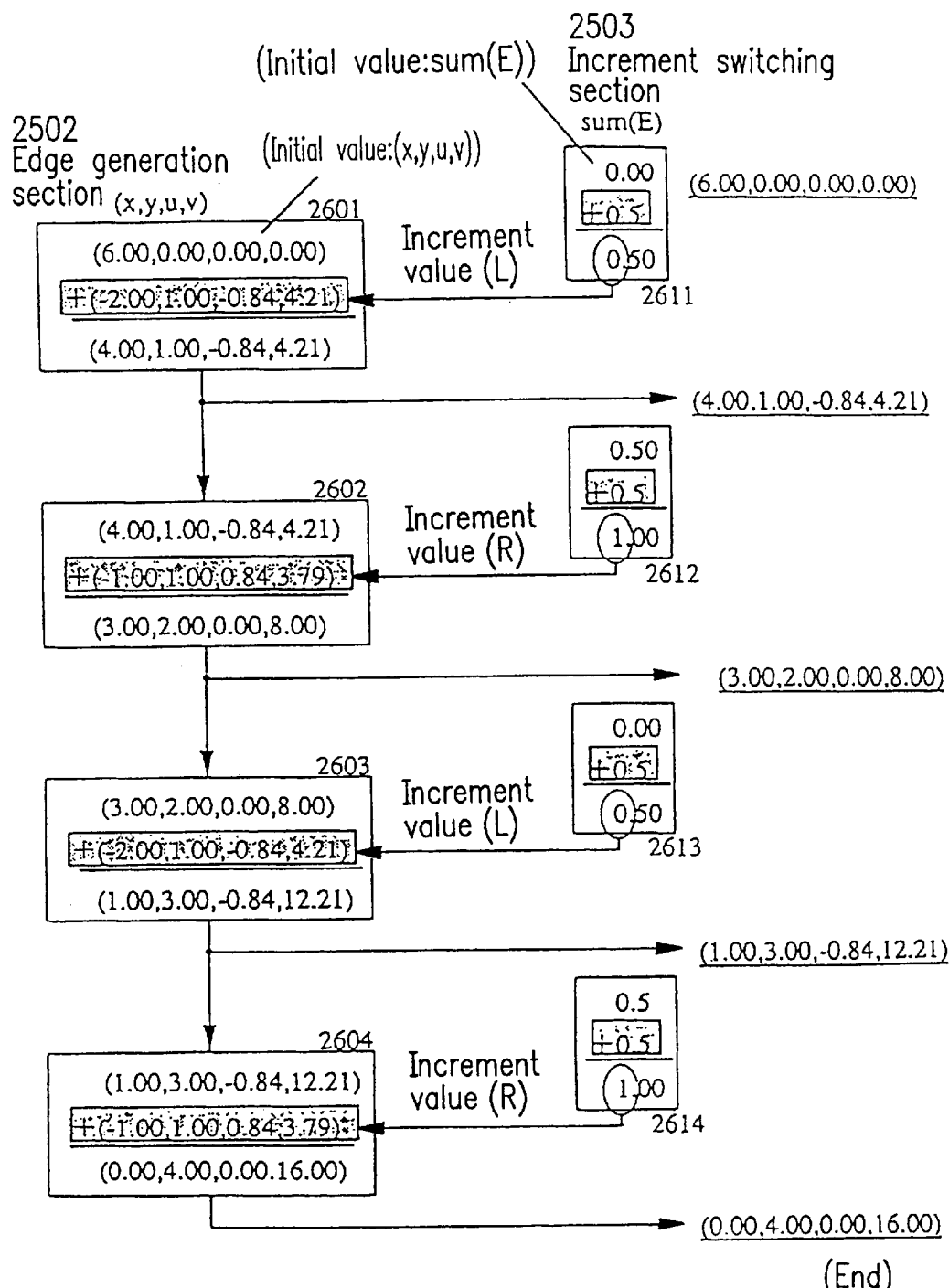
FIG. 27 shows a flow of processings conducted in Example 5.

FIG. 27 shows the flow of the processings by the edge generation section 2502 and the increment switching section 2503. (The polygon shown in FIG. 19 is used for the mapping in this example, as in Example 4.)

Referring to FIG. 27, processings 2601, 2602, 2603, and 2604 are conducted by the edge generation section 2502. Processings 2611, 2612, 2613, and 2614 are conducted by the increment switching section 2503. In FIG. 27, the values (data) shown in the half-tone dot meshed regions are increment values (screen coordinates and texture coordinates) controlled by the increment switching section 2503 and used in the edge generation section 2502. Data (x,y,u,v) output from the edge generation section 2502 are underlined.

Step 0

The coordinates (6,0,0,0) of the point p0 as a vertex of the polygon is used as the initial values for the subsequent processings. The initial value of the accumulated error sum(E) is 0. The values (6,0,0,0) are output from the edge generation section 2502.

Step 1

The increment switching section 2503 accumulates the error E (processing 2611). Since the accumulated error at this time is less then 0, the increment switching section 2503 instructs the edge generation section 2502 to use the increment value of (L) via the signal next_inc_ident shown in FIG. 26.

On receipt of this signal, the edge generation section 2502 accumulates the (L) increment values (−2.00,1.00,−0.84, 4.21) to the results (initial values) from step 0, and outputs the accumulated results (processing 2601). As a result, values (4.00,1.00,−0.84,4.21) are output. This processing corresponds to the increment calculation of 805*a* shown in FIG. 19.

Step 2

Since the accumulated error has exceeded 1 (processing 2612), the increment switching section 2503 instructs the edge generation section 2502 to use the increment value of (R) via the signal next_inc_ident shown in FIG. 26.

On receipt of this signal, the edge generation section 2502 accumulates the (R) increment values (−1.00,1.00,0.84, 3.79) to the results from step 1 and outputs the accumulated results (processing 2602). As a result, values (3.00,2.00, 0.00,8.00) are output. This processing corresponds to the increment calculation of 805*b* shown in FIG. 19.

Since the accumulated error E has exceeded 1, the increment switching section 2503 subtracts 1 from the accumulated error.

Step 3

The increment switching section 2503 accumulates the error B (processing 2613). Since the accumulated error at this time is less than 1, the increment switching section 2503 instructs the edge generation section 2502 to use the increment value of (L) via the signal next_inc_ident.

On receipt of this signal, the edge generation section 2502 accumulates the (L) increment values (−2.00,1.00,−0.84, 4.21) to the results from step 2 and outputs the accumulated results (processing 2603). As a result, values (1.00,3.00,− 0.84,12.21) are output. This processing corresponds to the increment calculation of 805*c* shown in FIG. 19.

Step 4

Since the accumulated error E has exceeded 1, the increment switching section 2503 instructs the edge generation section 2502 to use the increment value of (R) via the signal next_inc_ident.

On receipt of this signal, the edge generation section 2502 accumulates the (R) increment values (−1.00,1.00,0.84, 3.79) to the results from step 3 and outputs the accumulated results (processing 2614). As a result, values (0.00,4.00, 0.00,16.00) are output. This processing corresponds to the increment calculation of 805*d* shown in FIG. 19.

Since the accumulated error E has exceeded 1, the increment switching section 2503 subtracts 1 from the accumulated error.

Thus, by conducting the processings in steps 0 to 4 above, ideal polygon coordinates and texture coordinates for points on the polygon edge can be obtained.

Next, the configurations of the edge generation section 2502 and the increment switching section 2503 will be described.

Figure 28:
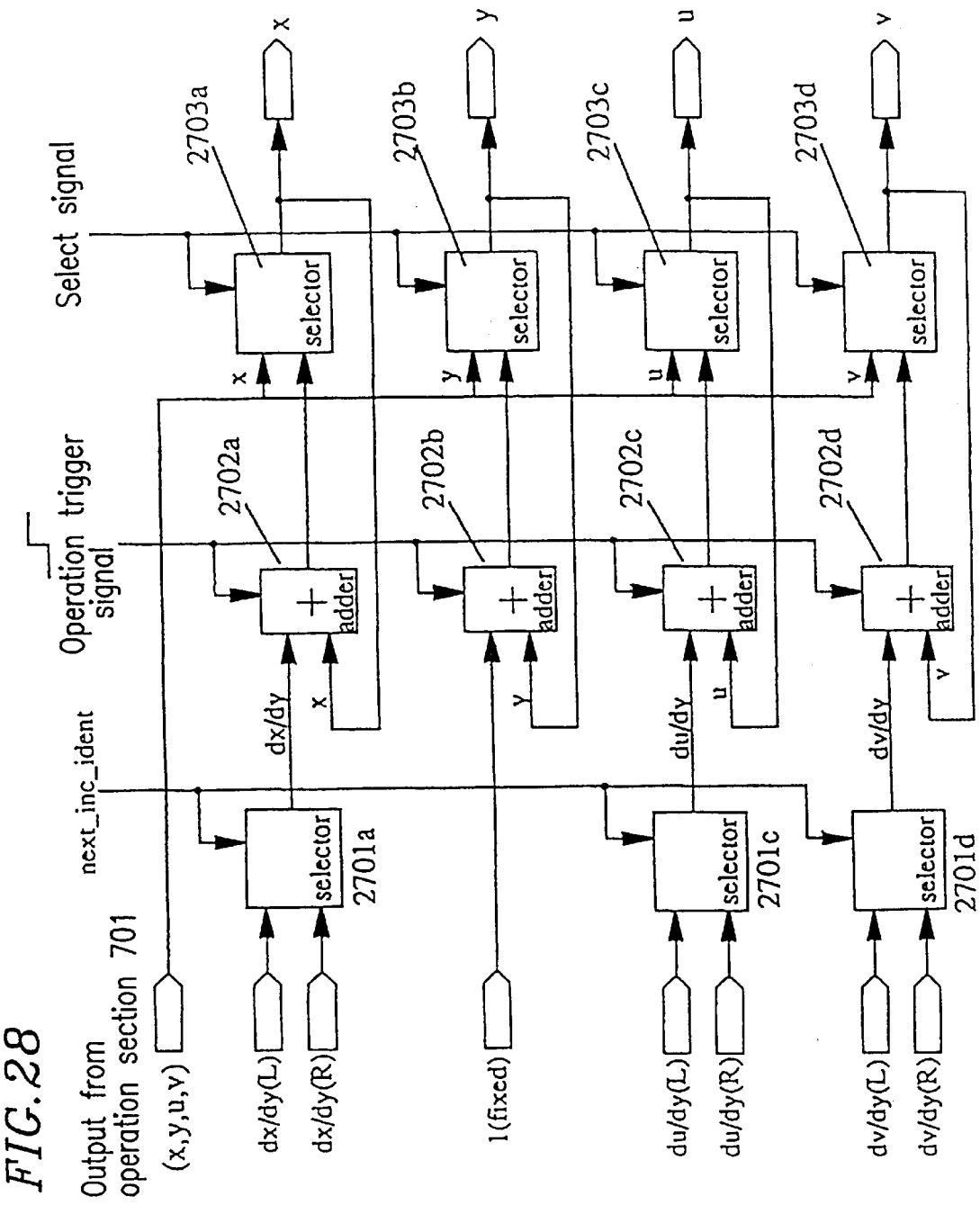
FIG. 28 shows a configuration of an edge generation section in Example 5.

FIG. 28 shows an example of the configuration of the edge generation section 2502. Selectors 2701*a*, 2701*c*, and 2701*d* switch between the initial values (R) and (L) used in the edge generation section 2502 depending on the signal next_inc_ident shown in FIG. 26.

Adders 2702*a* to 2702*d* add the increment values selected by the selectors 2701*a*, 2701*c*, and 2701*d* to the values output from the edge generation section 2502. In FIG. 28, values output from the edge generation section 2502 are returned to be input into the adders 2702*a* to 2702*d*. The processings 2601, 2602, 2603, and 2604 are thus realized.

The selectors 2703*a* to 2703*d* select the values (x,y,u,v) output from the operation section 701 when the first edge point is calculated, or otherwise select data (x,y,u,v) output from the adders 2702*a* to 2702*d*, respectively. This allows the values (x,y,u,v) to be calculated from the initial values successively for the polygon edge.

Figure 29:
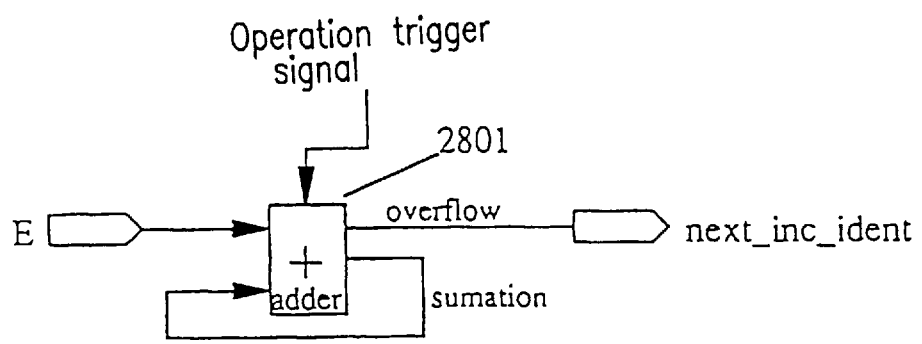
FIG. 29 shows a configuration of an increment switching section in Example 5.

FIG. 29 shows an example of the configuration of the increment switching section 2503. Referring to FIG. 29, an adder 2801 accumulates the error E (Expression 51) in the coordinate x for every scan line, to obtain the accumulated error sum(E).

An indicator is used in the increment switching section 2503 for switching between the increment values for controlling the increment value used in the edge generation section 2502. The indicator switches between the increment values depending on whether or not the accumulated error (sum(E)) exceeds 1, and subtracts 1 from the accumulated error value when the accumulated error exceeds 1. Specifically, the increment switching section 2503 includes an accumulator which only accepts an amount less than 1 and determines whether or not the accumulated result overflows. Thus, the processings 2611, 2612, 2613, and 2614 are realized.

Thus, steps 0 to 4 described above can be realized by using the edge generation section 2502 and the increment switching section 2503 with the above configurations.

In this example, therefore, the increment switching section 2503 calculates the difference (error) between the values x of the screen coordinates and the sample point of the screen pixel by accumulating the values supplied from the operation section 701. Practically, the increment switching section 2503 only determines whether or not the accumulated result overflows. The result is supplied to the edge generation section 2502 to be used to select the increment value (L) or (R) for the calculation of the screen coordinates and texture coordinates for the polygon edge.

The edge generation section 2502 conducts increment calculation using the increment value selected by the increment switching section 2503. The resultant screen coordinates and texture coordinates for points representing the polygon are ideal for the screen pixels.

Thus, according to the mapping apparatus of this example with the edge generation section 2502 and the increment switching section 2503, ideal screen coordinates and texture coordinates can be obtained. This makes it possible to calculate the ideal corresponding points for all the pixels where the polygon is projected, as in the previous examples, thereby improving the mapping image quality.

The circuitry of the edge generation section 2502 does not so significantly become larger, though selectors of the quantity equal to the number of increment values are added. The delay in the processing speed is negligible. Therefore, the resultant mapping apparatus has substantially the same processing capacity as the case using the conventional incremental algorithm.

The circuitry of the increment switching section 2503 is simple and small as is shown in FIG. 29.

Accordingly, from the aspect of the processing capacity and circuitry, the mapping device of this example has substantially the same processing speed as the case using the conventional incremental algorithm, and additionally, ideal corresponding point calculation can be conducted.

In this example, the point nearest to the origin was selected as the sample point of each pixel. In actuality, any point can be selected as the sample point.

In this example, the relationship between the polygon and the texture was represented by Expressions 1 and 2. The relationship represented by Expressions 17 and 18, for example, can also be used to conduct correct corresponding point calculation. In short, the present invention is applicable to any expressions for the calculation of the corresponding points.

In this example, the calculation of corresponding points for polygon mapping was described. The same processing can also be applied to luminance calculation, opacity calculation, bump mapping calculation, and the like (see FIGS. 10 and 11). As in the case of the corresponding point calculation, these calculations are applicable to any relational expressions.

In this example, the method without anti-aliasing was used. However, the same processing can also be conducted if anti-aliasing is conducted. Also, the same correction can be conducted when sub-pixel positioning is conducted.

EXAMPLE 6

The sixth example of the present invention will be described with reference to FIGS. 30 to 34.

Figure 30:
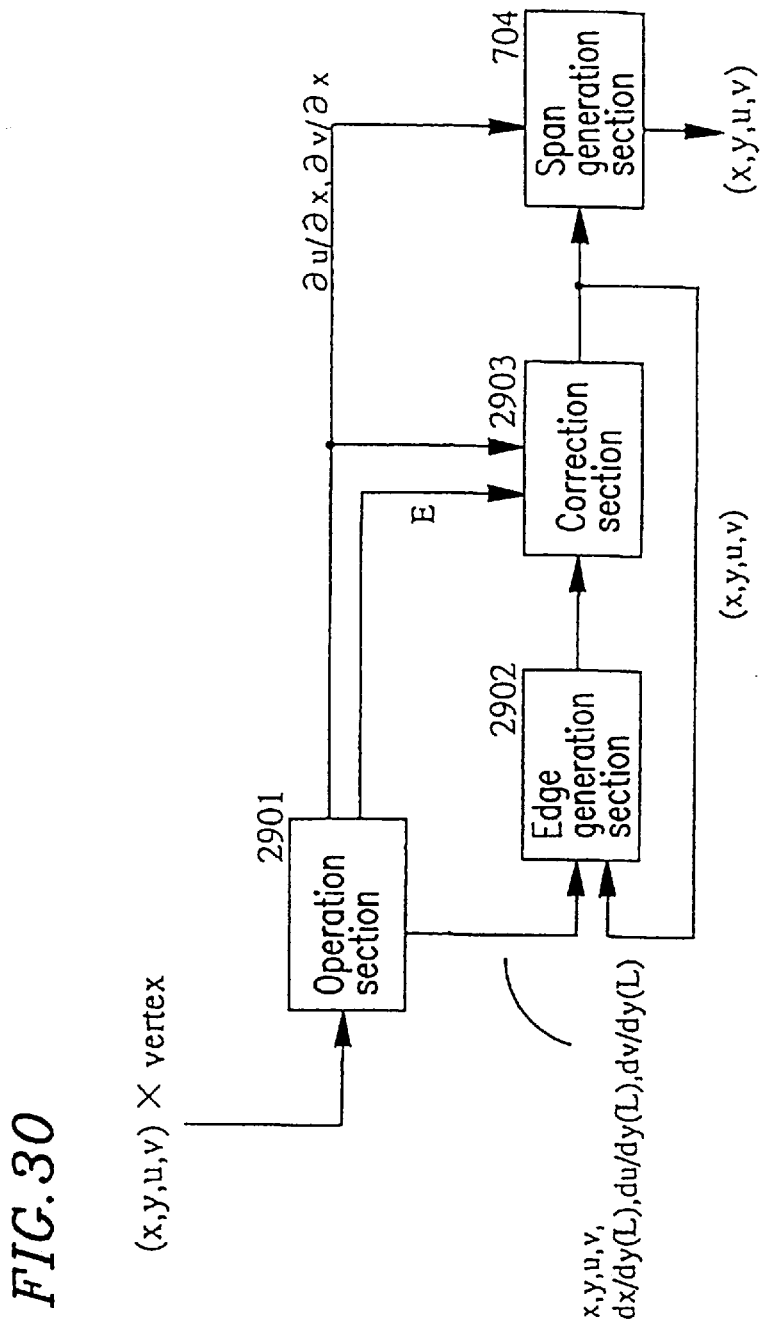
FIG. 30 shows a configuration of an address generation section of the mapping apparatus of Example 6 according to the present invention.

FIG. 30 shows a configuration of an address generation section of the mapping apparatus of Example 6 according to the present invention. In FIG. 30, the same components are denoted by the same reference numerals as those in FIG. 18. An operation section 2901 calculates parameters used for calculating the depicting point inside a polygon and the corresponding point using the position of a polygon vertex and the corresponding point for the polygon vertex. The edge generation section 2902 calculates screen coordinates and corresponding texture coordinates by conducting increment calculation using the parameters generated by the operation section 2901 and data corrected by the correction section 2903. A correction section 2903 corrects the corresponding point generated by the edge generation section 2902 using the parameters generated by the operation section 2901 and the depicting point generated by the edge generation section 2902. The same polygon shown in FIG. 19 is used for the mapping as in Example 4, and the relationship represented by Expressions 1 and 2 is established for the corresponding points.

The texture mapping processing in this example will be described. Unlike Examples 4 and 5, the operation section 2901 calculates only the increment values of (L) (see Expressions 42, 44, and 45). Additionally, dx/dy(L), du/dy(L) and dv/dy(L) shown in Expression 51 are calculated. Also, the difference (E) between the depicting point and the sample point (Expression 46) required for the determination of whether or not the correction by the correction section 2903 should be conducted is calculated.

The edge generation section 2902 conducts increment processing (DDA processing) with the initial values (x,y,u,v) supplied from the operation section 2901 in the initial step and values (x,y,u,v) output from the correction section 2903 in the subsequent steps, using dx/dy(L), du/dy(L), and dv/dy(L) calculated by the operation section 2901 as the increment value.

The correction section 2903 corrects data (x,y,u,v) output from the edge generation section 2902. The correction is required when the accumulated error (sum(E)) which is the difference between the depicting point calculated by the operation section 2901 and the sample point is 1 or more. By conducting the correction whenever the correction is required, the difference between the value x before the correction and the coordinate x of the sample point always corresponds to one pixel. After the correction, 1 has been subtracted from the accumulated error. The correction is conducted by executing Expression 53 below for the calculated values (x,y,u,v). Thus, ideal screen coordinates and texture coordinates can be calculated. The resultant values (x,y,u,v) are output from the correction section 2903.

$$x \leftarrow x+1$$
$$y \leftarrow y$$
$$u \leftarrow u+\partial u/\partial x$$
$$v \leftarrow v+\partial v/\partial x \tag{53}$$

Figure 31:
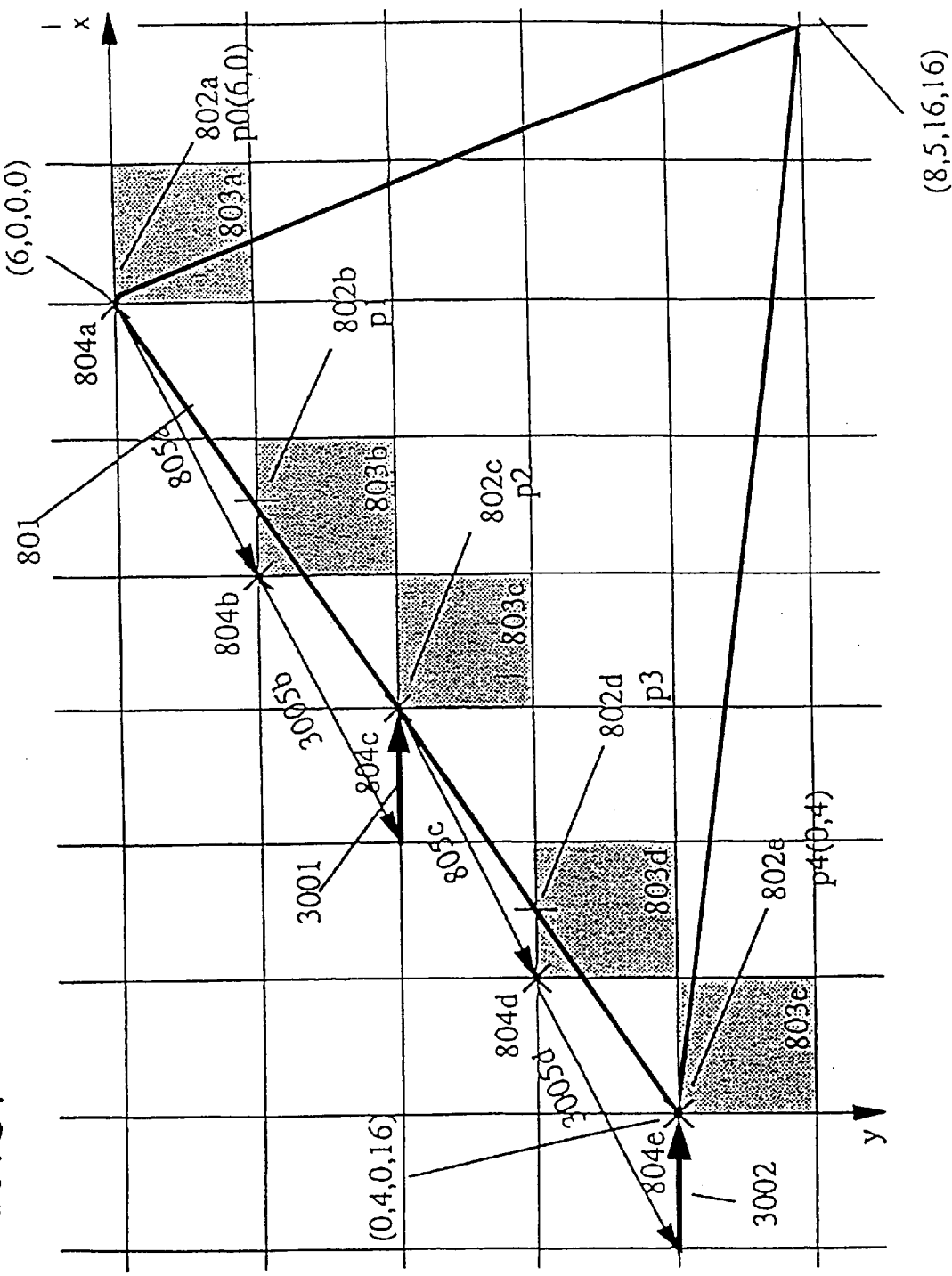
FIG. 31 is a view showing the increment and correction processings in Example 6, as well as a polygon used in Example 6.

The correction will be described using the polygon shown in FIG. 19. FIG. 31 shows the shift in increment processing and the correction for the polygon shown in FIG. 19. In FIG. 31, the same components are denoted by the same reference numerals as in FIG. 19. Arrows 805a, 3005b, 805c, and 3005d show the shifts of the sample points caused by the increment processing conducted by the edge generation section 2902. Arrows 3001 and 3002 show the shifts of the sample points caused by the correction conducted by the correction section 2903.

Figure 32:
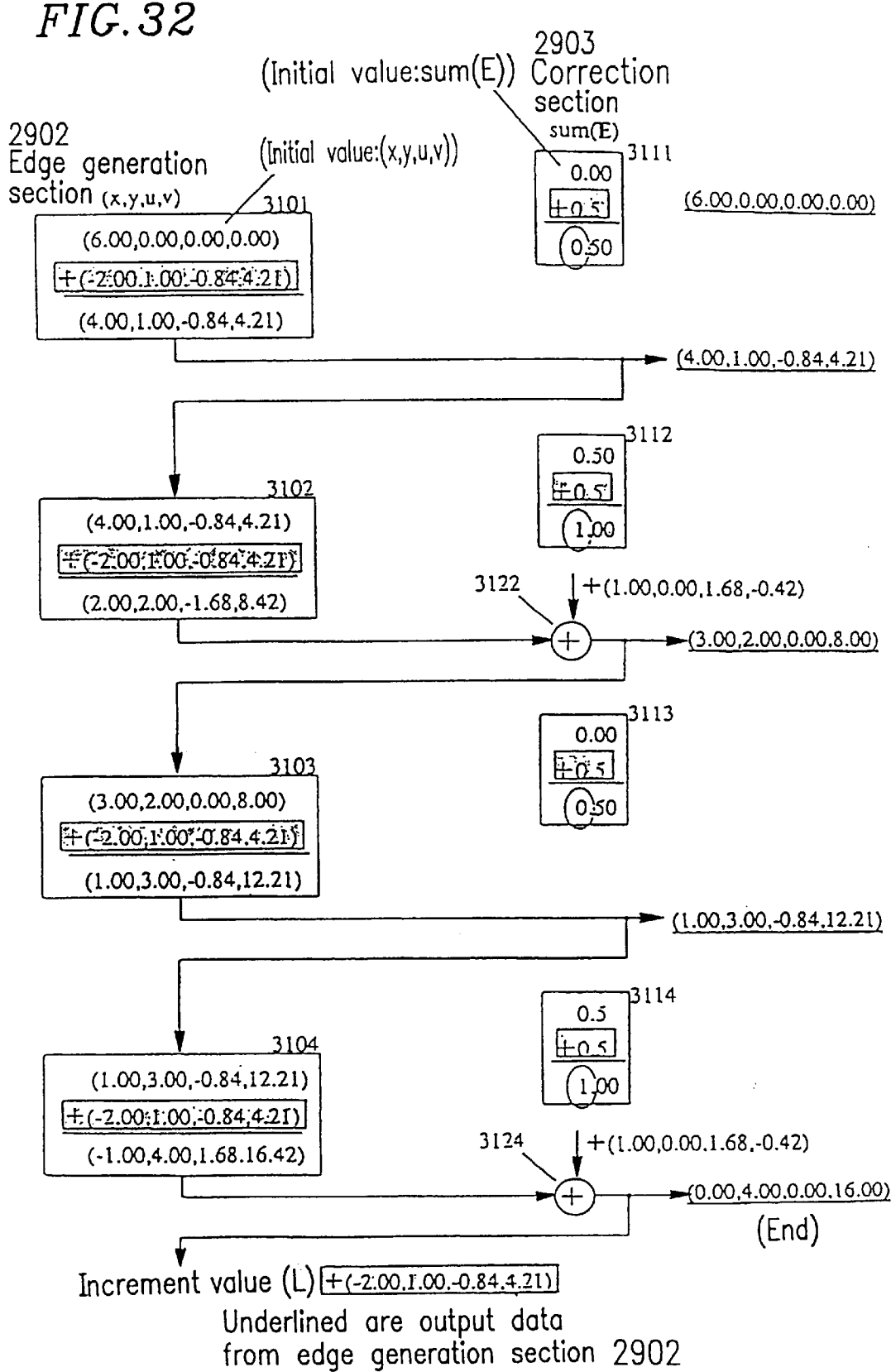
FIG. 32 shows a flow of processings conducted in Example 6.

FIG. 32 shows the flow of the processings by the edge generation section 2902 and the correction section 2903 for the calculation of the screen coordinates and texture coordinates for the polygon shown in FIG. 31. Referring to FIG. 32, processings 3101, 3102, 3103, and 3104 are conducted by the edge generation section 2902. In processings 3111, 3112, 3113, and 3114, the calculation of the accumulated error as described above is conducted to determine whether or not the correction should be conducted by the correction section 2903. Processings 3122 and, 3124 are conducted by the correction section 2903.

The above processings are described in order along the polygon edge 801.

Step 0

The coordinates (6,0,0,0) of the point p0 as a vertex of the polygon is used as the initial values for the subsequent processings. The initial value of the accumulated error sum(E) is 0. The values (6,0,0,0) are output from the selection section 2902.

Step 1

The edge generation section 2902 adds the increment values (−2.00,1.00,−0.84,4.21) to the results (initial values) of step 0, and outputs the calculated results (4.00,1.00,−0.84,4.21) to the correction section 2903 (processing 3101).

The correction section 2903 accumulates the error E (processing 3111). Since the accumulated value is less than 1 in this case, no correction is conducted. The output from the correction section 2903 is therefore (4.00,1.00,−0.84, 4.21).

Step 2

The edge generation section 2902 adds the increment values (−2.00,1.00,−0.84,4.21) to the results of step 1 (4.00, 1.00,−0.84,4.21), and outputs the calculated results (2.00, 2.00,−1.68,8.42) to the correction section 2903 (processing 3102).

The correction section 2903 accumulates the error E (processing 3112). Since the accumulated value is 1 or more in this case, the correction is conducted by adding (1.00, 0.00,∂u/∂x,∂v/∂x)=(1.00,0.00,1.68,−0.42) to the input value (2.00,2.00,−1.68,8.42) (processing 3122). The results of the correction (3.00,2.00,0.00,8.00) are output from the correction section 2903. After the above processing, 1 is subtracted from the accumulated error in the correction section 2903 to obtain a new accumulated error.

Step 3

The edge generation section 2902 adds the increment values (−2.00,1.00,−0.84,4.21) to the results of step 2 (3.00, 2.00,0.00,800), and outputs the calculated results (1.010, 3.00,−0.84,12.21) to the correction section 2903 (processing 3103).

The correction section 2903 accumulates the error E (processing 3113). Since the accumulated value is less than 1 in this case, no correction is conducted. The output from the correction section 2903 is therefore (1.00,3.00,−0.84, 12.21).

Step 4

The edge generation section 2902 adds the increment values (−2.00,1.00,−0.84,4.21) to the results of step 3 (1.00, 3.00,−0.84,12.21), and outputs the calculated results (−1.00, 4.00,−1.68,16.42) to the correction section 2903 (processing 3104).

The correction section 2903 accumulates the error E (processing 3114). Since the accumulated value is 1 or more in this case, the correction is conducted by adding (1.00, 0.00,1.68,−0.42) to the input value (1.00,4.00,−1.68,16.42) as in step 2 (processing 3124). The results of the correction (0.00,4.00,0.00,16.00) are output from the correction section 2903. After the above processing, 1 is subtracted from the accumulated error in the correction section 2903 to obtain a new accumulated error.

Thus, by conducting the processings in steps 0 to 4 above, ideal screen and texture coordinates for the polygon edge can be obtained.

Next the configurations of the edge generation section 2902a and the correction section 2903 will be described.

Figure 33:
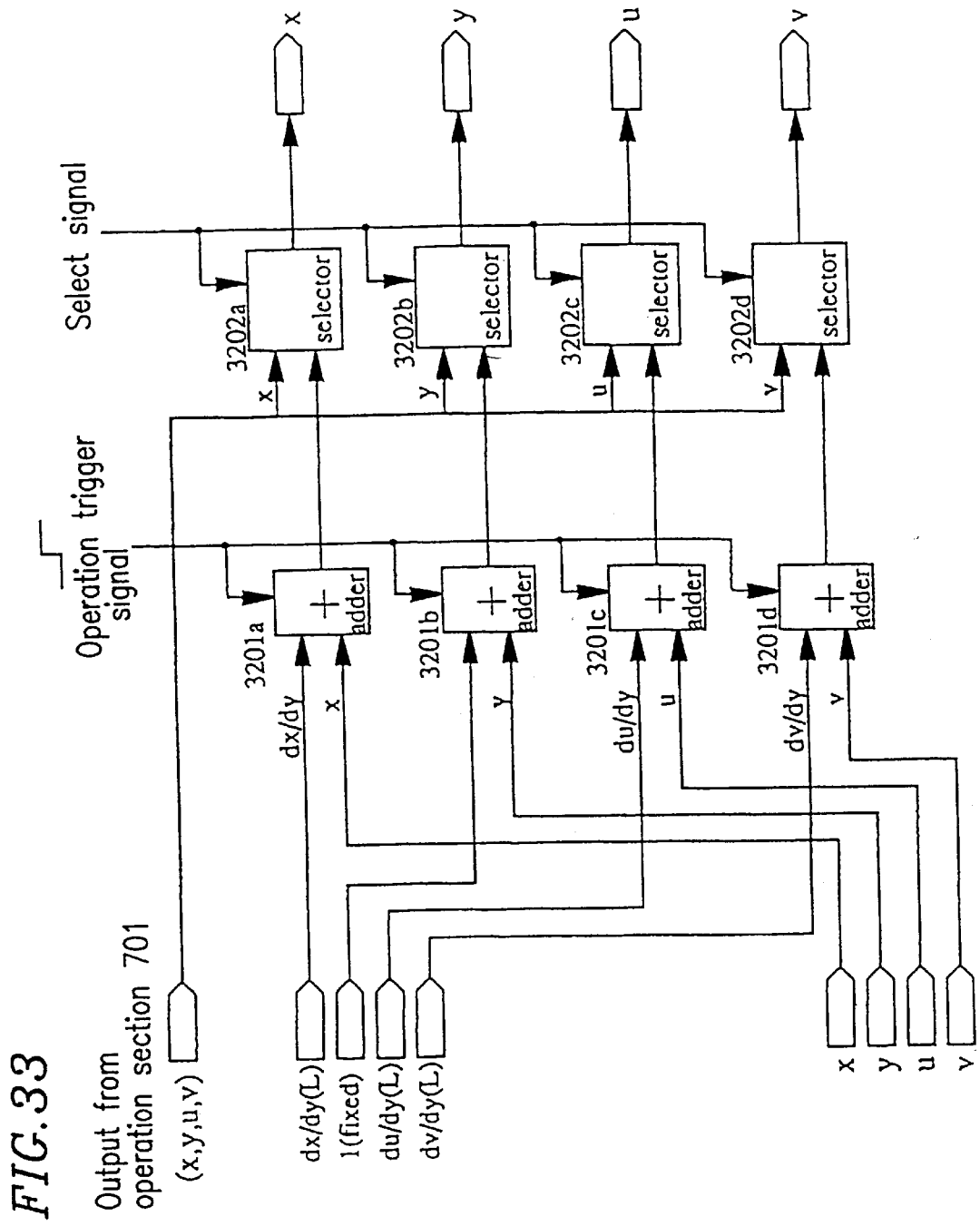
FIG. 33 shows a configuration of an edge generation section in Example 6.

FIG. 33 shows a configuration of the edge generation section 2902. Adders 3201a to 3201d conduct the increment of the values x, y, u, and v, respectively, thereby to realize the increment processings 3101 to 3104. Selectors 3202a to 3202d select the coordinates (x,y,u,v) output from the operation section 2901 when the first edge point is calculated, or select the data (x,y,u,v) obtained after the increment processing for the values (x,y,u,v) output from the correction section 2903. Thus, the values (x,y,u,v) can be successively calculated from the initial value for the polygon edge.

Figure 34:
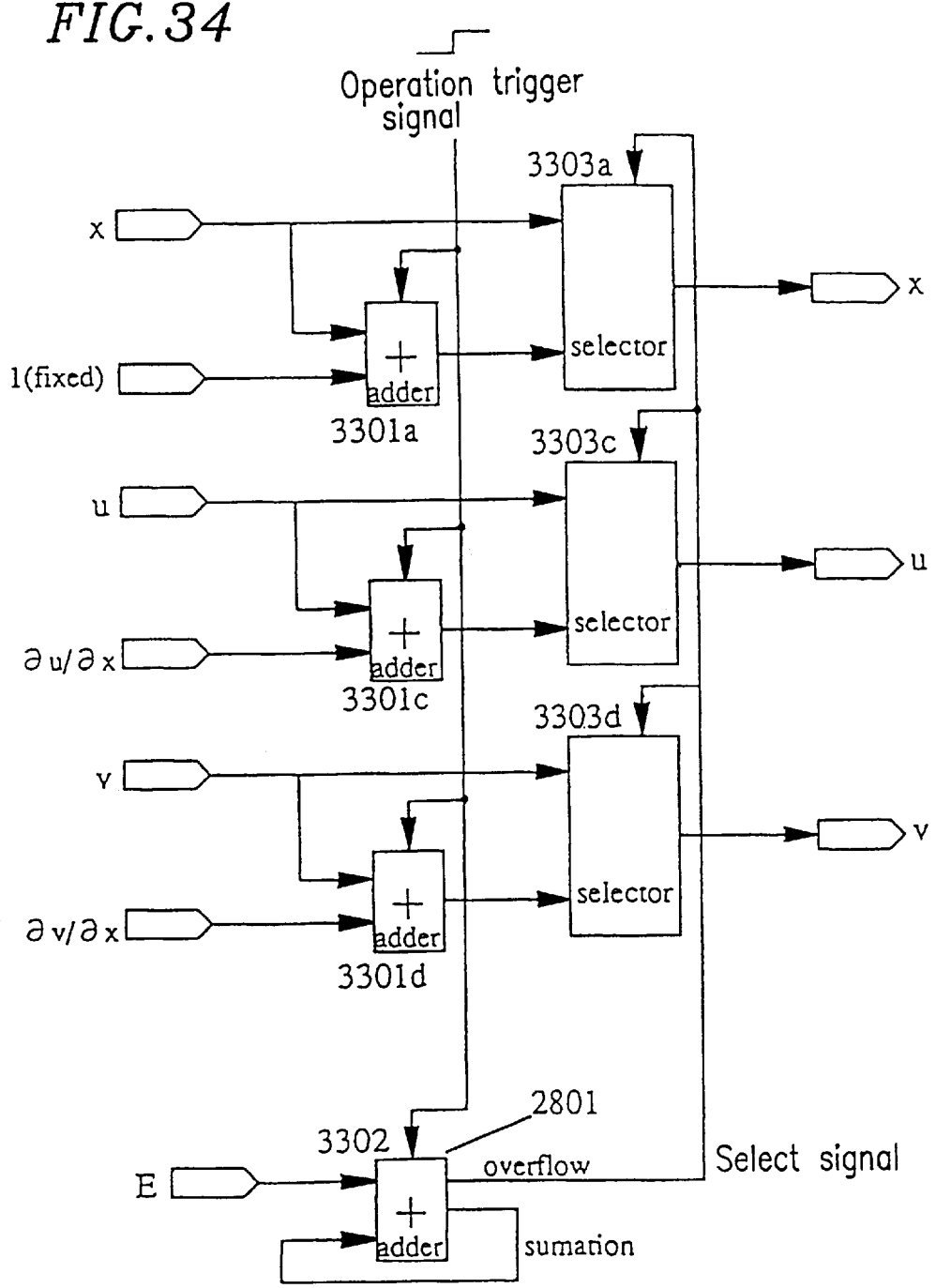
FIG. 34 shows a configuration of a correction section in Example 6.

FIG. 34 shows a configuration of the correction section 2903. Referring to FIG. 34, adders 3301a, 3301c, and 3301d conduct the correction represented by Expression 53. An adder 3302 accumulates the difference (E) between the depicting point calculated using the incremental algorithm and the sample point of the screen pixel. Whether corrected data or uncorrected data is output is determined based on the results of the adder 3302. In this example, the range of the adder 3302 is set at less than 1, and whether corrected data or uncorrected data is output is determined by whether or not the accumulated result of the adder 3302 overflows. Selectors 3303a, 3303c, and 3303d output the corrected data from the adders 3301a, 3301c, and 3301d when the adder 3302 overflows, or output uncorrected data when the adder 3302 does not overflow.

Thus, steps 0 to 4 described above can be realized by using the edge generation section 2902 and the correction section 2903 with the above configurations.

Thus, according to the mapping apparatus of this example having the edge generation section 2902 and the correction section 2903, ideal screen coordinates and texture coordinates for the pixel to be depicted can be obtained. This makes it possible to calculate the ideal corresponding points for all the pixels where the polygon is projected, as in the previous examples, thereby improving the mapping image quality.

The edge generation section 2902 has the same circuitry size as the case of the conventional increment calculation. It also has substantially the same processing speed arid capacity as the case of the conventional incremental algorithm. The circuitry of the correction section 2903 is simple and small as is shown in FIG. 34. Accordingly, in this example, ideal corresponding point calculation is possible without increasing the circuitry size nor decreasing the processing capacity.

In this example, the point nearest to the origin was selected as the sample point of each pixel. Instead, any point can be selected as the sample point.

In this example, the relationship between the polygon and the texture was represented by Expression 1 and 2. The relationship represented by Expression 17 and 18, for example, can also be used to conduct correct corresponding point calculation. In short, the present invention can correspond to any expressions for the calculation of the corresponding points.

In this example, the calculation of corresponding points for polygon mapping was described. The same processing can also be applied to luminance calculation, opacity calculation, bump mapping calculation, and the like (see FIGS. 10 and 11). As in the case of the corresponding point calculation, these calculations are applicable to any relational expressions.

In this example, the method without anti-aliasing was used. However, the same processing can also be conducted if anti-aliasing is conducted. Also, the same correction can be conducted when sub-pixel positioning is conducted.

EXAMPLE 7

The eleventh example of the present invention will be described with reference to FIGS. 35 and 36.

Figure 35:
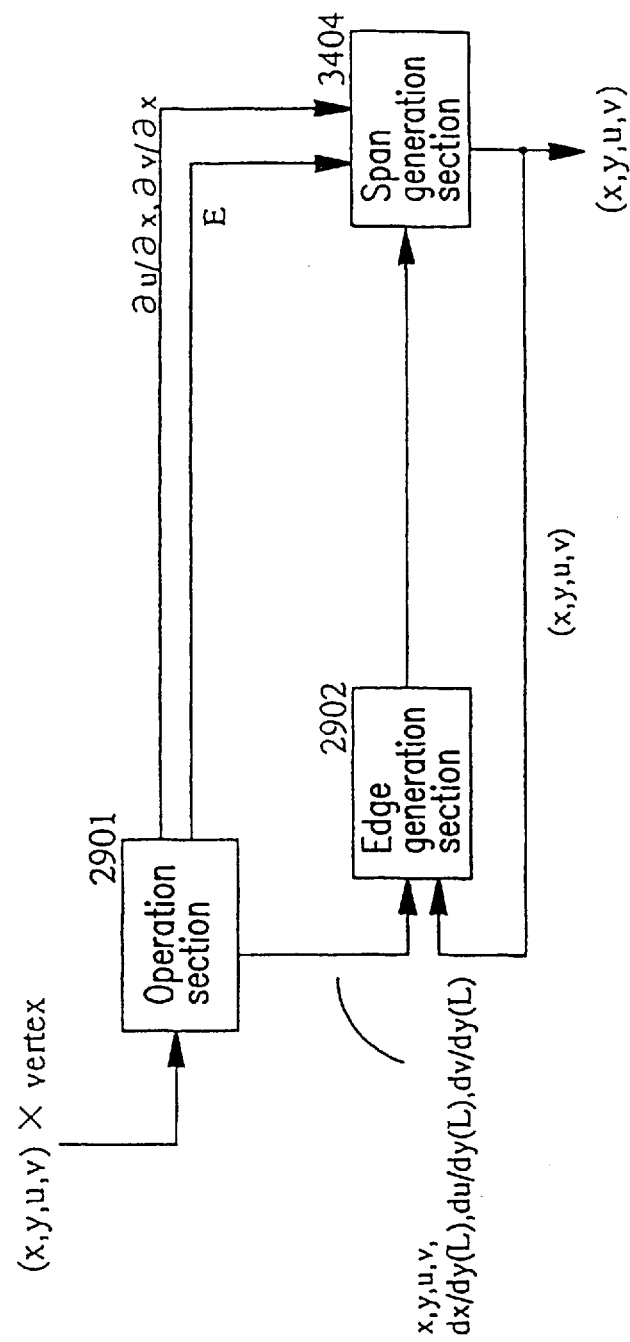
FIG. 35 shows a configuration of an address generation section of the mapping apparatus of Example 7 according to the present invention.

FIG. 35 shows a configuration of a texture mapping apparatus of Example 7 according to the present invention. In FIG. 35, the same components are denoted by the same reference numerals as those in FIG. 30.

Referring to FIG. 35, a span generation section 3404 receives the values E, $\partial u/\partial x$, and $\partial v/\partial x$ calculated by the operation section 2901, corrects the difference between the depicting point calculated by the edge generation section 2902 and the corresponding point, and calculates tile screen coordinates and texture coordinates of a span point inside the polygon.

The texture mapping processing in this example will be described. The mapping apparatus of this example includes the span generation section 3404 which realizes the processings conducted by the correction section 2903 and the span generation section 704 in Example 6 simultaneously. Accordingly, ideal screen coordinates and texture coordinates of points within the polygon can be calculated.

The operation is the same as that in Example 6. The increment processing is conducted by the edge generation section 2902. In this example, however, the correction represented by Expression 53 is conducted by the span generation section 3404, The reason why the span generation section 3404 can conduct both the correction and the span processing is that the correction represented by Expression 53 is the same as the processing for span generation represented by Expression 53.

Figure 36:
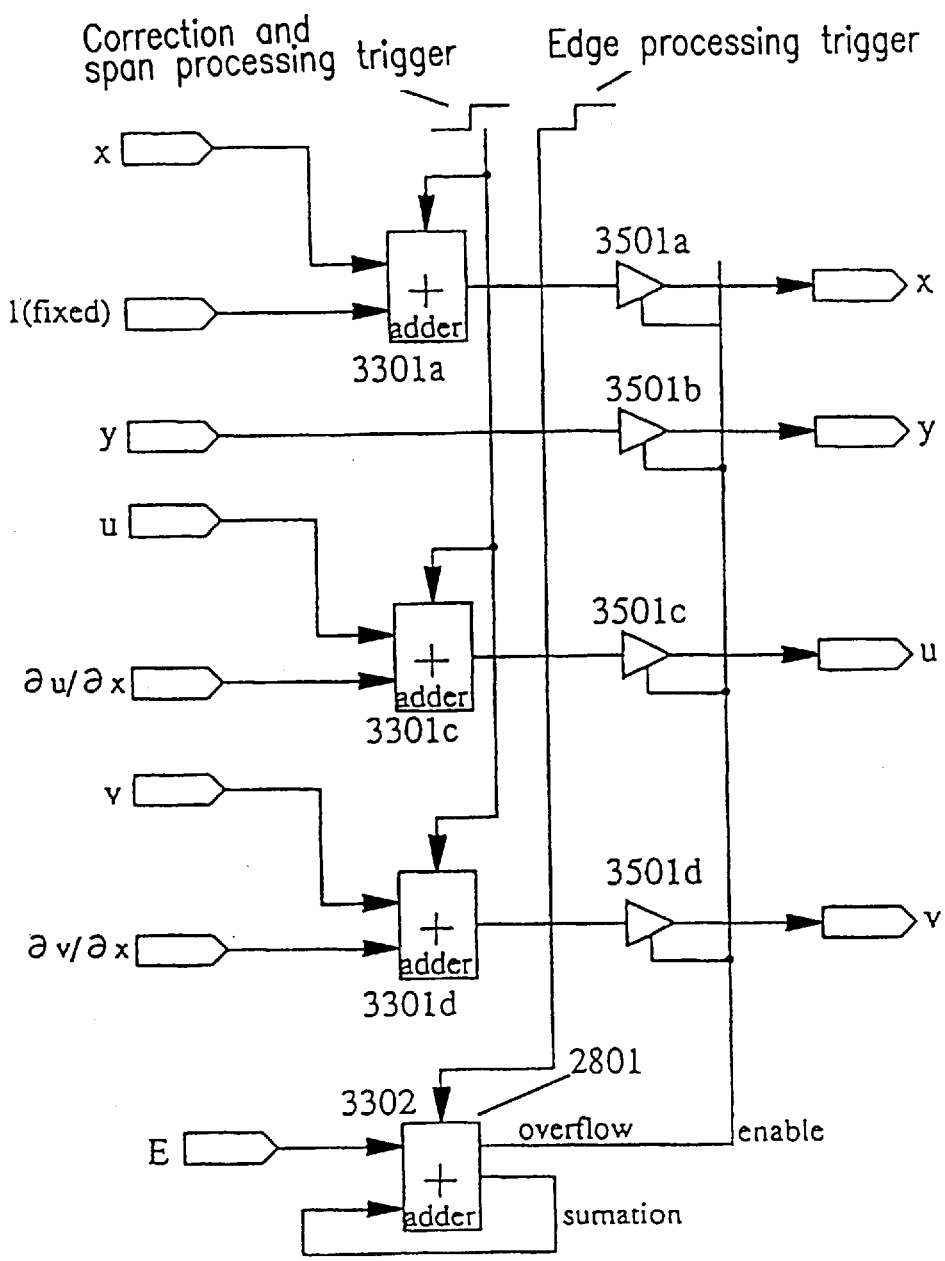
FIG. 36 shows a configuration of a span generation section in Example 7.

FIG. 36 shows a configuration of the span generation section 3404. In FIG. 36, the same components are denoted by the same reference numerals as those of FIG. 34 As is shown in FIG. 36, the processing conducted by the correction section 2903 shown in FIG. 30 (Expression 53) is conducted by the span generation section 3404, This is realized by adding the processing of accumulating the error E for the determination of whether or not the correction is conducted.

The adders 3301a, 3301c, and 3301d are used for the correction as described above. In this example, the adders 3301a, 3301c, and 3301d receive a trigger signal for correction and a span processing signal, so that the correction and the span processing can be realized by the common circuit. Thus, the correction and the span processing can be conducted by the span generation section 3404. Buffers 3501a to 3501d are output buffers each provided with an enable terminal. The enable terminal is provided to prevent data before the correction (outputs from the adders 3301a, 3301c, and 3301d before the trigger signal for the correction is input) from being output from the span generation section 3404 via the buffer because these data are not span values.

With the above configuration where the correction and the span processing are conducted by the common circuit, the circuitry size can be reduced.

Thus, according to the present invention, the difference between the depicting point obtained by the incremental algorithm and the sample point of each pixel is used to correct the corresponding point on the mapping image. This makes it possible to generate a high-quality image. Further, the pixel value determined using the depicting point obtained using the incremental algorithm is allocated to a plurality of pixel values based on the relative positional relationship between the depicting point and the pixel. This also makes it possible to generate a high-quality image. The present invention is applicable to, not only the mapping apparatuses, but also general rendering apparatuses which generate computer images, and similar results can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A rendering apparatus comprising:

means for performing a rendering calculation based on a depicting point on a polygon, and for outputting a calculating result, the polygon being projected to a plane having a plurality of pixels;

means for determining a plurality of pixels corresponding to the depicting point;

means for determining a weight coefficient for each of the plurality of pixels, based on a position of the depicting point; and means for distributing the calculating result to each of the plurality of pixels, based on respective weight coefficients for the plurality of pixels.

2. A mapping apparatus comprising:

an operation section for generating a parameter for a polygon based on respective positions of vertices of the polygon and a corresponding point given to each of the vertices of the polygon, the polygon being projected to a plane halving a plurality of pixels;

an edge generation section for determining a position of a first depicting point on an edge of the polygon and a position of a first corresponding point corresponding to the first depicting point, based on the parameter;

a correction section for determining a depicting pixel corresponding to the first depicting point, for further determining a sample point corresponding to the depicting pixel, and for correcting the position of the first corresponding point based on sample point; and a span generation section for determining a position of a second depicting point within the polygon and a position of a second corresponding point corresponding to the second depicting point, based on the parameter and the sample point.

3. A mapping apparatus according to claim 2, wherein the correction section corrects in a one dimensional manner with respect to the first depicting point.

4. A mapping apparatus according to claim 2, wherein the edge generation section determines a point intersecting the edge of the polygon and an upper edge of the depicting pixel as the first depicting point, and the correction section determines a point which is most close to the origin within the depicting pixel as the sample point.

5. A mapping apparatus according to claim 4, wherein a bit precision representing the parameter is set to a predetermined value, and the correction section includes a shifter an adder.

6. A mapping apparatus according to claim 2, wherein the vertices of the polygon have an attribute value representing a material of the polygon, and the mapping apparatus further comprises means for generating a value corresponding to the first corresponding point and the second corresponding point based on the attribute value.

7. A mapping apparatus according to claim 2, wherein the vertices of the polygon have coordinates for a bump or displacement, and the mapping apparatus further comprises means for performing a bump or displacement calculation within the polygon.

8. A mapping apparatus according to claim 2, wherein the mapping apparatus further comprises means for performing an anti-aliasing processing.

9. A mapping apparatus according to claim 2, wherein each of the plurality of pixels on the plane has a plurality of sub-pixels, and the first depicting point is determined in accordance with sub-pixel positioning.

10. A mapping apparatus comprising:

an operation section for generating a parameter for a polygon based on respective positions of vertices of the polygon and a corresponding point given to each of the vertices of the polygon, the polygon being projected to a plane having a plurality of pixels;

an edge generation section for determining a position of a first depicting point on an edge of the polygon and a position of a first corresponding point corresponding to the first depicting point, based on the parameter;

a span generation section for determining a position of a second depicting point within the polygon and a position of a second corresponding point corresponding to the second depicting point, based on the parameter and the first depicting point;

a generated image storing section for storing a value corresponding to each of the plurality of pixels on the plane;

an image storing processing section for storing a pixel value generated based on either the position of the first depicting point or the position of the second depicting point as a value corresponding to either one of the plurality of pixels or adjacent pixels of the plurality of pixels.

11. A mapping apparatus according to claim 10, wherein the image storing processing section includes:

an area ratio calculation section for distributing the generated pixel value to either one of the plurality of pixels or adjacent pixels of the plurality of pixels, based on a ratio of an area on the plane which is defined by either the first depicting point or the second depicting point to an area on the plane which is occupied by either one of the plurality of pixels or adjacent pixels of the plurality of pixels; and a pixel value distribution section for storing the distributed value as a value corresponding to either one of the plurality of pixels or adjacent pixels of the plurality of pixels.

12. A mapping apparatus according to claim 11, wherein (x, y) denotes either the position of the first depicting point or the position of the second depicting point and wherein the area ratio calculation section includes:

a first multiplier for multiplying (1−x) by (1−y);
a second multiplier for multiplying x by (1−y);
a third multiplier for multiplying (1−x) by y; and
a fourth multiplier for multiplying x by y;
and wherein the pixel value distribution section includes:
  a fifth multiplier for multiplying the output of the first multiplier by the generated pixel value;
  a sixth multiplier for multiplying the output of the second multiplier by the generated pixel value;
  a seventh multiplier for multiplying the output of the third multiplier by the generated pixel value;
  an eighth multiplier for multiplying the output of the fourth multiplier by the generated pixel value.

13. A mapping apparatus according to claim 12, wherein a bit precision representing the generated pixel value is set to a predetermined value, and each of the first through eighth multipliers includes a shifter and an adder.

14. A mapping apparatus according to claim 8, wherein (x,y) denotes either the position of the first depicting point or the position of the second depicting point and wherein the area ratio calculation section includes:

a first multiplier for multiplying (1−x) by (1−y); and
a second multiplier for multiplying (1−x) by y;
and wherein the pixel value distribution section includes:
  a third multiplier for multiplying the output of the first multiplier by the generated pixel value; and
  a fourth multiplier for multiplying the output of the second multiplier by the generated pixel value,
wherein the edge generation section determines a point intersecting the edge of the polygon and an upper edge of the depicted pixel as the first depicting point.

15. A mapping apparatus comprising:

an operation section for generating a parameter for a polygon based on respective positions of vertices of the polygon and a corresponding point given to each of the vertices of the polygon, the polygon being projected to a plane having a plurality of pixels;

a first edge generation section for determining a position of a first candidate point corresponding to a first depicting point on an edge of the polygon and a position of a first corresponding point corresponding to the first candidate point, based on the parameter;

a second edge generation section for determining a position of a second candidate point corresponding to the first depicting point on the edge of the polygon and a position of a second corresponding point corresponding to the second candidate point, based on the parameter;

a selection section for selecting one of an output of the first edge generation section and an output of the second edge generation section; and a span generation section for determining a position of a second depicting point within the polygon and a position of a third corresponding point corresponding to the second depicting point, based on the parameter and the output selected by the selection section.

16. A mapping apparatus according to claim 15, wherein during a period in which one of the first and second edge generation sections operates, the other of the first and second edge generation sections does not operate.

17. A mapping apparatus according to claim 15, wherein the operation section calculates a slope of the edge of the polygon on the plane, and the selection section accumulates a decimal portion of the slope and selects one of an output of the first edge generation section and an output of the second edge generation section, in accordance with whether or not the accumulated result exceeds a predetermined value.

18. A mapping apparatus comprising:

an operation section for generating at least two sets of parameters for a polygon based on respective positions of vertices of the polygon and a corresponding point given to each of the vertices of the polygon, the polygon being projected to a plane having a plurality of pixels;

an increment switching section for selecting one set of parameters among the at least two sets of parameters;

an edge generation section for determining a position of a sample point corresponding to a first depicting point on an edge of the polygon and a position of a first corresponding point corresponding to the first depicting point, based on the selected set of parameters;

a span generation section for determining a position of a second depicting point within the polygon and a position of a second corresponding point corresponding to the second depicting point, based on the selected set of parameters and the position of the sample point.

19. A mapping apparatus according to claim 18, wherein the operation section calculates a slope of the edge of the polygon on the plane, and the increment switching section accumulates a decimal portion of the slope and selects one set of parameters among the at least two sets of parameters, in accordance with whether or not the accumulated result exceeds a predetermined value.

20. A mapping apparatus comprising:

an operation section for generating a parameter for a polygon based on respective positions of vertices of the polygon and a corresponding point given to each of the vertices of the polygon, the polygon being projected to a plane having a plurality of pixels;

an edge generation section for determining a position of a sample point corresponding to a first depicting point on an edge of the polygon and a position of a first corresponding point corresponding to the first depicting point, based on the parameter;

a correction section for correcting the position of the sample point when a distance between the first depicting point and the sample point exceeds a predetermined value;

a span generation section for determining a position of a second depicting point within the polygon and a position of a second corresponding point corresponding to the second depicting point, based on the parameter and the position of the sample point.

21. A mapping apparatus according to claim 20, wherein the correction section is included in the span generation section, and the span generation section performs both a process for correcting the position of the sample point and a process for determining the position of the second depicting point and the position of the second corresponding point.

22. A mapping apparatus according to claim 20, wherein the operation section calculates a slope of the edge of the polygon on the plane, and the span generation section accumulates a decimal portion of the slope and determines whether or not the position of the sample point should be corrected, in accordance with whether or not the accumulated decimal portion exceeds a predetermined value.

23. A rendering method comprising the steps of:

performing a rendering calculation based on a depicting point on a polygon, and outputting a calculating result, the polygon being projected to a plane having a plurality of pixels;

determining a plurality of pixels corresponding to the depicting point;

determining a weight coefficient for each of the plurality of pixels based on a position of the depicting point; and distributing the calculating result to each of the plurality of pixels based on respective weight coefficients for the plurality of pixels.

24. A mapping method comprising the steps of:

generating a parameter for a polygon based on respective positions of vertices of the polygon and a corresponding point given to each of the vertices of the polygon, the polygon being projected to a plane having a plurality of pixels;

determining a position of a first depicting point on an edge of the polygon and a position of a first corresponding point corresponding to the first depicting point, based on the parameter;

determining a depicting pixel corresponding to the first depicting point, further determining a sample point corresponding to the depicting pixel, and correcting the position of the first corresponding point based on the sample point; and determining a position of a second depicting point within the polygon and a position of a second corresponding point corresponding to the second depicting point based on the parameter and the sample point.

25. A mapping method comprising the steps of:

generating a parameter for a polygon based on respective positions of vertices of the polygon and a corresponding point given to each of the vertices of the polygon, the polygon being projected to a plane having a plurality of pixels; and determining a position of a first depicting point on an edge of the polygon and a position of a first corresponding point corresponding to the first depicting point based on the parameter;

determining a position of a second depicting point within the polygon and a position of a second corresponding point corresponding to the second depicting point based on the parameter and the first depicting point;

storing a pixel value generated based on either the position of the first depicting point or the position of the second depicting point as a value corresponding to either one of the plurality of pixels or adjacent pixels of the plurality of pixels.

* * * * *